United States Patent
Bergmann

(10) Patent No.: US 8,281,888 B2
(45) Date of Patent: Oct. 9, 2012

(54) STORAGE OR CONVEYING SYSTEM

(76) Inventor: Lars B. Bergmann, Rossdorf (DE)

( * ) Notice: Subject to any disclaimer, the term of this patent is extended or adjusted under 35 U.S.C. 154(b) by 331 days.

(21) Appl. No.: 12/602,544

(22) PCT Filed: Jun. 2, 2008

(86) PCT No.: PCT/EP2008/004387
§ 371 (c)(1),
(2), (4) Date: Dec. 1, 2009

(87) PCT Pub. No.: WO2008/148513
PCT Pub. Date: Dec. 11, 2008

(65) Prior Publication Data
US 2010/0175943 A1    Jul. 15, 2010

(30) Foreign Application Priority Data
Jun. 2, 2007 (DE) .................. 10 2007 025 822

(51) Int. Cl.
*B60T 7/16* (2006.01)
(52) U.S. Cl. ....................... 180/168; 180/169
(58) Field of Classification Search .............. 180/168, 180/169, 170, 167; 104/139, 290, 292, 281; 318/807, 802, 700, 712, 717, 719
See application file for complete search history.

(56) References Cited

U.S. PATENT DOCUMENTS

| | | | |
|---|---|---|---|
| 4,836,344 A | 6/1989 | Bolger | |
| 5,469,036 A | 11/1995 | Eto | |
| 6,045,319 A | 4/2000 | Uchida et al. | |
| 6,095,054 A * | 8/2000 | Kawano et al. | 104/139 |
| 6,097,114 A | 8/2000 | Hazelton | |
| 6,591,756 B2 * | 7/2003 | Mayer et al. | 104/290 |
| 6,720,680 B1 | 4/2004 | Tanaka | |
| 6,899,036 B2 * | 5/2005 | Lamb et al. | 104/290 |
| 7,126,308 B2 * | 10/2006 | Shigeta et al. | 318/802 |
| 7,385,363 B2 | 6/2008 | Schemm | |
| 7,586,286 B2 * | 9/2009 | Cheng et al. | 318/807 |
| 7,958,830 B2 * | 6/2011 | Schemm et al. | 104/290 |
| 2003/0178901 A1 | 9/2003 | Erten et al. | |
| 2004/0222707 A1 | 11/2004 | Sato et al. | |

(Continued)

FOREIGN PATENT DOCUMENTS
DE    10150520 A1    8/2002
(Continued)

OTHER PUBLICATIONS

Hirai, et al. Wireless Transmission of Power and Information for Power and Information for Cableless Linear Motor Drive, IEEE Transactions on Power Electronics, 2002.

(Continued)

*Primary Examiner* — Hau Phan
(74) *Attorney, Agent, or Firm* — Cahn & Samuels, LLP

(57) ABSTRACT

A storage or conveying system includes an electromagnetic surface-area motor which moves one or more conveying devices, especially movable pallets, cars, or containers mounted on wheels or rolls. The surface-area motor is equipped with a plurality of electromagnets which can generate suitable magnetic fields for moving the conveying device. The conveying device is designed in a passive manner with respect to the driving action of the surface-area motor. The transformers can be separated from one another and can be arranged to form desired geometries of the surface-area motor. At least one metal detecting apparatus is integrated into the surface-area motor.

10 Claims, 48 Drawing Sheets

U.S. PATENT DOCUMENTS

| | | |
|---|---|---|
| 2005/0001579 A1 | 1/2005 | Touzov |
| 2005/0225188 A1 | 10/2005 | Griepentrog et al. |
| 2005/0263369 A1 | 12/2005 | Mendenhall |
| 2007/0289476 A1 | 12/2007 | Schemm et al. |

FOREIGN PATENT DOCUMENTS

| | | |
|---|---|---|
| DE | 10240080 A1 | 3/2004 |
| DE | 10334736 A1 | 2/2005 |
| DE | 10334737 A1 | 2/2005 |
| EP | 0289868 A2 | 11/1988 |
| EP | 0896936 A | 2/1999 |
| EP | 1443632 A | 8/2004 |
| WO | WO 00/10242 A1 | 2/2000 |

OTHER PUBLICATIONS

English Abstract of EP 1443632 A (Aug. 4, 2004).
English Abstract of EP 0896936 A (Feb. 17, 1999).
English Abstract of EP 0289868 A2 (Nov. 9, 1988).
English Abstract of DE 10334736 A1 (Feb. 17, 2005).
English Abstract of DE 10334737 A1 (Feb. 24, 2005).
English Abstract of DE 10240080 A1 (Mar. 11, 2004).

* cited by examiner

Armature platform + possible IB

Tile + IB

Structure

Application software

Operating system

Hardware / platform

STORAGE OR CONVEYING SYSTEM

This patent application is a U.S. national stage application of PCT international application PCT/EP2008/004387 filed on Jun. 2, 2008 which claims priority of German patent document 10 2007 025 822.6 filed on Jun. 2, 2007.

FIELD OF THE INVENTION

The invention relates to a storage or transport system.

PRIOR ART

The normal modern store is a high-shelf store in which the goods are stored and retrieved by means of a robot or by forklift trucks that are driven by a person. This process is difficult to operate in parallel and is therefore time-consuming overall.

PROBLEM

The problem on which the invention is based is to provide a flexible storage and transport system.

SUMMARY OF THE INVENTION

This problem is solved by the invention having the features of the independent claim. Advantageous developments of the invention are characterized in the dependent claims. The wording of all the claims is hereby included by reference in the content of this description. The invention also covers all worthwhile combinations, and in particular all the combinations mentioned, of independent and/or dependent claims.

The storage or transport system according to the invention has an electromagnetic surface-area motor which drives a transport apparatus. In particular, movable pallets or wagons which are mounted on wheels or rollers are used as transport apparatuses. The surface-area motor has a plurality of active transducers which can produce suitable magnetic fields for force to act on the transport apparatuses. The transport apparatus is designed to be passive with regard to the drive by the surface-area motor. The transducers can be separated and can be arranged for desired geometries of the surface-area motor. At least one device for metal detection is integrated in the surface-area motor.

Therefore, according to the invention, the problems are solved in that transducers which can be combined and can be networked to form a platform and which produce magnetic fields controlled by a control system result in logistic guidance of transport apparatuses. The transducers furthermore have lines and interfaces for supplying power and information for the system's own consumption and for external consumption. The magnetic fields, whose size, form and frequency over time can be configured individually, exert forces on the armature elements of transport apparatuses. The armatures are preferably composed of ferromagnetic elements. Furthermore, the transducers transport power and data without contact to the transport apparatuses.

The invention makes use of the principle of the electromagnetic surface-area motor. The transducers are electromagnets and, with the aid of a core and coil, produce suitable magnetic fields for movement for the transport apparatuses.

The transducers are controlled via a control unit which, during operation, controls the transducer or transducers such that the position or stiffness of the transport apparatuses is varied by the force produced by the transducer or transducers.

The method according to the invention therefore essentially allows the forces acting via the transducers to be varied, for example by an appropriate input on the control unit, such that the position of the transport apparatus varies. Any desired movements of transport apparatuses can therefore be produced by appropriately driving the transducers. In this case, the transport apparatuses may have a different size and shape.

The invention allows transport apparatuses of different size to be moved flexibly, in an automated manner, in an environmentally friendly manner and at the same time at the correct time, at the correct speed, to the desired location and in the correct amount.

The transport system according to the invention can be integrated in already existing networks and processes for logistics, information supply and electrical power supply.

The platform according to the invention and its transducers can be used in a multiplicity of fields. For example, it can be used in logistic stores in the form of automated simultaneous object coordination and object movement. The surface-area motors, which are fitted angled, allow logistics over a plurality of planes and/or heights by means of the magnetizing forces, for example in the form of object lifting processes. Surface-area motors can also be fitted to walls, ceilings or to racks, and, for example, can move transport apparatuses which are suspended vertically or overhead on the ceiling.

In production areas, it can likewise flexibly support and/or control the material flow, the data flow and power flow. The automated movement of architectonic and/or creative elements, as well as the movement of the containers and production systems, are likewise feasible. The invention can be used both in commercial, public and/or private fields. In addition to the pragmatic applications, creative integrations of the platform and/or of the surface-area motors are also feasible. The controlled transmission of electrical powers, data, thermal fields and magnetic forces allows electronically and/or mechanically configured systems to be used appropriately.

In order to consume as little energy as possible, the only transducers which produce a magnetic field are those which are required for the movement of the transport apparatus. The position of the transport apparatus must be known for this purpose. This is either known from the control system for the system or can be found with the aid of a metal detector integrated in the surface-area motor.

For the transducers to form a flexible network that can be extended, they are designed such that they can transmit power or data without contact to the transmit apparatus or to another transducer.

By way of example, the magnetic fields may be radio-frequency modulated for transmission purposes, with these magnetic fields being produced in any case by the electromagnets which are provided for the movement of the transport apparatuses. The power supply and the data interchange with external systems can then be carried out by means of electromagnetic fields which are produced by the transducers. For this purpose, the transducers may contain a radio-frequency module and/or a medium-frequency module, a monitoring unit, and a coupling unit, in order to configure electromagnetic fields in the appropriate frequency range, and to allow data and/or power to be interchanged. The transducers act as transmitters and/or as receivers.

As a network component, the invention can then pass on electrical power and data both for its own consumption and for external users.

In a further embodiment of the invention, the transducers contain contact points, which are attached to the surface, via which power can be transmitted in the form of electric current and/or electrical data to external transport apparatuses and/or users.

A three-dimensional non-planar form of one or more surface-area motors or else the platform as an entity can be achieved by appropriate shaping of a surface-area motor and/or of the edges of at least one surface-area motor, in particular by the inclination or shaping of mutually abutting edges of adjacent surface-area motors.

In a further embodiment of the invention, the edge configuration of one or more surface-area motors may have a connecting plug connection, screw connection, magnetic connection and/or adhesive connection, which is intended to ensure relative robustness of the attached or adjacent transducers.

The control unit of the surface-area motor and/or the platform may be in the form of a central control unit outside the surface-area motor and/or the platform, wherein the control signals are transmitted by electrical lines, in the surface-area motors themselves, laid externally and/or without the use of wires to the individual transducers. However, it is also possible for the control unit to be formed in a decentralized manner from a plurality of control elements which are integrated in the surface-area motors, wherein the control elements can communicate with one another electrically and/or without the use of wires.

The lines or some of the lines of the surface-area motors may, for example, be coupled to one another via flexible plug connection elements and/or contact connection elements which are located at the edge of the transducers, in order to allow a power transfer, a data transfer and/or control signal transfer between the transducers.

The transducers may have any desired shape. For example, they could have a circular, oval or polygonal plan outline. The polygons preferably fit together so as to produce an essentially continuous surface. At least one transducer is integrated in the surface-area motors.

The transducers may have any desired shape or configuration. For example, the transducers may contain electromagnets which are U-shaped, in the form of pots, in the form of rods, are E-shaped or have some other desired shape. In the plan outline, the pole surfaces of the electromagnets and/or transducers may have any desired shape, for example circular, round or polygonal. The size and shape of the transducers which are integrated in the surface-area motors may vary from those of other transducers in the surface-area motor.

Depending on the field of application, the surface-area motors or transducers may be composed of various materials. The surface-area motor is preferably composed of a carrier material in which one or more transducers is or are integrated. The carrier material may be steel, concrete, sheet metal, plastic, glass or the like. Its shape and stiffness influence its supporting capacity and load capacity. It is also possible to completely or partially coat one or more surfaces of the surface-area motors or transducers with a material which, for example, may be an electromagnetically shielding, heat-dissipating, soft and/or visually designed material.

The surface-area motors may be formed, suspended or plugged onto floors, walls, ceilings or the like. Appropriate holding apparatuses may be fitted in and/or to the surface-area motors.

Further details and features will become evident from the following description of preferred exemplary embodiments in conjunction with the dependent claims. In this case, the respective features may be implemented on their own or combined with one another in groups of two or more. The possible ways to solve the problem are not restricted to the exemplary embodiments. For example, details relating to ranges always cover all intermediate values, which are not mentioned, and all feasible subintervals.

The exemplary embodiments are illustrated schematically in the figures. The same reference numbers in the individual figures in this case denote the same or functionally identical elements, or elements whose functions correspond to one another. In detail:

BRIEF DESCRIPTION OF THE DRAWINGS

FIG. 40 shows a surface-area element fixing apparatus with a fixing ring plugged/screwed on;

DETAILED DESCRIPTION OF INVENTION

Figure 1:
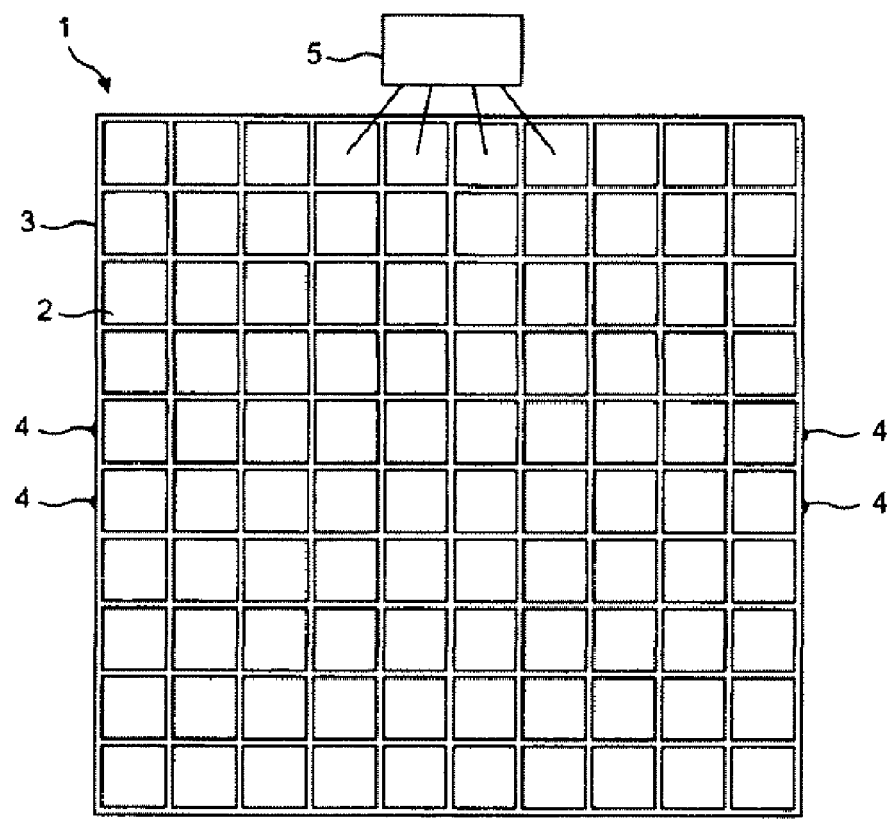
FIG. 1 shows a plan view of a first embodiment of the surface-area motor according to the invention.

FIG. 1 shows a plan view of a first embodiment of a surface-area motor 1 according to the invention. In this case, the transducers 2 and sheaths 3 are not all provided with the appropriate reference symbols, for clarity reasons. The surface-area motor 1 is essentially planar and comprises a multiplicity of integrated transducer elements 2, some of which are arranged alongside one another, thus forming a rectangular surface-area motor 1 with a plurality of rows of transducer elements 2.

The transducer elements 2 are electromagnetic coils which can be operated individually, or contain such coils. The effective armature surface of a transducer 2 is planar and symmetrical, with the transducer 2 producing an essentially continuous surface with adjacent transducers 2 of the same type.

Each transducer 2 is surrounded by non-ferromagnetic material 3. The non-ferromagnetic material 3 likewise acts as a filler for gaps in the surface-area motor 1. The electromagnets of the transducers 2 are supplied with current via an electrical energy source (which is not illustrated), for example via a power supply system voltage, by means of lines (which are not shown) located under and/or between the transducers.

As is indicated schematically in FIG. 1, the operation of the individual transducers 2 of a surface-area motor 1 is controlled via an electronic control unit 5. For clarity reasons, only a simplified coupling of the control unit 5 to a small number of transducers 2 is indicated in the drawings. By way of example, the control unit 5 can interrupt the electrical power supply from the energy source to the transducers 2. Furthermore, the level of the electrical current supplied can be regulated by the control unit 5.

The electrical power supply and the electrical information supply for a surface-area motor 1 and for its control 5 are provided via lines (which are not shown) and contacts 4, which are fitted to the sides of the surface-area motor 1. The contacts 4 are likewise used in conjunction with contacts 4 of other transducers to pass on electrical power and data to other transducers, transport apparatuses and/or beneficiaries.

The configuration of the contacts 4 can be oriented for conventional contact connections, plug connections and/or sliding contacts. A sprung contact solution is preferred, which can be recessed in the transducer and ends flush with the side surface of the transducer when in the pushed-in state.

Figure 2:
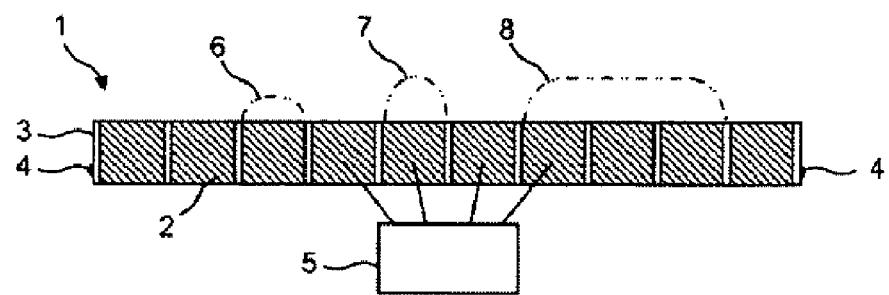
FIG. 2 shows a cross-section view of a surface-area motor from the side, which uses electromagnets as transducers.

FIG. 2 shows the side view of a surface-area motor 1 which has transducers 2 arranged alongside one another. The shape in this case corresponds to the shape of the surface-area motor 1 shown in FIG. 1, viewed from the side. All the transducers are arranged analogously to FIG. 1 with respect to one another, and are sheathed with a non-ferromagnetic material 3. A magnetic field is built up by means of the transducers 2, which are operated by the control element 5. As illustrated in the drawing by way of example, the user can predetermine and/or influence the strength, the build-up over time, the structure and the form of the magnetic field 6, 7, 8.

Figure 3:
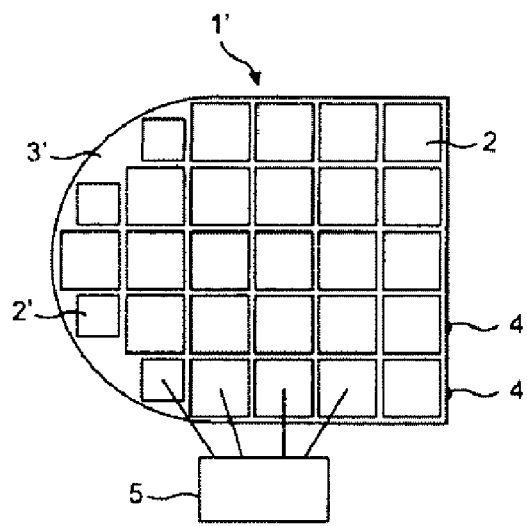
FIG. 3 shows a plan view of a further exemplary embodiment.
Figure 4:
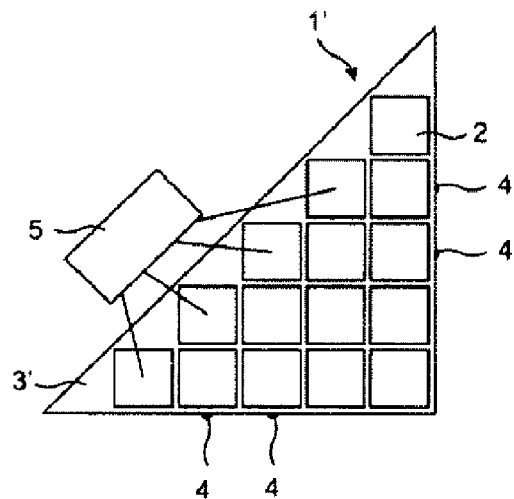
FIG. 4 shows a plan view of a further exemplary embodiment.
Figure 5:
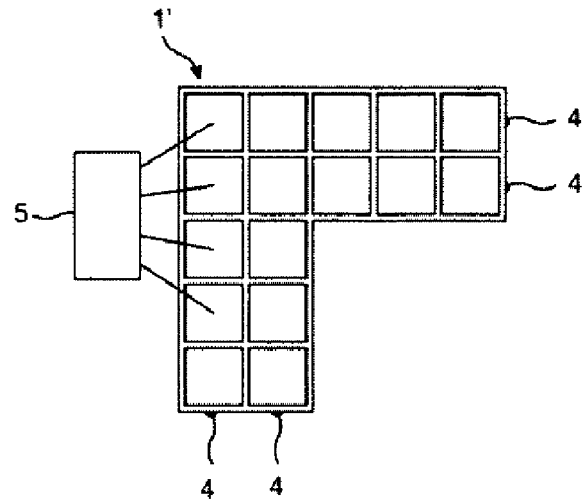
FIG. 5 shows a plan view of a further exemplary embodiment.

FIGS. 3, 4 and 5 show a plan view of further exemplary embodiments 1' of the surface-area motor 1 according to the invention. As can be seen from FIGS. 3, 4, 5, 6, 7 and 8, the shape of the individual transducer elements 2 can be chosen as required. This also applies to the overall shape of the surface-area motor 1 and of the platform which results from it. In particular, the shape is not restricted to rectangles and, for example, the inner transducer elements 2 could also have any other desired shape, for example a honeycomb structure or the like. Otherwise, the method of operation of the individual transducers 2, of the control elements 5, of the surface-area motor 1 and of the platform corresponds to the method of operation described with reference to FIG. 1.

The surface-area motor 1' shown in FIG. 3 is rounded at the side, when viewed in a plan view, and this is achieved by transducers 2 being omitted, the position of transducers 2 being offset in the surface-area motor 1', and by some transducers 2' being smaller than the others. The uniform rounding in FIG. 3 is achieved by filling with non-ferromagnetic material 3.

The surface-area motor 1' shown in FIG. 4 has a triangular shape, in a plan view. The uniform shape in FIG. 4 is achieved by filling with non-ferromagnetic material 3.

FIG. 5 shows an illustration, in the form of a plan view, of an angled embodiment of a surface-area motor 1'.

Figure 6:
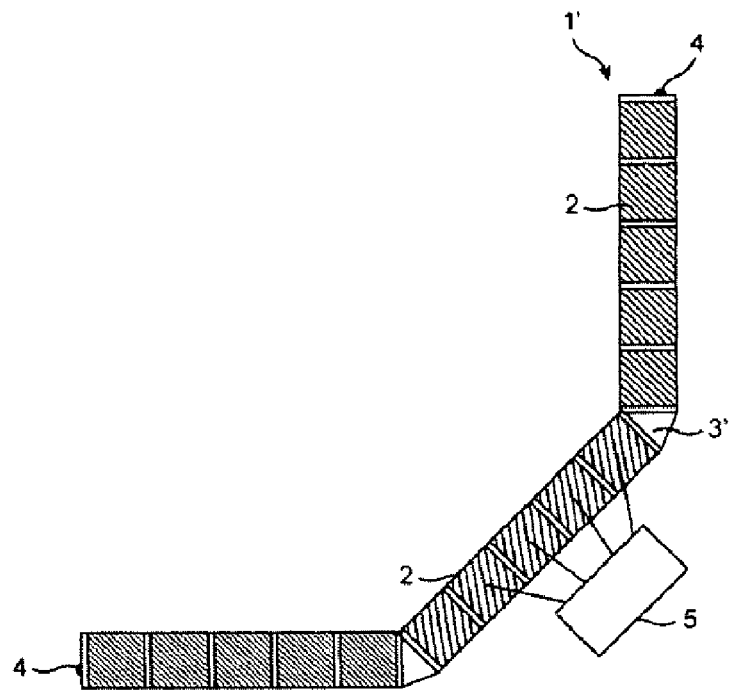
FIG. 6 shows a cross-section view of an angled surface-area motor from the side.

The embodiment shown in FIG. 6 illustrates a side view of a further embodiment of a surface-area motor 1 according to the invention. This is a surface-area motor 1' which is constructed to be angled in three dimensions. This shape is achieved by arranging transducers 2 at different angles with respect to one another. The gaps which are caused by the angles are filled with non-ferromagnetic material 3. The connection between the transducers 2 illustrated in FIG. 6 is achieved by means of electrical lines or contact connecting pieces (not shown), which are inserted in the resultant gap rather than the non-ferromagnetic material 3. When the transducers 2 are activated, magnetic fields of suitable configuration are formed, which exert a force on ferromagnetic transport apparatuses and move them from a horizontal position to a vertical position.

Figure 7:
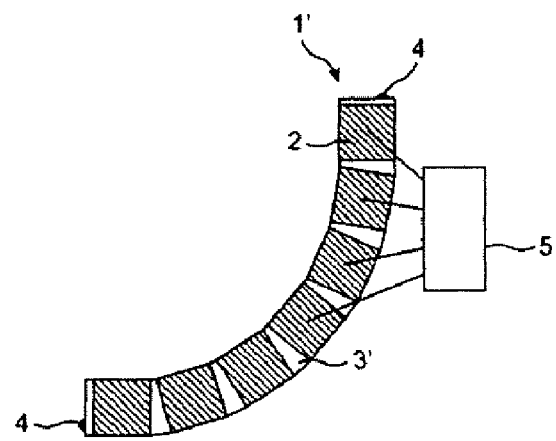
FIG. 7 shows a cross-section view of a rounded surface-area motor from the side.

The embodiment shown in FIG. 7 differs from the embodiment shown in FIG. 2 in that the surface-area motor 1 is not planar, but has a three-dimensional rounded shape variant of the surface-area motor 1. This shape is achieved by arranging the transducers 2 at different angles with respect to one another. The head parts of the transducers 2 in FIG. 7 are forced closer to the head parts of the adjacent transducers 2 than the foot parts. This shape allows connecting surface-area motors 1' between horizontally located surface-area motors 1 and vertically suspended surface-area motors 1.

Virtually any desired three-dimensional surface can be achieved by appropriate shaping of the surface-area motors 1. This allows three-dimensional movement of transport apparatuses with ferromagnetic elements.

Figure 8:
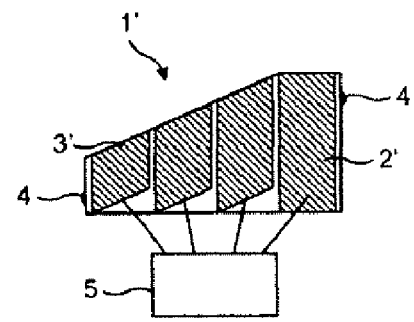
FIG. 8 shows a side cross-section view of a surface-area motor which is not planar and has differently shaped transducers.

FIG. 8 shows a side section view of one embodiment of a surface-area motor 1 according to the invention. The transducers 2' have different shapes. The force which is exerted on ferromagnetic transport apparatuses by magnetic fields which are built up by this surface-area motor moves the transport apparatuses to a position which is angled with respect to the horizontal, or to a higher level. For more uniform shaping of the surface-area motor 1', resultant gaps and spaces are filled with non-ferromagnetic material 3.

Figure 9:
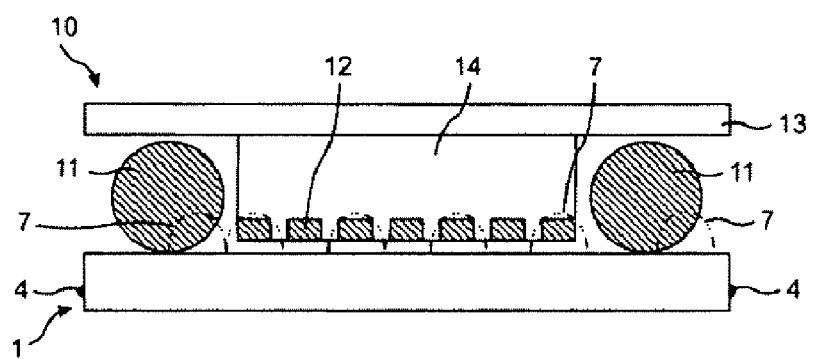
FIG. 9 shows the method of operation of a surface-area motor on a transport apparatus, by way of example, in the form of a cross-section view.

FIG. 9 shows a schematically illustrated side section view of one embodiment of a transport apparatus 10 which is arranged on a surface-area motor 1. The transport apparatus 10 is moved on wheels 11 and has a subframe 14 and a loading or transport surface 13 located above the subframe 14. At the bottom, slightly above the base and therefore slightly above the surface-area motor 1, there is at least one ferromagnetic element 12 in the subframe 14. In the same way as the subframe 14, ferromagnetic elements can pass through the wheels 11, or the wheels 11 may be composed thereof. Magnetic fields 7 are formed by suitable operation of the transducers in the surface-area motor 1, varying over time, and exert a force on the transport apparatus 10, in order to move it.

For its electrical power supply and data transmission, the transport apparatus 10 can use the non-contacting power supply and the bidirectional data transmission via the transducers.

Figures 10A, 10B:
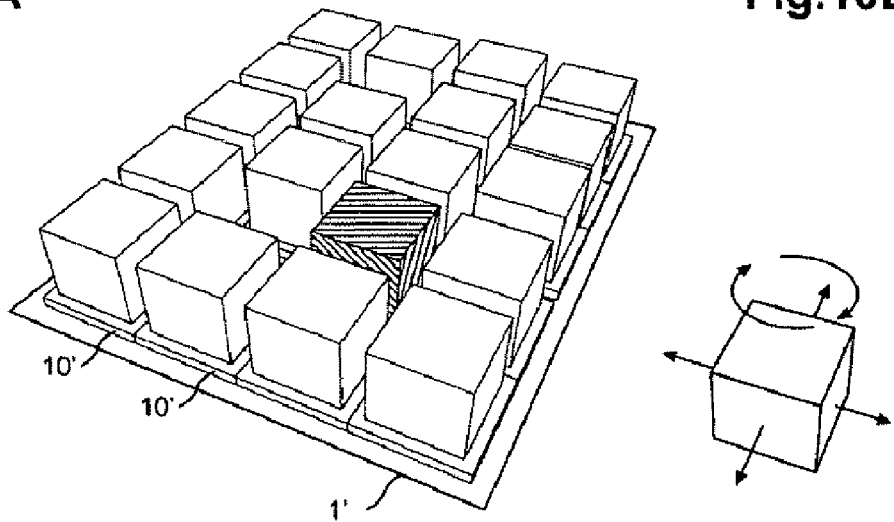
FIG. 10A shows a three-dimensional illustration of an example of a logistic field of use for the invention.
FIG. 10B shows a three-dimensional illustration of an example of a transport apparatus.

FIG. 10A shows the three-dimensional view of a schematically illustrated logistic application. Mounted transport apparatuses 16 are borne individually by moving transport apparatuses 10'. These can in turn be moved individually by the transducers in the surface-area motor 1'.

The simultaneous individual movement of a plurality of transport apparatuses 16 in a store with surface-area motors 1 saves transport movement paths and space in comparison to conventional storage systems. Space is saved by the utilization of gaps in the store without any problems. Furthermore, adjacent transport apparatuses 16 can change place, as a result of which transport apparatuses 16 which are mounted such that access is difficult can be transported to the edge of the store.

As is indicated in FIG. 10B, a transport apparatus 10' can be moved horizontally in all directions on a surface-area motor 1. Furthermore, the transport apparatuses 10' can be rotated about their vertical axis.

Figure 11:
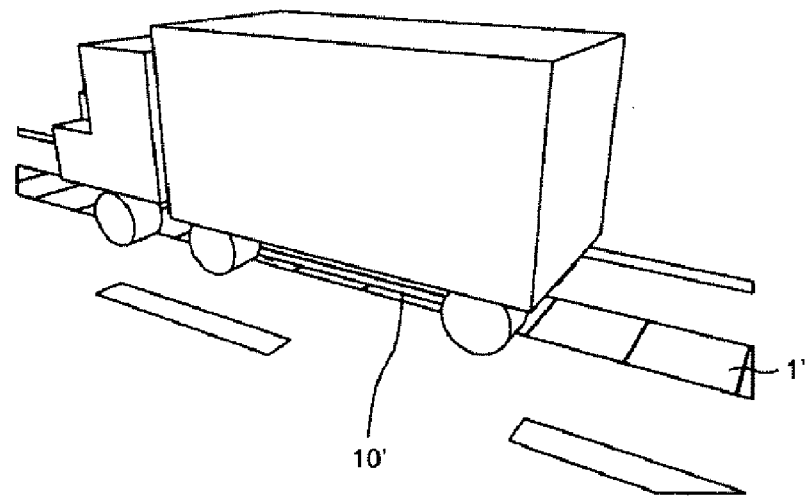
FIG. 11 shows a three-dimensional illustration of an example of inclusion and use of the invention in an existing network.

By way of example, the schematic illustration in FIG. 11 shows the inclusion and use of the invention in an existing network—in this case a road. For this purpose, surface-area motors 1' are incorporated in the road. In addition, commercial vehicles 15 have a subframe 14 with armatures 12 on their underneath. This allows the commercial vehicles 15 to be moved by magnetic forces. It is also feasible to use the described devices to assist the commercial vehicles' 15 own movement, which is by a conventional motor, in this way. The described devices can also be used to brake commercial vehicles 15.

Before the technical details are explained, the terminology used will be defined:

The expression "transducer" means a single electromagnet.

An electromagnet typically has the following components:
  a coil, which is formed from windings composed of conductive, lacquered wires; and
  a coil core, which is typically composed of iron; the coil core is occasionally also referred to as a "shaft";
  those parts of an electromagnet which do not belong to the winding are referred to as the "stator". These parts are, in particular (see also below in 2.1):
    the coil core,
    the pole foot; and
    the pole head.

The expressions "armature" or "rotor" refer to the permanent magnets or ferromagnetic elements which are fitted to the transport apparatus and on which the forces of the magnetic fields of the transducers act.

A "surface-area element" is a cohesive arrangement comprising a plurality of transducers. A plurality of transducers can typically be connected to form a rectangular surface-area element comprising, for example, 6×6 or 10×10 transducers, or can be produced integrally.

General

The subject matter of the project idea is the development and marketing of adaptively IT-controlled logistics by means of platforms which use electromagnetic fields to transmit forces and powers as well as data to objects and apparatuses, without contact. Objects and apparatuses of any desired shape and size can in this way be supplied with both current and data flexibly, individually, jointly or like swarms, and can at the same time be moved precisely in three dimensions. This allows both the initiation of retrieval and movement processes of any type "just in sequence" and offers the capability to configure fluid processes (for example different material flows to pass through in storage and manufacturing logistics). Fully automated logistic object coordination and management are dynamically and optimally matched to changing situations and requirements. Manufacturing procedures and fine-distribution processes can be carried out in real time thus resulting in a hybrid between individual manufacture, series production and storage. Individual movements of a plurality of objects simultaneously allows automated precommissioning to take place in the storage depot with the maximum storage density in the store itself, before the goods are moved to the participant/processing location. Objects can be delivered within the framework of the platform at the correct time, at the correct location, in the correct amount, of the correct quality, at low costs and in an extremely environmentally friendly manner, individually, flexibly and at the same time. The high accuracy and the high integration potential (for example in mechanical systems or architectonic facilities) at the same time allows relatively small processes to be carried out, such as rapid inclusion and disconnection of processing positions (machines) or workpieces, as well as the implementation of large-area processes with increased logistics requirements, beyond company boundaries. The system without any rails is extremely compatible with, and can be integrated with, existing networks, facilities, external beneficiaries and processes, because of the skilful power and data logistics. All the variables are controlled by means of a warehouse control system which, in addition to process simulations and ERP links, always allows up-to-date data transparency.

In comparison to existing solutions, because of the integratively implemented automation, the system provides greater potential savings in terms of processes, personnel, storage areas, resources as well as operating and maintenance costs. In the area of logistics within the company, this means that simultaneous and faster access to all items, higher changeover frequencies, shorter throughput times and failure times with little handling effort at the same time (goods-to-man principle). The highly agile system allows logistic processes and stores to be always optimally and dynamically matched to changing situations, in real time.

List of Contents
1. Method of operation of the drive on the principle of the induction motor
   1.1 Function of planar drives on the basis of the surface induction motor
2. Transducer/coil/electromagnet
   2.1 Transducer/stator
   2.2 Winding
   2.3 Material
3. Surface-area element design
   3.1 Design principle
   3.2 Design overview and layout
   3.3 Size versions
   3.4 Combination methods
   3.5 Stator foot/stator plate
   3.6 Board
   3.7 Coils/transducer
   3.8 Stator pole heads
   3.9 Combination/fixing points
   3.10 Section/contact points
   3.11 Additional usage functions of the section and contact points
   3.12 Envelope/housing
   3.13 Platform edges/platform frame
4. Circuits and electronic control
5. Transport apparatuses/armature
   5.1 Armature and stator topologies of permanent-magnetic synchronous machines
      5.1.1 Stator tooth pitch less than the armature pole pitch
      5.1.2 Stator tooth pitch comprises armature pole pitch/ms
      5.1.3 Stator tooth pitch greater than the rotor tool pitch
   5.2 Electromechanical energy conversion—force densities 6. Non-contacting power and data transmission
7. Metal detection/sensor system
8. Identification
9. Software
    9.1 Operating system
    9.2 Application software 1. Method of Operation of the Drive on the Principle of the Induction Motor The following section describes the technology of the planar drive structure based on the principle of the surface induction motor/surface-area motor. A travelling magnetic wave which can be moved in any desired direction will be described on the basis of a 3D magnetic equivalent circuit.

Planar drives play an important role in a number of industrial fields (for example for the production of semiconductor systems, machine-tool engineering, lithography, SMD systems, mounting systems, laser cutting and logistic systems). The particular requirements for planar drives via the structural and functional parameters depend on the application. Different physical types may be used depending on the details of the requirements for the various energy principles and transducers. Most existing planar drives have been developed for high precision and good dynamic response. In the meantime, there are now areas in which reliable, robust and cost-effective planar drives are required without stringent requirements for precision and dynamic response.

Planar drives based on the induction motor principle are highly suitable for requirements such as these. In principle, this has the following structural advantages:
    Relatively simple design;
    A homogeneous and unstructured secondary part (armature), which is moved;
    Arbitrary alignment of the drive technology.

Prototypes of planar motors are based on a combination of a plurality of linear induction motors. In this case, the aim is to describe a planar motor on the basis of a surface induction motor with isotropic primary and secondary magnetic characteristics.

1.1 Function of Planar Drives on the Basis of the Surface Induction Motor

Figure 12:
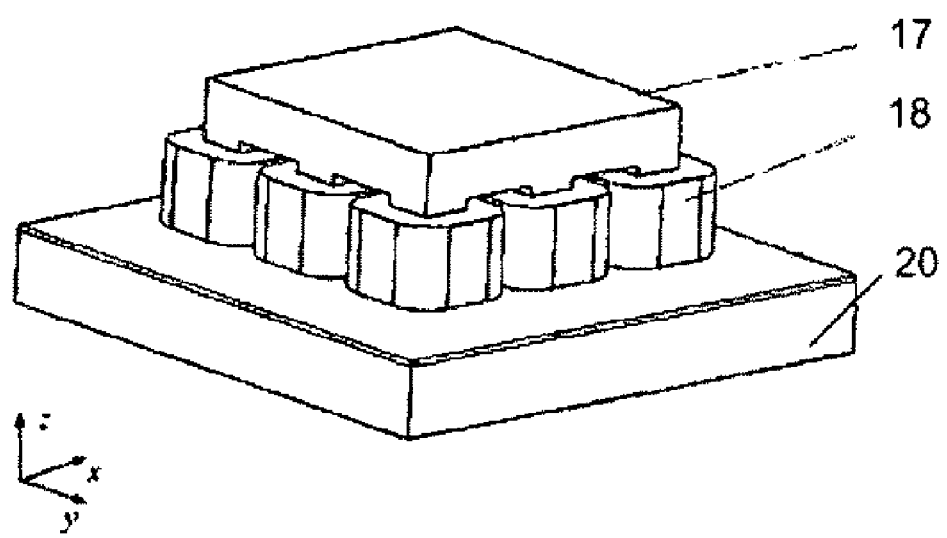
FIG. 12 shows the structure of the surface of the induction motor with core/coils—primary part and armature.

FIG. 12 shows the structure of the surface induction motor. In contrast to the illustrated sketch, the design of the invention is, however, "upside down". The induction motor is incorporated in the base as a surface-area element, and moves the rotor/armature via it.

The material requirements for the primary core and armature are: magnetically isotropic characteristics, high saturation of the magnetic flux density, low conductivity and low hysteresis.

A soft-magnetic mixed material best complies with the stated requirements.

In principle, various tooth surface structure configurations are possible for the surface-area motor. In this example, the surface induction motor is described with nine teeth, with the distance between the individual teeth being the same along the x and y coordinates, and with the surface structure having been formed symmetrically.

The coils are equipped with a three-phase system in order to produce a magnetic wave and magnetic eddy currents in the air gap/air space between the poles and the interaction armature. This interaction results in a drive in any desired direction. Depending on the choice of the configuration of the parameters, this machine device can act both as a longitudinal induction motor and as a transverse induction motor. The mounting/suspension of the armature may be implemented not only in an aerostatic or mechanical form but also electrodynamically.

Measurement systems such as optical correlation, interferometer or ultrasound systems may be used for the distance sensor system. If the armature has mechanical bearings, there is no need for this. The detailed design implementation and the implementation of the measurement and control technology will not be considered in this section.

2. Transducer/Coil/Electromagnet

The transducer is the core piece of an electromagnetic surface-area motor. Its design is optimized for the force field to be built up, and has a low power requirement. The materials contained in its components govern the cost factor of the surface-area element. Furthermore, the aims are for minimum drive power and minimum heat losses (low minimum switching current, low holding current), quickly switching for minimum requirements for the drive device, minimum physical volume, low susceptibility to defects, long life and further minimum costs (development, material, production, operating costs, disposal).

2.1 Transducer/Stator

Figure 13:
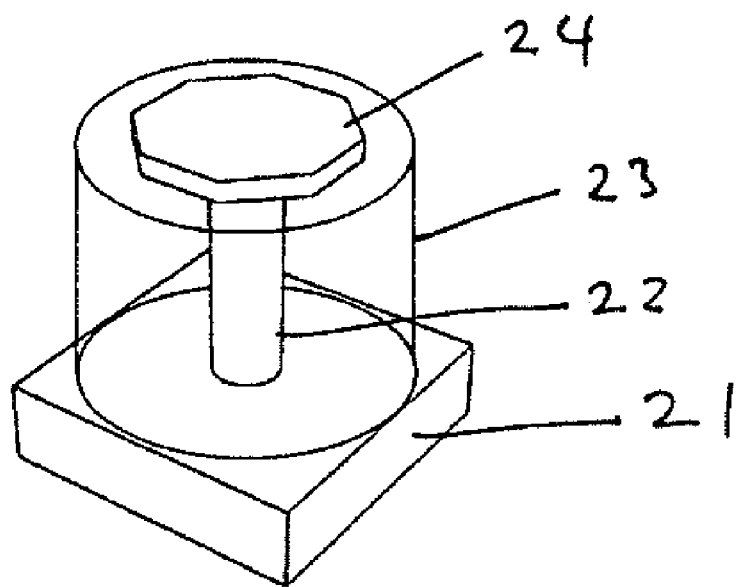
FIG. 13 shows a schematic illustration of a transducer.

The transducer/stator (illustrated with only one tooth in FIG. 13) as the main component of the electromagnetic tile is composed of the following parts:
    21 Foot/stator foot/stator pole foot (stator pole/pole surface)
    22 Core/winding axis/stator axis
    23 Winding/coil winding
    24 Head/stator head (stator pole/pole surface)
    Non-ferromagnetic material, envelope, coil lacquer, fixing with the surface-area element and other transducers (not illustrated in FIG. 13).

Its shape and its construction are critical for the configuration of the strength, shape and frequency of the magnetic field to be formed. It may function not only as a tension, load-bearing or load element, but also as a potential component of the metal detector, and as an element for non-contacting power transmission.

In order to adapt the current level and electrical voltage of the application, various types of electromagnetic equipment are commercially available (electromagnet, pot-type magnet, U-shaped magnet . . . ). A continuous stator foot, which connects all the transducers and increases the effective force for operation, is worthwhile for low stray current losses. A stator surface design with a multiplicity of teeth (stator axes with poles) has therefore been developed for the present invention. The number of turns, the wire diameter and the wire material of the coil are critical factors for the induced power, and in particular for the relevant costs. A standard armature plate (shape, resting position, material, distance (air gap) from the pole surface, . . . ) which is attached, for example, to different types of transport apparatuses interacts with the planar surface-area elements.

Figure 14:
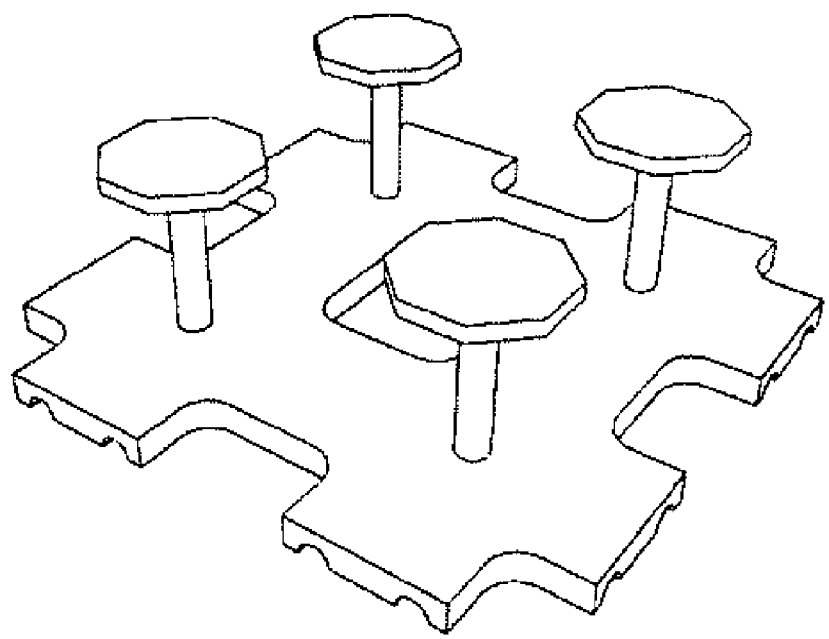
FIG. 14 shows a detail of a surface-area motor.

The magnetic skeleton (stator head, foot, axis), as illustrated in FIG. 14, likewise uses as little material as possible and nevertheless offers good robustness, stiffness and load-bearing function for objects potentially lying on it. Its diameter, its relative permeability and its size are responsible for the shape and form of the magnetic field of the entire electromagnetic surface-area element.

Figure 15:
FIG. 15 shows different types of pole surfaces.

The contour of the magnetic pole must be defined such that the optimum profile of the induced voltage is achieved by appropriate flux-density distribution in the air gap. The pole area of the stator skeleton should be chosen in its planar form such that, in combination with other transducers, this results in magnetic fields which can move the relevant (round) objects uniformly, on an energy-conscious basis, with strong pulling force and a plurality of degrees of freedom. This is illustrated in FIG. 15.

At the same time, one possible way to increase the force is to enlarge the pole surface area. As the pole surface area becomes larger, the magnetic permeability decreases for the same movement. A maximum surface area (square of the pole surface area) thus contrasts with a force field (round pole surface) of optimum configuration, which furthermore influences the tooth pattern of the armature. It should be noted that a stray field is formed between the poles when current flows through the field coil. If parts which are not part of the equipment and can be magnetized are located in this field, they are attracted in the direction of the pole surfaces because of the force effect and are held firmly on the poles with an adhesion force which is adequate for the magnetic field strength. When transducers are arranged alongside one another and are activated, force fields meet one another and interact. In order to allow energy to be saved and work to be carried out with a plurality of degrees of freedom on the plane, a hexagonal or octagonal pole surface provides an acceptable compromise.

Non-ferromagnetic material and material which is insensitive to heat surround the transducers, providing robustness, in order to prevent excessive magnetic field induction into other coils and in order to prevent the positions of the transducers from changing because of the forces that occur. Furthermore, this material provides protection against possible oxidation of the elements, and contributes to the heat dissipation. In order to minimize the air gaps between the coils and in order to make the transducers robust, they are encapsulated in appropriate material. The weight, cost and strain factor on heating must be taken into account here.

The critical factor for use of the force to be applied by the magnet is compliance with the cross-section condition by the parts which are external to the magnet and must be held. When using round adhesion magnets, their thickness must accordingly correspond to at least d 2/4, and s/2 of the sheet-metal thickness s for square center poles.

The surface of the external parts which act as the magnet armature should preferably be ground, but should at least be smooth. Uneven areas on the contact surface lead to excessive air gaps between this surface and the pole surface, and reduce the magnetic force. In the case of small and lightweight parts, automatic separation after switching off is not always provided by the remanence force that acts. The remanence force can then be reduced by a parasitically acting air gap, in the present case in the form of a plastic coating over the pole surfaces and the surface-area element. This plastic envelope likewise contributes to oxidation protection for the surface-area element.

Figure 16:
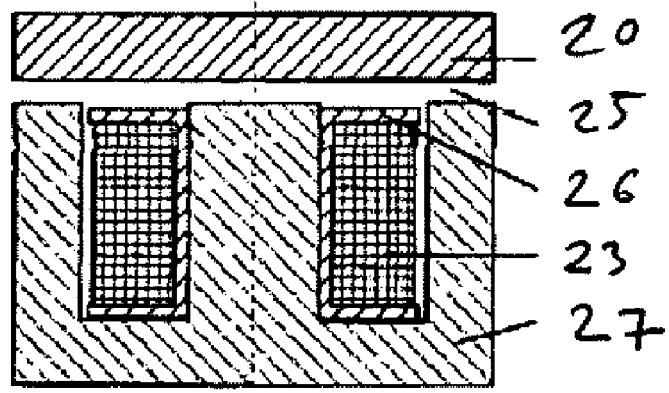
FIG. 16 shows a planar armature magnet.

If it is intended to hold the parts which cannot be magnetized, they must be provided with an armature plate, which can be magnetized, of appropriate thickness. Virtually constant adhesion forces can be produced by the multiple-coil arrangements with an appropriate number of magnet poles over large areas, as is used, for example, for machine clamping tables. This is illustrated in FIG. 16.

Fundamental Definition

The stator of all polyphase machines comprises a sequence of individual teeth which are in general each fitted with a concentrated tooth-wound coil. The relationship between the coil, the winding axis and the metering sense of the current is described in FIG. 17. The figure also shows symbols used for abbreviation purposes for the following illustrations.

The individual coils which are located alongside one another may belong to the same surface-area element or to a different surface-area element. Because of the required symmetry and the requirement for there to be at least three phases, the number of teeth and coils must be divisible by three, without any remainder. Furthermore, the surface-area elements must be uniformly distributed.

The frequency of the stator variables is governed exclusively by the rotation speed and the number $z_{pm}$ of permanent magnets in the armature/rotor. In order to achieve a closed magnetic circuit without a unipolar flux, $z_{pm}$ must be an even number. In general, the coil width should be in the vicinity of that provided by the pole pitch used in the armature (possibly permanent magnets), in order to achieve a good winding factor $\xi_s$.

In the double-layer stator plate that has been developed, each tooth is wound such that the number of teeth and the number of coils are identical. In comparison to single-layer machines, this obviously results in a particularly short end-winding projection. The flux passing through the coil and which has to be commutated is reduced, while on the other hand the two coil sides located in a common slot always result in negative feedback (which increases the inductance).

2.2. Winding

The design of the field coil, the use of suitable materials and the choice of the best production technology have a major influence on the technical data of a direct-current magnet. In addition to the design of the winding, the nature of the winding insulation and the arrangement of the coil within the magnetic circuit are of major importance for the specific operating capability of a direct-current magnet.

Figure 17:
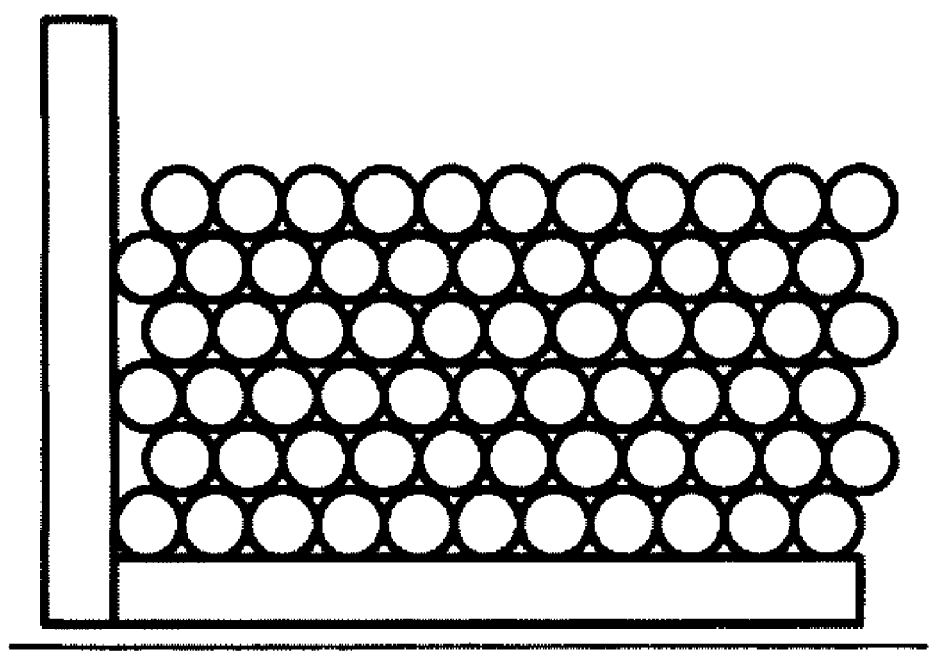
FIG. 17 shows an orthocyclic winding.

In the interest of the transducer being as physically small as possible, the available winding space must be utilized as well as possible. In this case, it can generally be said that the smaller the wire diameter that is used, the greater is the number of possible windings. This must be matched to the duration and intensity of use since a very thin wire can quickly be overloaded. Furthermore, when the wire diameter is decreased, the change in the ratio of the actual wire to its insulating lacquer coating must be borne in mind. FIG. 17 illustrates one conventional winding form.

Figure 18:
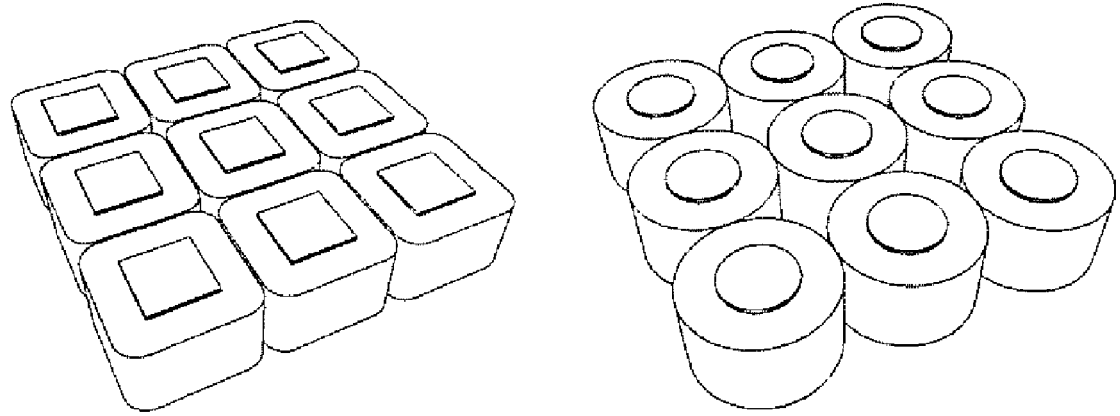
FIG. 18 shows windings in the air gap.

Linear motors with permanent-magnetic excitation are generally provided with a winding which is located entirely in the air gap. Because of the large magnetic gap that is then involved, a reduced force density must admittedly be expected, but on the other hand a low stator inductance, extremely minor force fluctuations and relatively small normal forces between the stator and the translator are achieved, with the latter even disappearing completely in the case of a double-sided arrangement. This is illustrated in FIG. 18.

Figure 19:
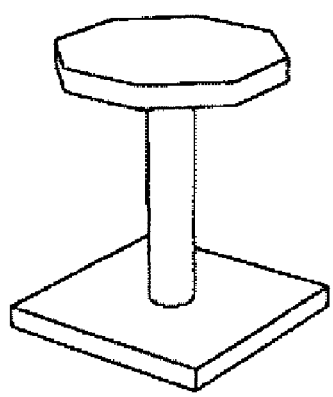
FIG. 19 shows a tapered tooth/stator axis

A compromise is made with a tapered stator axis (see FIG. 19) which reduces force fluctuations, provides robustness, and allows for coils to have a large number of turns.

2.3. Material

For cost reasons, the materials must be chosen very carefully. The majority of normal field coils for direct-current magnets are composed of lacquered copper wire or lacquered iron wire. Since 1960, aluminum-foil coils have also been used in particular cases. The major increase in copper prices at the moment is making it impossible to use copper to the desired extent. Lacquered iron wire is likewise not recommended, because of the heavy weight. Aluminum should therefore be mentioned as an alternative coil material.

The conductivity of aluminum (electrical conductivity of aluminum=$37.7 \cdot 10^6$ S/m; density=$2700$ kg/m$^3$) is admittedly only ⅔ of that of copper (electrical conductivity of copper=$58 \cdot 10^6$ S/m; density=$8920$ kg/m$^3$) (electrical conductivity of iron=$10 \cdot 10^6$ S/m; density=$7874$ kg/m$^3$), for which reason the conductor length must be ⅓ times greater. However, aluminum is considerably lighter (30% of copper) than copper. A solution using aluminum windings is likewise acceptable for the required low voltage of a transducer.

A further advantage for the use of aluminum is the insulating oxide layer which is quickly formed. This not only makes the coil corrosion-resistant but, furthermore, also replaces the normal insulation lacquer which is otherwise required. However, when the wire diameter is reduced, care must be taken to ensure that the oxidation of the uppermost metal zone does not excessively load the aluminum and reduce the conductivity of the actual wire. Aluminum is likewise a relatively soft, ductile metal which can be melted easily, and can furthermore be processed well in transducer production. Since the use of the coils is of a static nature, the brittleness of aluminum is of importance only during production.

In comparison to copper (thermal conductivity of copper=401 W/(m·K)), the thermal conductivity of aluminum (thermal conductivity of aluminum=237 W/(m·K)) is considerably less. The "short" and "low" current-flow frequency in the coils makes it possible, however, to reduce the thermal dissipation problem in most application situations. Furthermore, the encapsulation makes a considerable contribution to heat dissipation. Nevertheless, the potential expansion of the materials used on heating should be remembered.

Because of the continually changing magnetization in the stator poles and in the stator yoke/axis, eddy-current losses occur in these parts when using solid iron. In conventional machines, those parts in which alternating fields or rotating fields occur are thus formed from layers of iron laminates. This procedure could possibly be considered to be problematic in the surface-area elements, since the geometry and the field profile in the stator poles does not allow lamination. Instead of this, the stator poles, the stator yoke and the rotor yoke can be produced from a soft-magnetic powder composite material. This material is composed of iron particles with an insulating surface, which are compressed under pressure and temperature thus creating semi-finished products which can be processed in the conventional way. The disadvantage of this method is the compression stiffness and the load capacity of the blanks that are produced.

It will be possible to use the material SOMALOY 500 with an initial permeability of μr=500 (Höganäs Company, Sweden, see www.hoganas.com).

In order to allow a high armature efficiency, eddy-current losses must be minimized. A further alternative to electrical laminates and permanent magnets is provided by soft magnetic composite (SMC) material. This is an iron powder sheathed with a plastic layer, which is provided with its final form by conventional pressing technology, followed by a sintering process. The magnetic and mechanical characteristics of the SMC material can be matched to the requirements by additives in the powder, with appropriate adaptation of the sintering process. By way of example, a relative magnetic permeability of up to 700 and a saturation flux density of 2.0 T can be achieved, with a mechanical strength of 100 N/mm$^2$. Complex isotropic structures can be produced with the aid of the SMC material and pressing technology, thus providing a higher functional integration density.

3. Surface-Area Element Design

Figure 20:
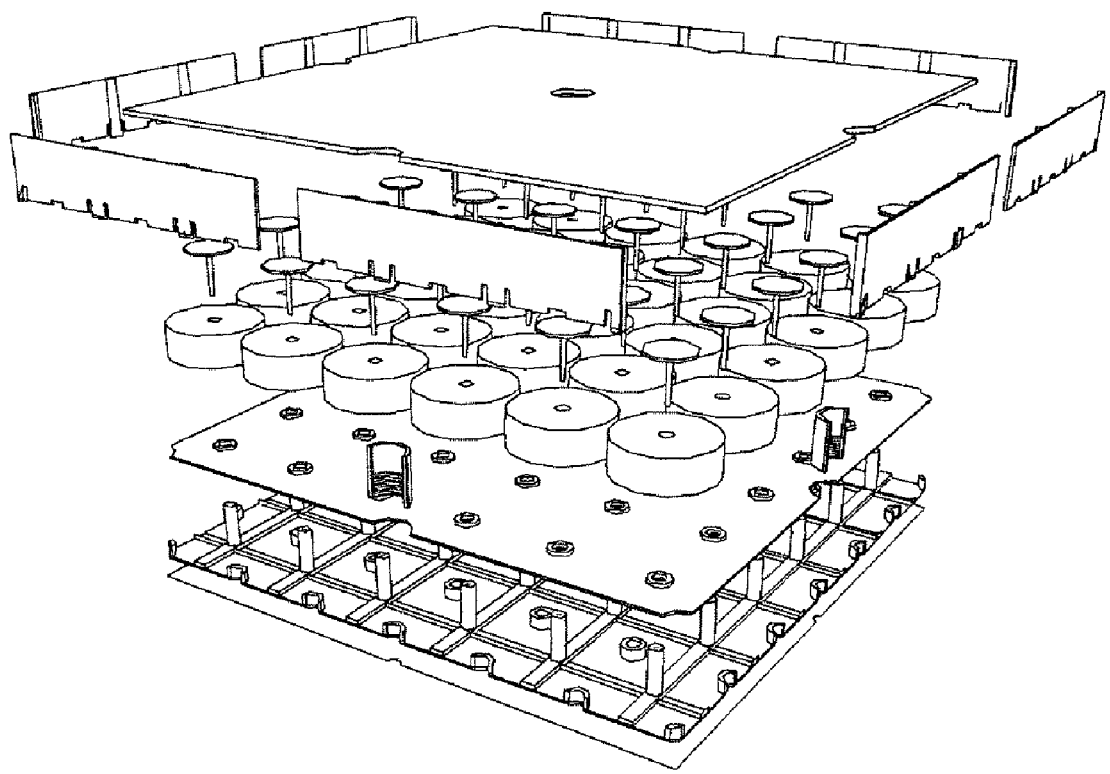
FIG. 20 shows a fanned-out surface-area element

The surface-area element/surface-area motor (see FIG. 20) or else the "electromagnetic tiles" interact with the integrated transducers/coils as a module element, together with other surface-area elements in combination in the platform. The principle of a surface-area element will be described in the following text:
The individual components of the surface-area element design with the dimensions 250 mm×25 mm×250 mm will then be described specifically and separately in more detail, in which case larger embodiments of the surface-area elements (for example 500 mm×25 mm×500 mm; 1000 mm×25 mm×1000 mm) are intrinsically designed and constructed in a very similar manner, in order to allow them to interact with one another in the designed platform. The design description comprises the individual components (from bottom to top from the figure): housing base plate, stator plate, contact interfaces, board as a mounting panel for the electronic assemblies, coils, stator heads, housing walls, housing roof plate.

3.1 Design Principle

Figure 21:
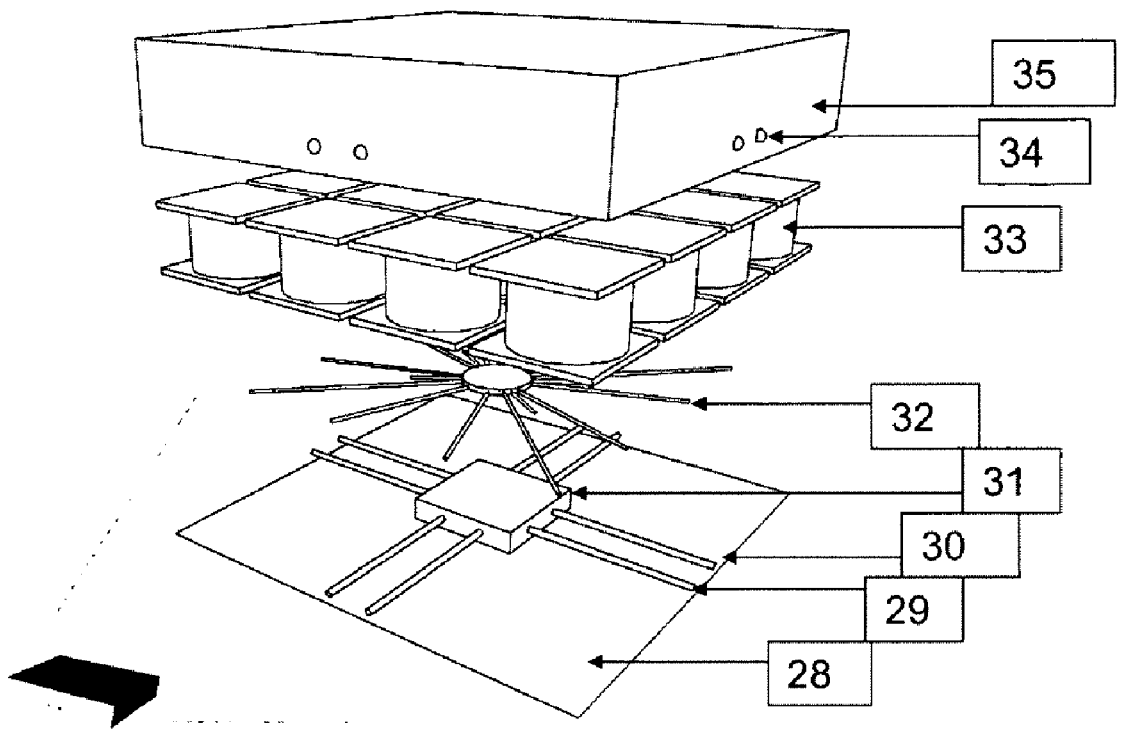
FIG. 21 shows a simplified fanned-out surface-area element

The design principle comprises the following elements:
28 Base/suspension
29 Power supply lines
30 Data supply lines
31 Control element/electronics/board/chip
32 Electrical power distribution to the transducers
33 Transducers/electromagnets/coils
34 Filling material
35 Interfaces/contacts
36 Surface/envelope FIG. 21 shows, in a highly simplified form, one possible embodiment of a surface-area element in which (in contrast to the more specific design) the transducers have been represented by separate stator pole feet and square pole heads, and the electronic control mechanism has been simplified very roughly.

The base of the surface-area element is used both for mounting of the surface-area element in the form of a holder or a plug-in system, as well as for fixing of the transducers. Furthermore, the base contributes considerably to make the module robust, since the transducers are not directly connected to one another.

The power supply and the data supply for the transducers and the corresponding passing on to other surface-area elements or users are provided by means of lines which are laid in the surface-area element. Depending on the transmission medium and the type of transmission, an internal control element is connected inbetween, in order to control the corresponding transfer.

The internal control element or the internal circuit uses an integrated chip and the predetermined data from the external central platform control system to control the level, voltage and frequency of the power output. The strength, build-up over time, structure and configuration of the magnetic field can thus be predetermined and influenced by the user, via this control system.

In addition to controlling the transducers, the control element controls the power and data transfer from adjacent loads and the central platform control. Data relating to and from detected objects which are located on the surface-area element is passed on in a preprocessed form to the appropriate user. Furthermore, the chip contains a unique identification number, which denotes the purpose, form, position, etc. of the respective surface-area element.

Electrical power is supplied to each of the transducers via a line network which is located under or between the transducers. However, this must not influence potential magnetic fields or the robustness of the surface-area element.

The most practical way to supply adjacent surface elements is via interfaces located on the sides of the tiles. These interfaces should be arranged such that an incorrect contact between two supply lines is impossible when adjacent tiles are laid incorrectly. It must likewise be possible to compensate for minor vibrations, shifts and small gaps between the surface-area elements by means of the interfaces. Fixed plug connections which engage in one another have a high connection strength but generally consume a relatively large amount of space and their fitting is costly. Furthermore, they must have reasonable insulation in order to allow electric current to be passed on to any desired external users.

The configuration of the contacts can be oriented for normal contact connections, plug connections and/or sliding contacts. However, a sprung contact solution is preferable, which can be recessed in the surface-area element and ends flush with the side surface of the surface-area element in the pushed-in state. The surface of this sprung contact solution is curved in order to compensate for minor shifts between two adjacent surface-area elements and thus to maintain the electrical power and data supply. The position of the contacts on one side of the surface-area element is arranged such that no connection is possible between the contacts of the two surface-area elements when one surface-area element is aligned attached the opposite way around to another surface-area element.

Each transducer is surrounded by non-ferromagnetic filling material (not shown in FIG. 21). This is likewise used as a filler for missing elements in a surface-area element, and for heat dissipation, for the thermal coefficient of expansion and to improve the mechanical strength and protection against aggressive media and hazardous substances. This can be done in appropriate moulds or directly in the outer magnet body, for example by extrusion coating or encapsulation, thus reducing or entirely filling the air gaps between the coil and the iron circuit.

The surfaces are used as a protective envelope and for heat dissipation. They should be designed to be essentially smooth in order to keep the air gaps between the electromagnetic tiles resting on them and the contact surface (base) small. The uniformity of the surface furthermore allows the transport apparatuses to move without any disturbance on the platform. The edges of the envelope and of the surface-area element should be manufactured from the predominantly used material aluminum, which cannot be magnetized, in order to reduce costs and to provide a simpler recycling capability.

Figure 22:
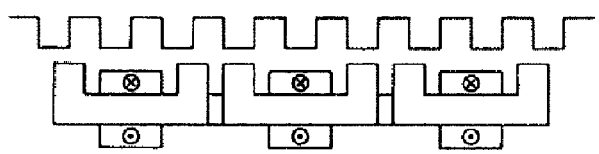
FIG. 22 shows the design/tooth system of a linear stepping motor and armature

The surface-area element influences the behavior of the transport apparatuses by the configuration of the transducers (teeth) and of the slots. The inductance is influenced by the scatter of the current in the slots and the end windings. The slot pitch and the configuration of the teeth also influence the cogging torque, the "torque ripple", the acceleration process and the braking process of the armature. The design and tooth system of a linear stepping motor and armature are illustrated in FIG. 22.

In addition to the conventional configuration of the surface-area elements in the form of tiles, it is worthwhile offering further combinational embodiments, in order to better match the platform to the spatial conditions and tasks.

Figure 23:
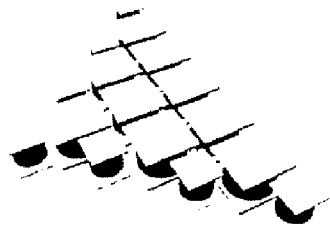
FIG. 23 shows a plan view of a triangular surface-area motor and of a round surface-area motor.
Figure 23:
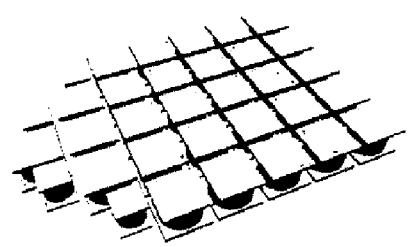

In particular, the shape is not restricted to rectangular surface-area elements. Round shapes or polygons are feasible. If the transducer elements were to have the same shape, empty spaces would occur therein because of the corresponding shape of the surface-area element. A modification to the normal matrix arrangement of the individual transducers in the tile is therefore necessary, or a shape adaptation of the design size of the relevant transducers. Further gaps that occur are filled with non-ferromagnetic material for robustness reasons (encapsulation). This is illustrated in FIG. 23.

Transport apparatuses which wish to change their position and orientation of horizontal surface-area elements in the platform to angled or vertically suspended subareas require corresponding adapter elements, depending on the configuration.

A simple solution is offered by three surface-area elements forming a combined surface-area element which is constructed with angles in three dimensions. This shaping is achieved by arranging the surface-area elements and/or transducers at different angles with respect to one another. The gaps caused by the angles are filled by non-ferromagnetic material. The connection between the surface-area elements is achieved by electrical lines and contact connection pieces, which are located in the resultant gap. When the transducers are activated, the effect of this is to form magnetic fields which thus exert a pulling movement on ferromagnetic objects and move them from a horizontal position to an angled position (see FIG. 24).

Figure 24:
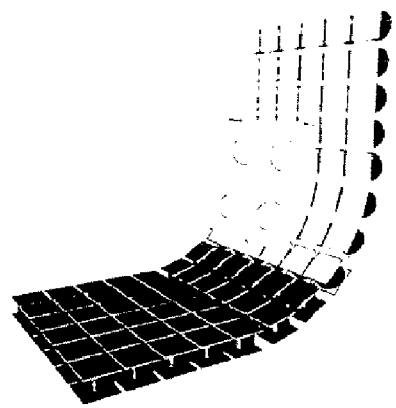
FIG. 24 shows a cross-section view of an angled surface-area motor from the side, and a cross-section view of a rounded surface-area motor from the side.
Figure 24:
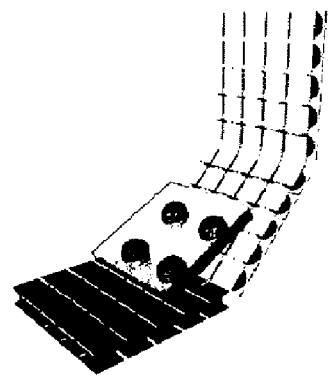

However, three-dimensional rounded shape variants of the surface-area element are also feasible (as illustrated in FIG. 24). This shape is achieved by arranging the transducers at different angles with respect to one another. The head parts of the transducers are moved closer to the head parts of the adjacent transducers than the stator foot elements. This shaping allows connecting surface-area elements between horizontally located surface-area elements and vertically suspended surface-area elements. When the transducers are activated, this leads to magnetic fields being set up which thus achieve a uniform pulling movement on ferromagnetic objects from a horizontal position to an angled position. Virtually any desired three-dimensional surface structure can therefore also be achieved by appropriately modified shaping of the surface-area elements.

Figure 25:
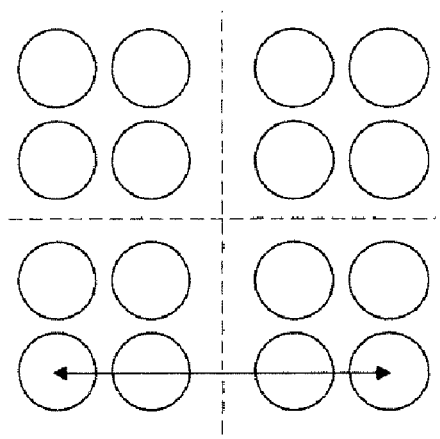
FIG. 25A shows a stator arrangement A.
FIG. 25B shows a stator arrangement B, illustrating a surface-area motor with an additional degree of freedom.
FIG. 25C shows a stator pole arrangement A with octagonal pole heads and an additional degree of freedom.
Figure 25B:
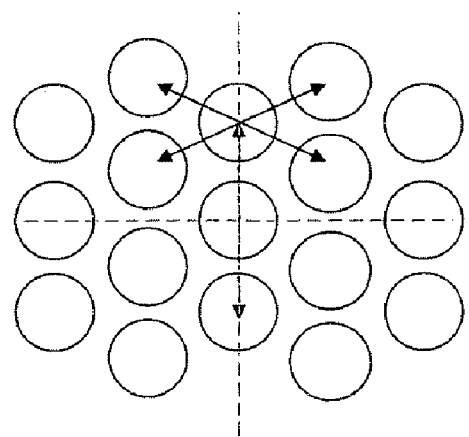
Figure 25:
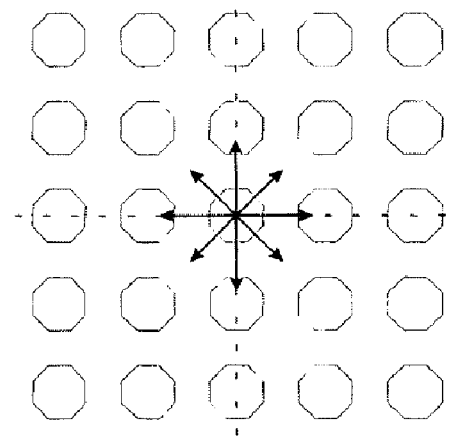

One extension to the surface-area motor is represented by the provision of a third degree of freedom in the form of rotation of the rotor/armature. In order to allow forces to be produced in the x direction and y direction in every position even when the rotor has been rotated, new stator pole arrangements must be developed for this application (see FIGS. 25A, B and C), since the multipole basic arrangement can no longer produce forces in some positions when rotated through 45°. It is necessary to check whether the cogging forces and the cogging torques of these arrangements allow worthwhile operation.

Depending on the object and the spatial conditions, the configuration of the platform must be subordinate to a certain power network topology or data network topology with corresponding interface elements. However, this should be done in the sense of the best-possible integration capability into other networks, and taking account of potential users and consumers.

3.2 Design Overview and Layout

Figure 26:
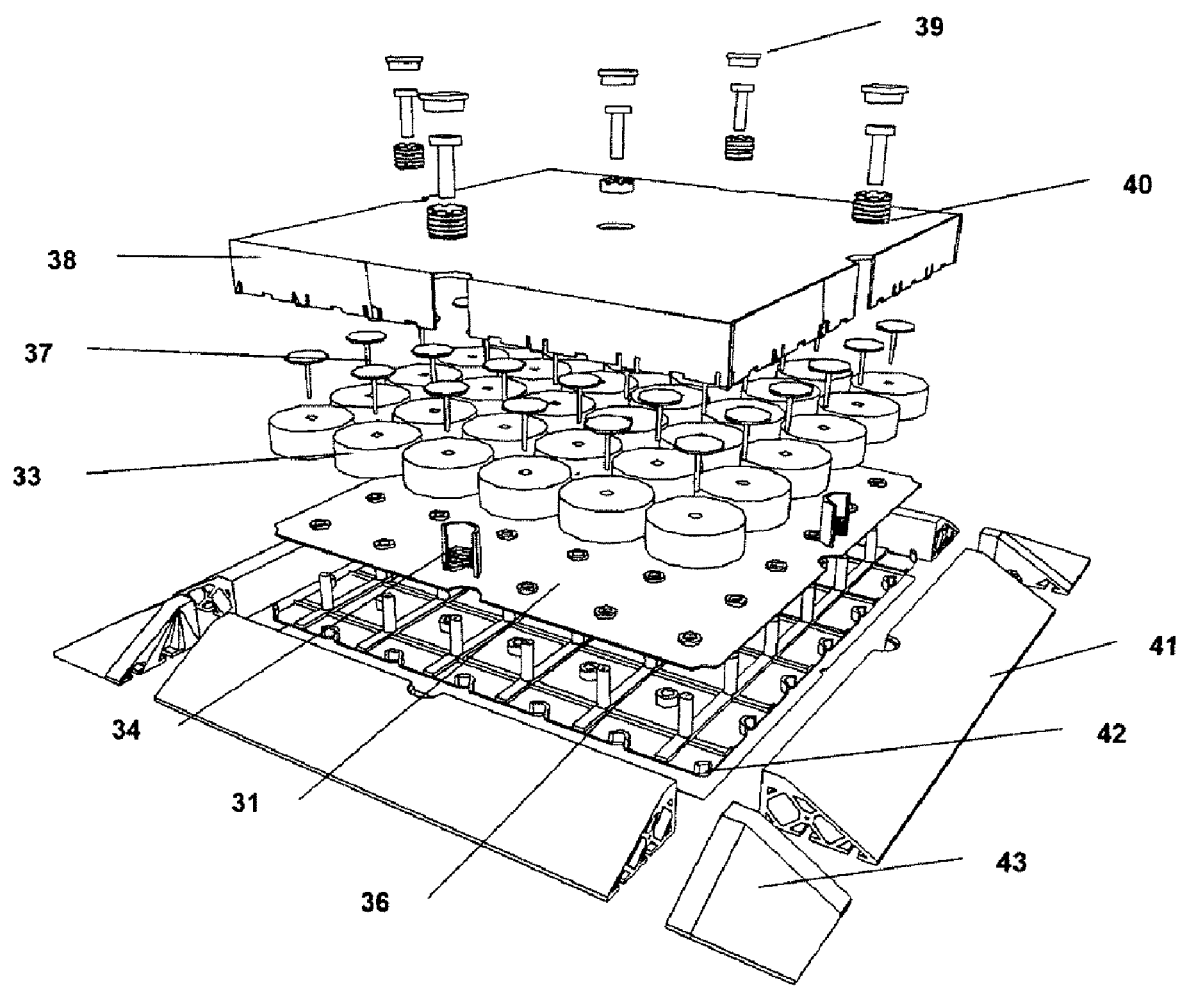
FIG. 26 shows a fanned-out surface-area element with an inclined frame and screw connections.

FIG. 26 shows a spread-out surface-area element with inclined frames and screw connections, with the following parts:

- 36 Stator plate with struts, stator plate rings, axes and yokes, . . .
- 31 Board/mounting board for the electronics (MOSFETs, conductor tracks, controllers, chips, . . . )
- 34 Contact points/interfaces
- 33 Transducers/encapsulated windings/coils
- 37 Pole surfaces/stator heads with axes and yokes/stator poles
- 38 Surface-area element surface/envelope comprising envelope walls and envelope cover/housing comprising housing walls and housing cover
- 39 Diaphragms/diaphragm buttons/hole closures/diaphragm attachments
- 40 Screws
- 41 Platform edge/edge incline/platform frame
- 42 Envelope base—part of the surface-area element surface
- 43 Platform edge corner inclined/frame corner inclined

3.3 Size Versions

Figure 27:
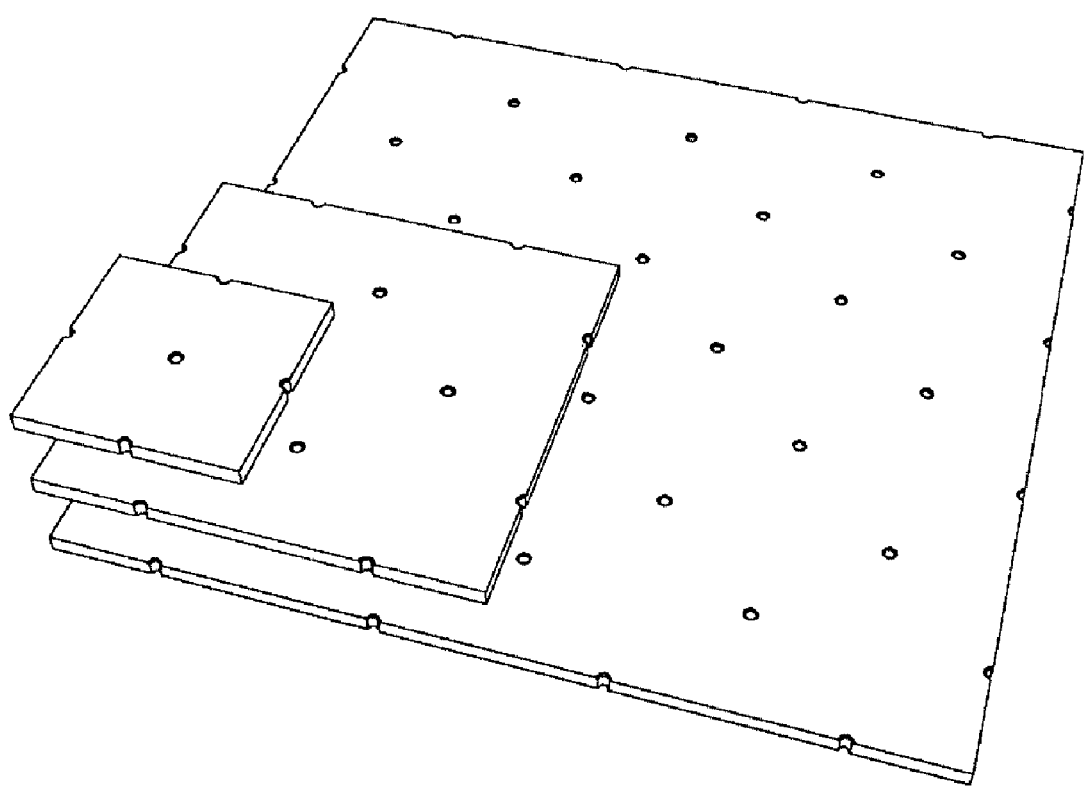
FIG. 27 shows surface-area elements with sizes of 250×250 mm, 500×500 mm and 100×100 mm.

Three size orders of surface-area elements are favored for the prototype of a platform, with the edge length 250×250 mm, 500×500 mm and 1000×1000 mm (see FIG. 27). The height of all the embodiments must be identical. In order to provide sufficient free space for all of the elements and to allow appropriate robustness in the design, the height is fixed at 25 mm. Special sizes should be manufactured only in the case of extremely different tasks, for example the movement of very heavy loads or requirements covering large areas. The compatibility with surface-area elements of other size orders must, however, always be ensured. This relates inter alia to the design, the arrangement of suspensions, contact points/interfaces, elements providing robustness, etc.

3.4 Combination Methods

Figure 28:
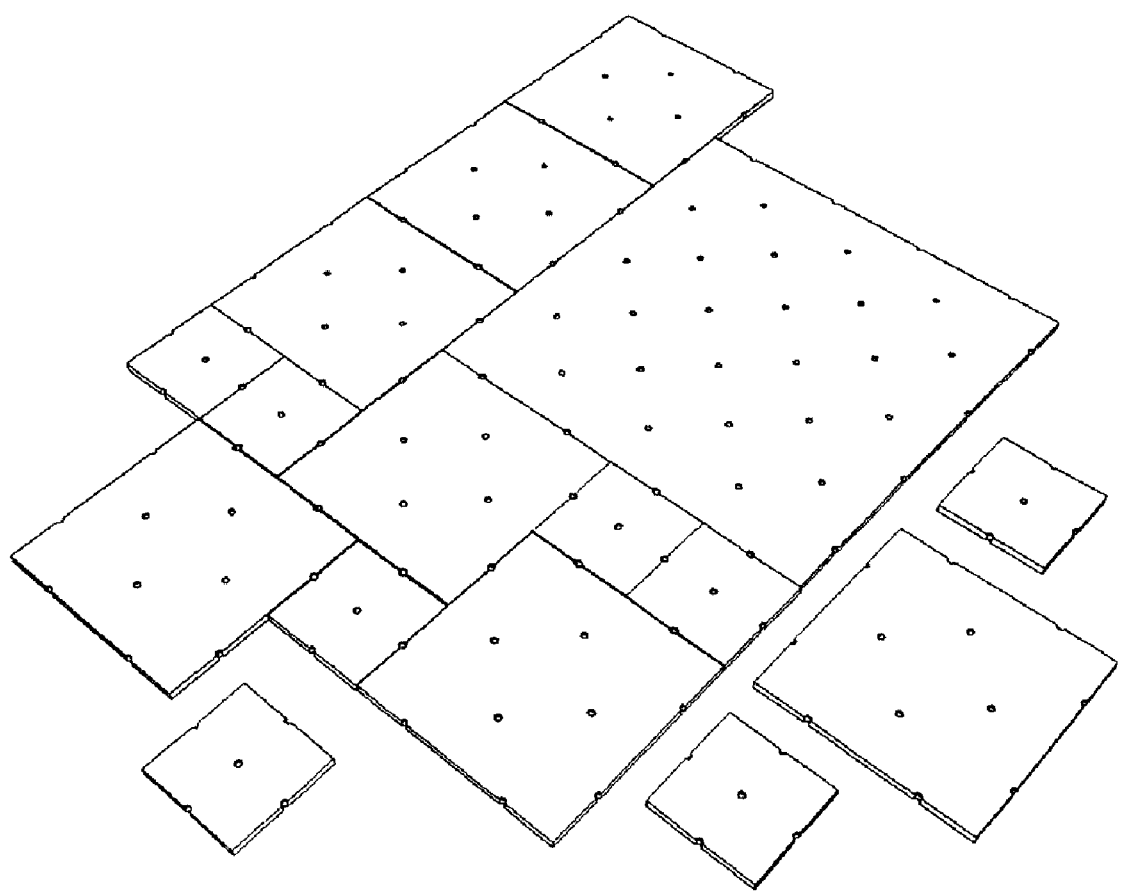
FIG. 28 shows a platform with combined surface-area elements.

The side sizes of the surface-area elements are chosen such that different size types can be combined with one another, resulting in a surface area or platform which is matched to the architecture. This is illustrated in FIG. 28.

Cutouts for fixing the surface-area elements by means of screw connections to the subframe and to the adjacent surface-area elements are provided symmetrically on the sides and in the interior of the surface-area elements, at the same distance apart. These assist the combination of the individual surface-area types, in the same way as the respective side ratios.

The cutouts are likewise used as a contact interface for transferring current and data to adjacent surface-area elements and external beneficiaries and apparatuses.

Figure 29:
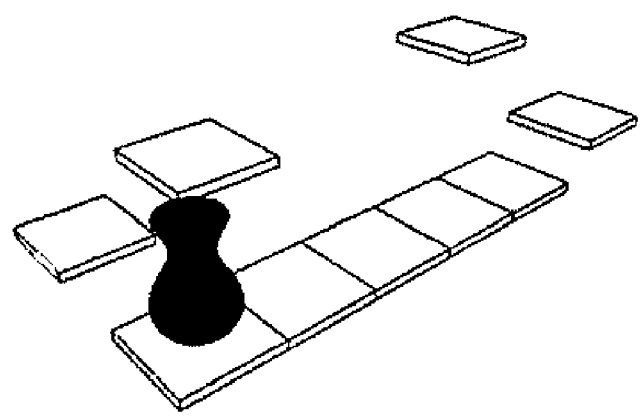
FIG. 29 shows combined surface-area elements for platform production.
Figure 30:
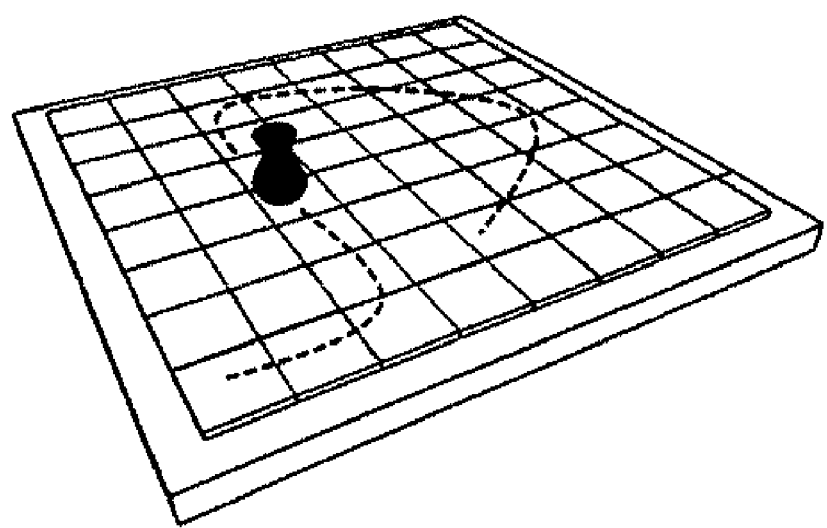
FIG. 30 shows electromagnetic platforms for automated simultaneous individual driving of an individual transport apparatus.

Further surface-area motors are illustrated in FIGS. 29 and 30.

3.5 Stator Foot/Stator Plate

Figure 31:
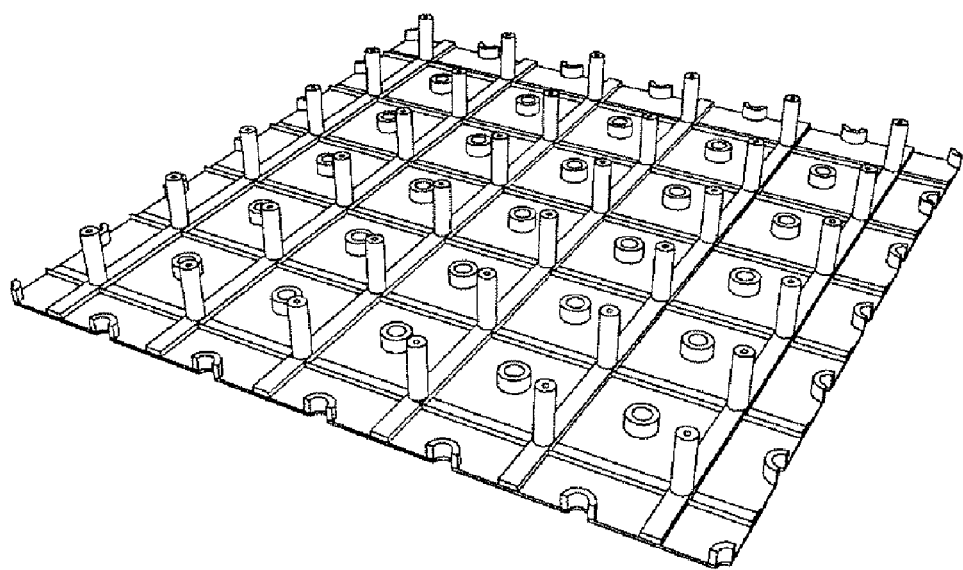
FIG. 31 shows a stator plate with coil axes, struts and connection elements.

The stator plate (see FIG. 31) in this embodiment acts as a connecting and stiffening element for the entire surface-area element, and at the same time as the stator foot for each coil. It comprises an iron casting, or some alternative material. The axes/stator yokes for the windings of the coil formers project from the baseplate. In addition to fixing the pole heads and the coils, these also fix the electronic assemblies. Furthermore, they absorb all the vertically acting forces which act on the surface-area element, for example from the transport apparatuses.

In this favored illustration, the axis structure and pole structure are designed to be square/in the form of a checkerboard, for reasons of symmetry. A variation of the yoke arrangement would interfere with the symmetrical configuration of the overall platform and the magnetic travelling wave with adjacent surface-area elements, but is feasible in special circumstances. Struts run between the individual axes.

These struts provide the structure with additional stiffness and provide robustness for the individual axes. Furthermore, they offer additional material for closing the circuit for the magnetic field induction between the respectively energized coils. A ring structure is created centrally, centered from the respective squares of the checkerboard structure. This contributes to the fixing of the surface-area elements on the subframe and adjacent surface-area elements. In order to achieve coils with a uniform efficiency and to keep eddy currents the same, ring elements without any specific mechanical purpose are also incorporated in the stator plate. The method of operation will be described specifically in detail in the section relating to interfaces and fixing.

3.6 Board

Figure 32:
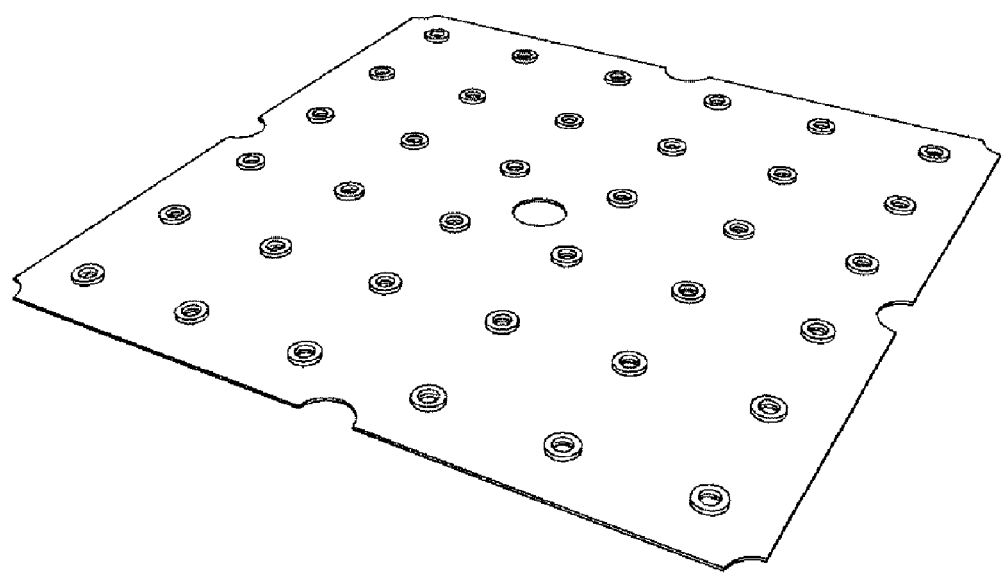
FIG. 32 shows a board with stabilization rings.

The board acts as a mounting plate for the electronic components of the surface-area element. The holes and cutouts are positioned such that the board can be suspended on the axes of the stator plate. Hard rubber rings under and on the holes provide fixings, trap fine-frequency vibrations and raise the electrical devices to the optimum height, thus attenuating heat fields produced by the coils. This is illustrated in FIG. 32.

Figure 33:
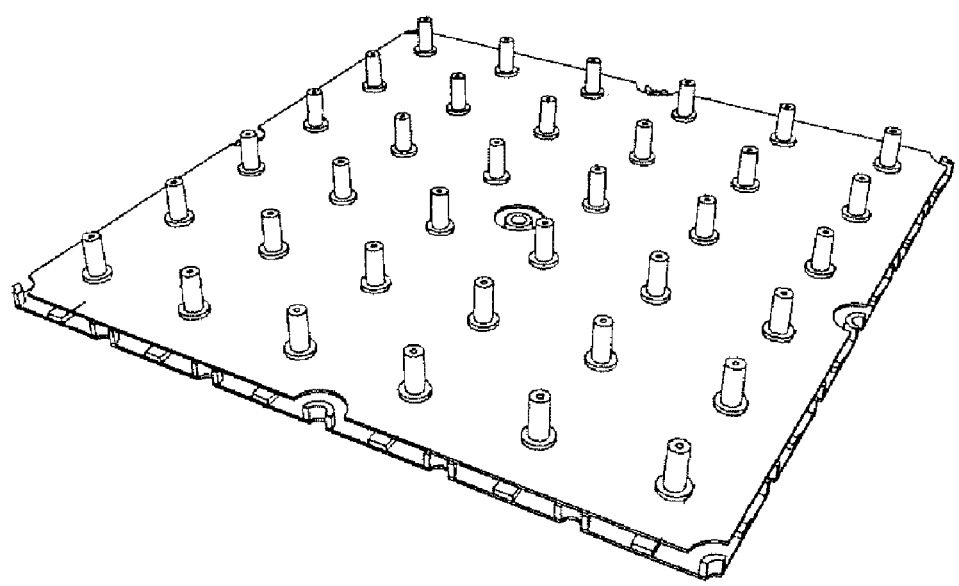
FIG. 33 shows a stator plate with a board fitted.

Accurately fitting cutouts for the interfaces/contact points, suspensions/fixing and reinforcing struts for the envelope of the surface-area element, as well as a cutout in the center, are located on the sides of the board. The cutouts are tailor-made such that they are adjacent to the surface-area element contact points, and can be soldered and adhesively bonded to them. This is illustrated in FIG. 33.

3.7 Coils/Transducer

Figure 34:
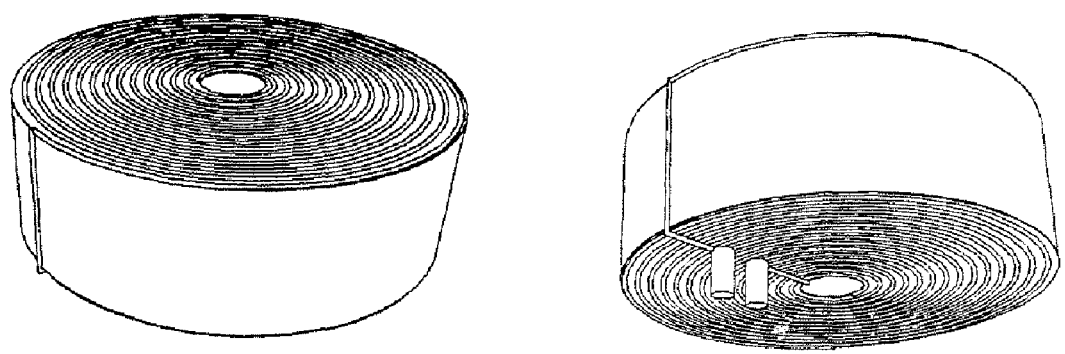
FIG. 34A shows a plan view and lower face of a coil.
FIG. 34B shows the coils encapsulated with two different materials.
Figure 34:
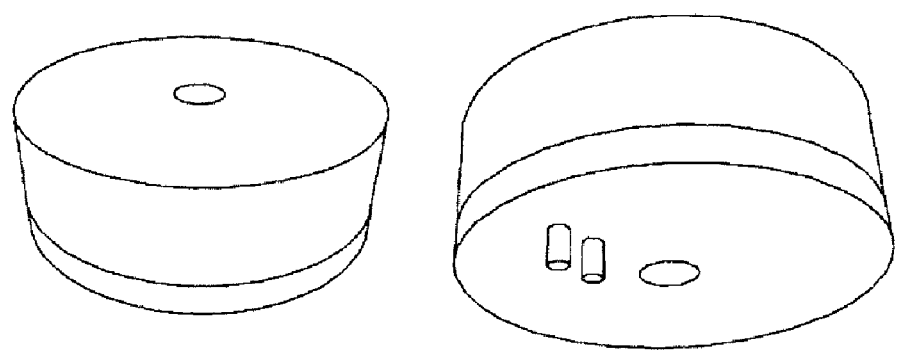

Coils are prefabricated such that they fit accurately, before fitting to the axes of the stator plate above the board. They are composed of lacquered copper wire or preferably lacquered aluminum wire (see FIGS. 34A and 34B).

A round coil format is preferred in order to achieve as large a number of windings as possible with little use of material. The winding is produced from the bottom along the stator axis upward and then back downward over the first winding. One winding is produced as a layer over the previous one, from the inside outward. This results in a wire start in the center on the lower face of the coil. This wire start is also reinforced by a contact element. The wire end emerges on the side edge (on the upper side edge in the figure) of the coil. The wire end is likewise reinforced with a contact element. In order to ensure that heat is transported away from the energized coil, in order to fix the wire in its coil shape, and to design the coil such that it can be handled, the wire is encapsulated with two non-conductive materials during the winding process itself. The upper encapsulation material dissipates the heat outward to the surface of the surface-area element. The lower encapsulation material at the foot of the coil isolates the heat that is created from the interior of the surface-area element. Furthermore, the wire ends and therefore the connected contacts are likewise fixed by the encapsulation.

Figure 35:
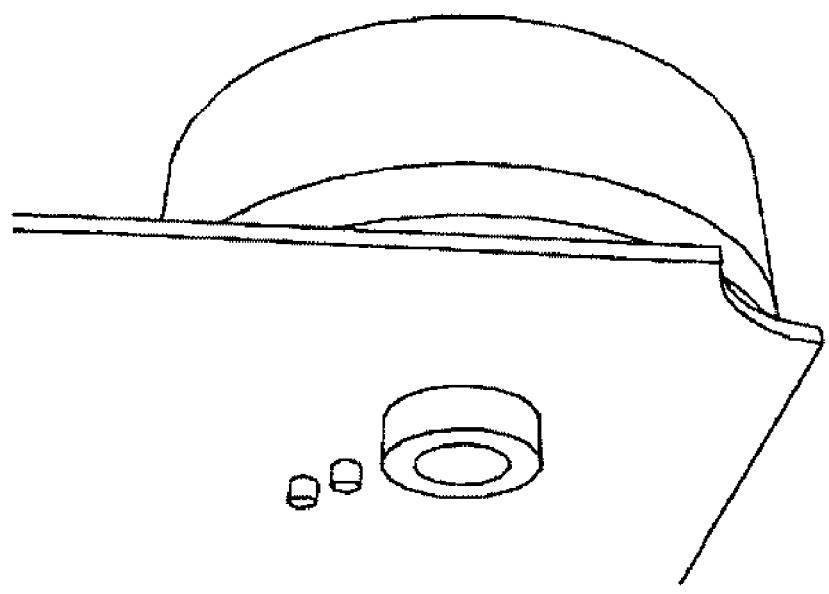
FIG. 35 shows an encapsulated coil placed on the board.
Figure 35:
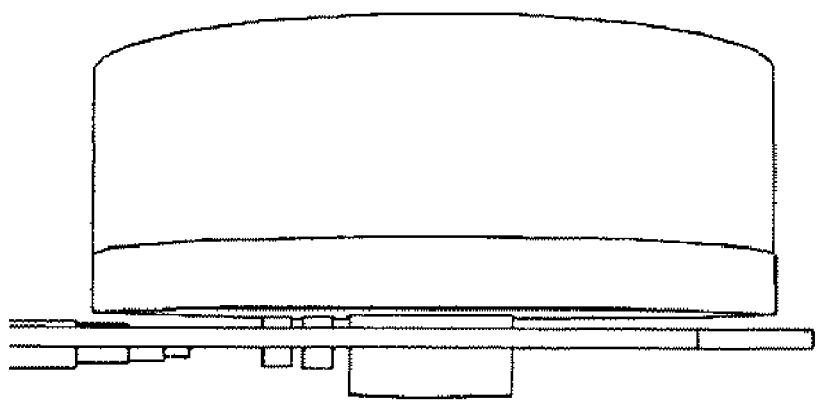

When the coil that has been manufactured in this way is placed onto the shaft of the stator axis, the coil contacts engage in correspondingly designed contact holes in the board and are split into the control electronics for the surface-area element. This is illustrated in FIG. 35.

Figure 36:
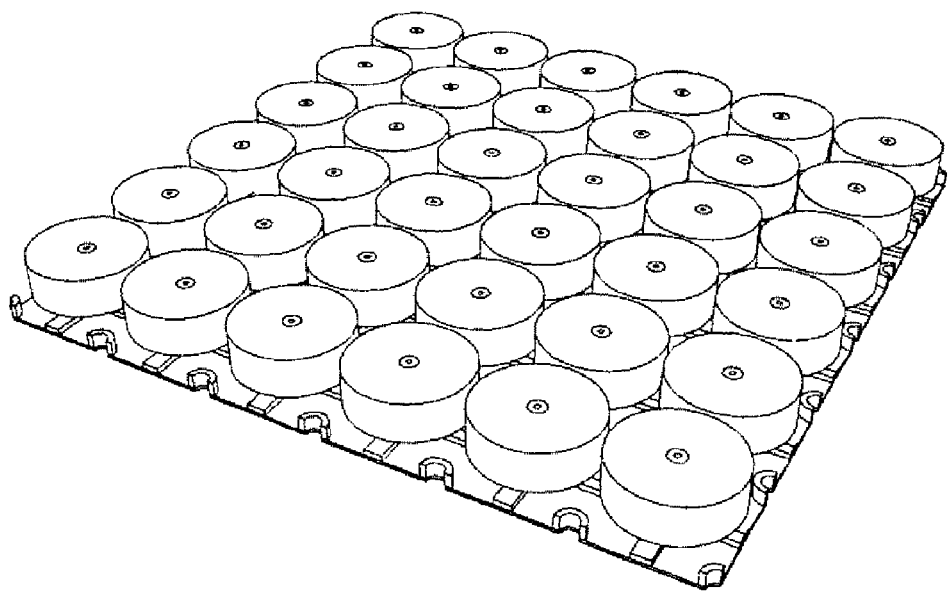
FIG. 36 shows a stator plate with coils fitted.

All the coils are placed on the stator axes of the stator plate (as illustrated in FIG. 36). The configuration is symmetrical and is kept the same in all surface-area elements in order to keep eddy-current discrepancies small, to guarantee the combination and to optimally implement the harmonized regulation of the coils.

The number and the diameter of the coils result from the width of the surface-area element and of the contact points/interfaces placed on the sides and in the inner area of the surface-area element. The coil diameter of the coils is the same, half, twice as great, etc. in all the surface-area element types—in order to ensure the symmetry and function between all the surface-area element types. However, the height of a coil may vary in the different types of surface-area elements.

An identical distance/space has been provided between individual coils. This is used to dissipate heat that occurs, and is created by energized coils. Furthermore, it can be used by electrical/control system components for which there is insufficient space in the lower board segment of the surface-area element, or which project from it. Furthermore, the empty spaces accommodate contact points/interfaces of the surface-area element and in this way allow power and data to be interchanged between the surface-area elements, or to be interchanged with external apparatuses. The free spaces are likewise used as a cutout for fixing the surface-area elements on the subframe and to one another.

In one alternative method, the coil can be printed in horizontal disks. These disk coils are placed one on top of the other, are encapsulated in layers with insulating material/insulating lacquer, or are printed using a 3D method.

3.8 Stator Pole Heads

In the case of surface-area elements, the stator of a coil is split into the stator foot (the stator plate) with the stator shaft and the stator head. The stator poles are separated. This is advantageous during production and during repairs since individual elements (for example a board, coils, . . . ) can easily be plugged on/and removed and can easily be fixed to the stator plate.

Figure 37:
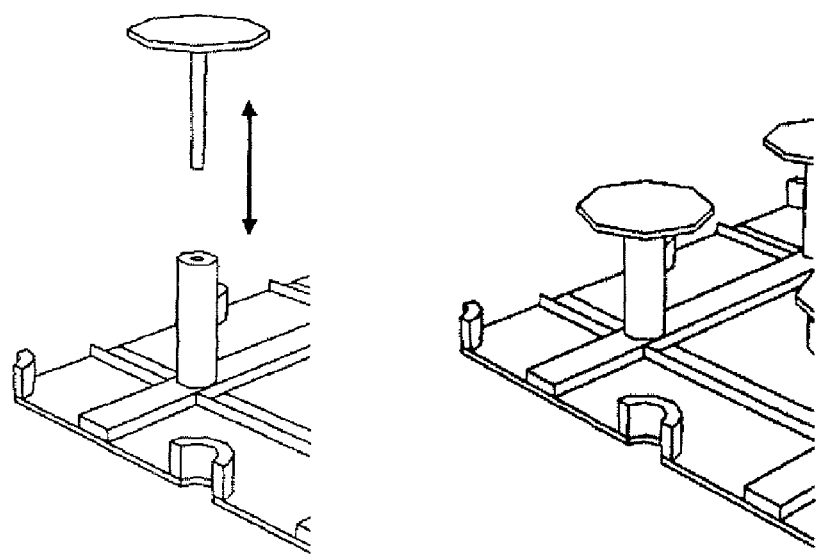
FIG. 37 shows how a stator head is countersunk in a stator plate.

The (octagonal) pole heads are inserted with their centered pin into an accurately fitting hole in the corresponding stator shaft (as illustrated in FIG. 37). Alternatively, they can also be screwed in with the aid of a thread on the pole head pin and the stator plate axis hole.

The advantage of the screwing-in method is the robust, pressed fixing of all the elements which are plugged on under the pole head. However, the thread can lead to irregular eddy-current fluctuations and in some circumstances can complicate the regulation of the individual coils.

The plug-in method is in turn dependent on a high fit accuracy between the pole head pin and the stator plate axis hole. When the pole head is fixed, for example, by adhesive bonding expansion processing (icing of the components during production, with the pole pin, whose diameter is slightly broader, expanding again at normal temperature and being pressed into the stator plate axis hole) or pressing, although simple element replacement or good production would be impossible in this case.

Figure 38:
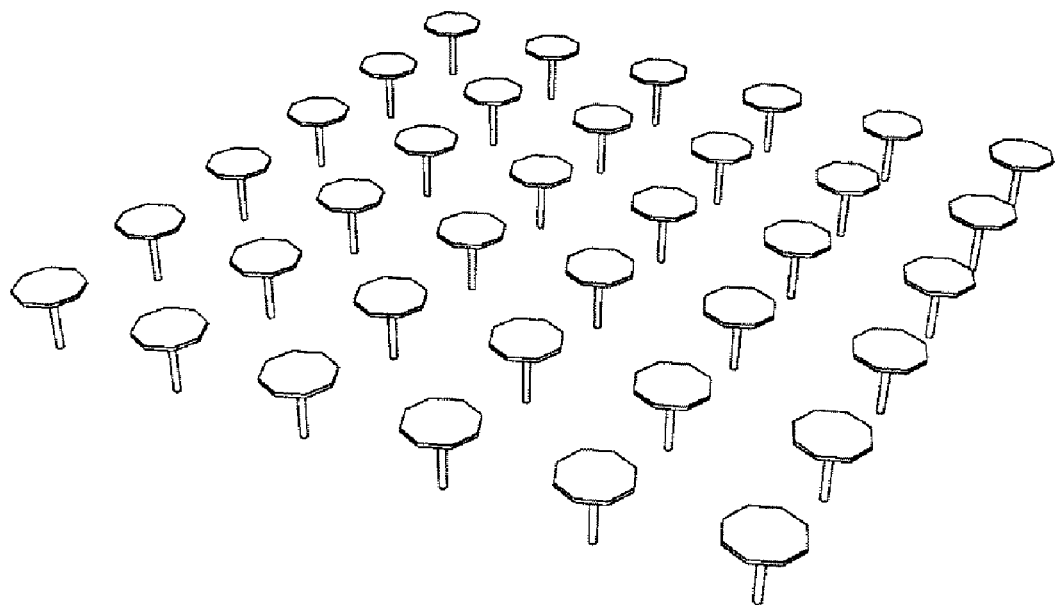
FIG. 38 shows how the pole heads are countersunk into the axes of the stator plate after the coils have been fitted.
Figure 38:
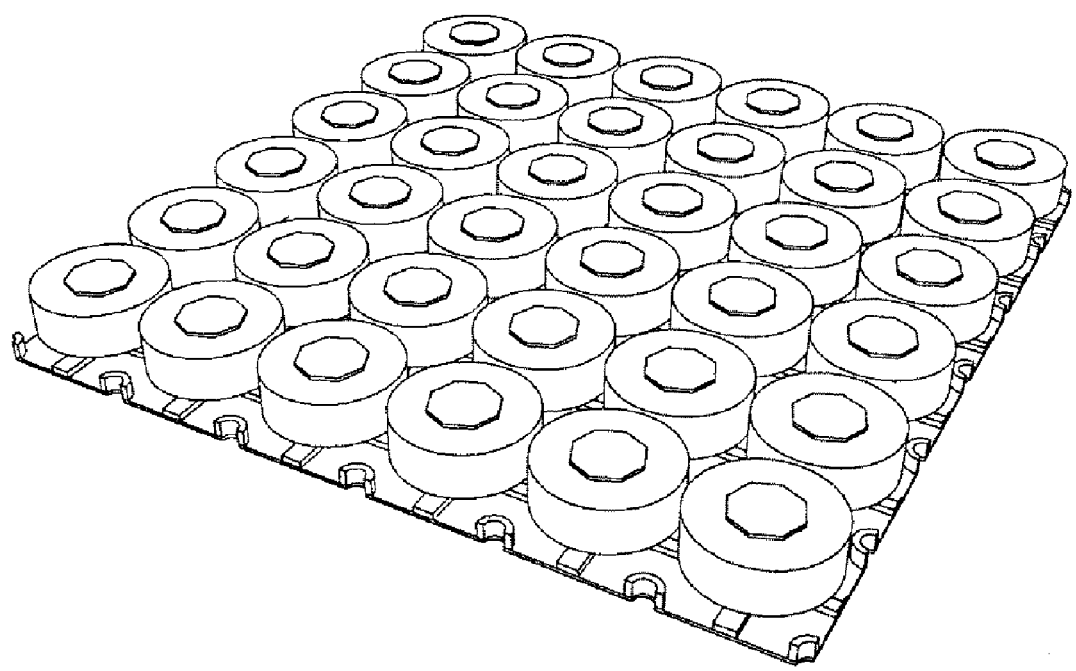

The recessing of the pole heads into the shafts of the stator plates after plugging on is illustrated in FIG. 38.

3.9 Combination/Fixing Points

Figure 39:
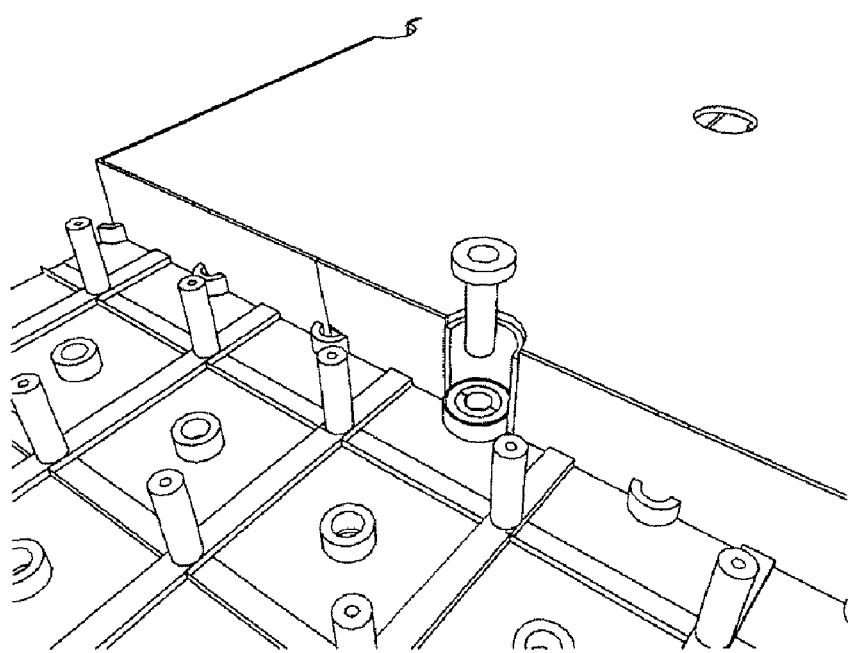
FIG. 39 shows two different surface-area elements (transparent illustration)
Figure 40:
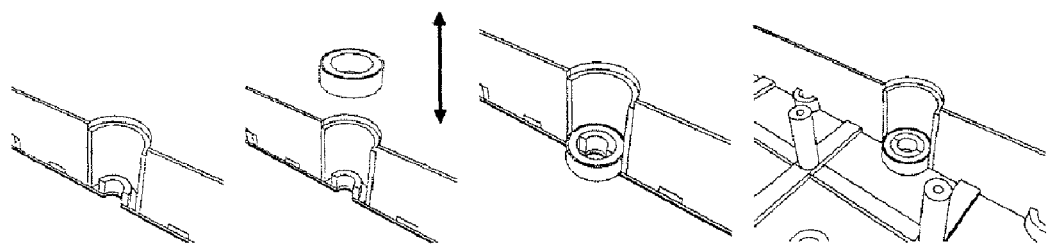

In order to allow the surface-area elements to be fixed to the subframe and to be connected to the adjacent surface-area elements, cutouts for apparatuses such as these are provided on the sides and in the interior of the surface-area elements. The purpose of the fixing apparatus is to draw the surface-area elements together—to combine them—and at the same time to firmly connect them to the subframe. This is made possible by ring elements which project out of the stator plate in the cutouts, over which an accurately fitting fixing ring can in turn be plugged/screwed. The two surface-area elements are drawn together via the ring elements thereof, and are pressed against one another with an accurate fit. This results in the two surface-area elements being fixed and combined with an accurate fit. This is illustrated in FIGS. 39 and 40.

The fixing ring is surrounded by a non-conductive protective layer (plastic, rubber) on the surface. This allows a certain amount of play in order to allow the ring to be removed more easily, acts as corrosion protection, and acts as an insulator with respect to potential contacts on the inside of the cutouts, and as self-fixing in the cutout in the surface-area elements.

Figure 41:
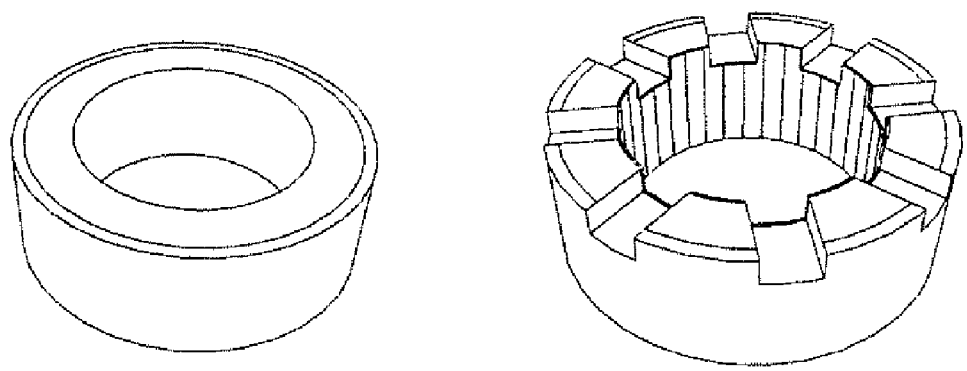
FIG. 41 shows a fixing ring which can be plugged on with an isolation layer, and a fixing ring which can be screwed on with an isolation layer.

At the moment, two types of fixing ring are possible: a fixing ring which can be plugged in and a fixing ring which can be screwed on (see FIG. 41).

The fixing ring which can be plugged in is easier to manufacture during production, and its design is more robust. However, it must be levered out of the inner stator plate ring over the insulating layer, for example using a screwdriver or by angling of the surface-area elements with respect to one another.

The fixing ring, which can be screwed/screwed on, has a concealed thread on the inside, which assumes that there is an accurately fitting thread on the outsides of the stator plate rings. Furthermore, teeth and cutouts, in which a screwdriver can engage, are located on its head surface. This fixing ring can be screwed onto the rings of the stator plate in this way. This is advantageous because it allows the ring to be screwed in and screwed out, and in consequence allows rings and surface-area elements to be replaced easily. The disadvantage is the complex production of the accurately fitting thread for the stator plate rings during production, which have to engage exactly into the thread of the fixing rings.

In addition to the fixing of the surface-area elements, the fixing ring furthermore provides a capability, by pulling the stator plates together, to transmit the eddy currents from energized coils via one surface-area element to the adjacent surface-area element, and in this way to achieve an indirect unit of coil action for the entire platform. The platform acts as one uniform surface-area element.

Figure 42:
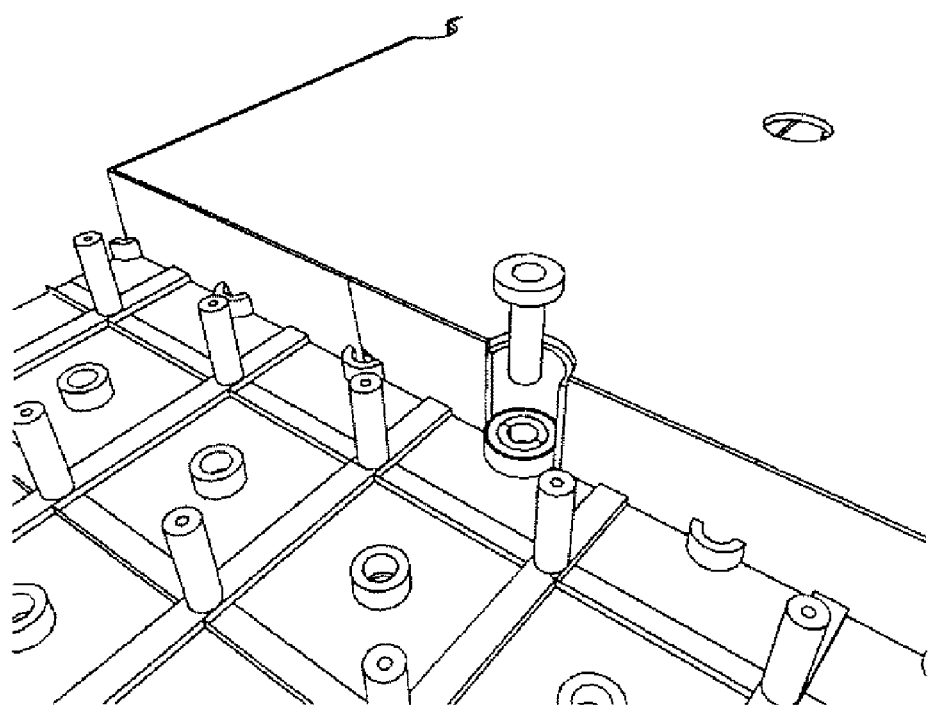
FIG. 42 shows how adjacent surface-area elements are drawn together by a fixing ring via the ring elements of the stator plate, and are fixed to the substrate by means of a countersunk screw.

In order to achieve fixing to the subframe, a conventional screw is passed through the inner ring (of the stator plate) and is screwed to the subframe. The screwhead presses the fixing ring onto the stator plate ring and hence the latter onto the stator plate, and at the same time screws the stator plate and the surface-area element onto the subframe. This is illustrated in FIG. 42.

Alternatively, it would be feasible to use a screw with an attached/pressed fixing ring (insulated on the side) in order to allow faster construction of the platform.

The insulating plastic encapsulation/the envelope baseplate, an insulating closure on the head of the cutout and an insulation washer on the screw result in an insulated cavity, which shields the contacts of the surface-area element from external influences, for example moisture and weather, and protects them against corrosion.

3.10 Interfaces/Contact Points

Figure 43:
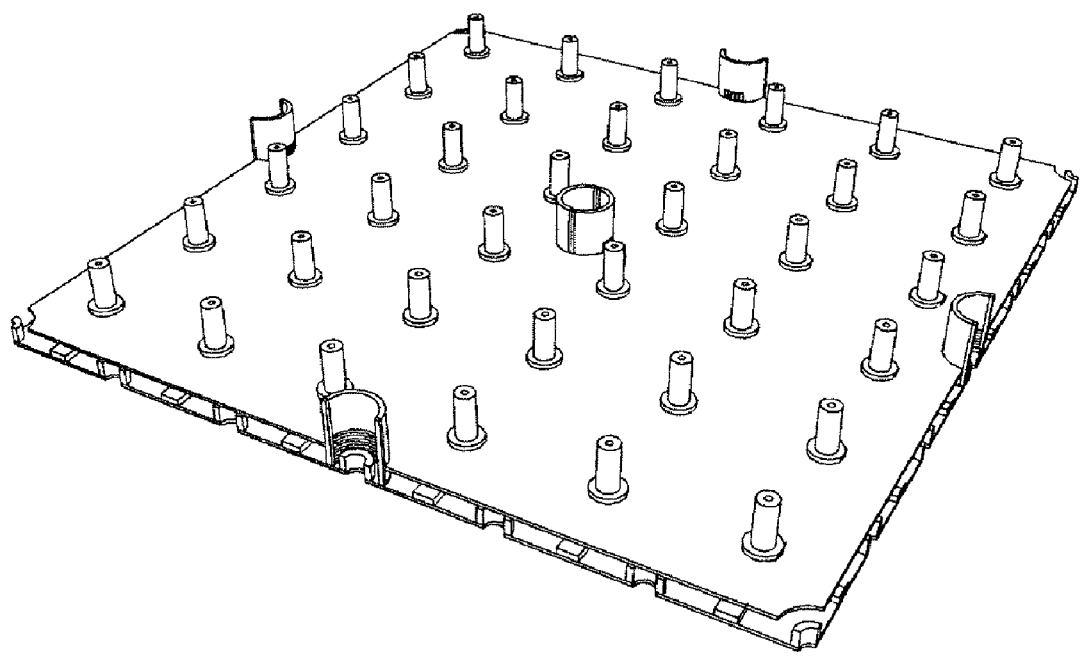
FIG. 43 shows a board, a stator plate and contact points.

The interfaces or else contact points are located symmetrically in the appropriate cutouts in the surface-area elements. Data and current are interchanged via them between adjacent surface-area elements and external beneficiaries/apparatuses. This is illustrated in FIG. 43.

Figure 44:
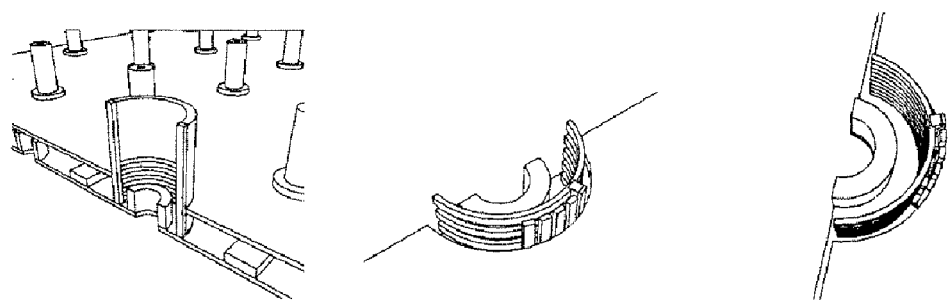
FIG. 44 shows a contact point that is being included, and contact material boundary with the board.

The half-round and round tubular contact points are adhesively bonded or welded to the envelope/housing of the surface-area elements. However, they may also be a fixed component of the housing and may be placed together onto the components of the surface-area element during production. Furthermore, in some circumstances, they are soldered and adhesively bonded to the board and are therefore included in the electrical system of the tiles. The contact points are placed on the appropriate stator plate rings on the stator plate. This is illustrated in FIG. 44.

Figure 45:
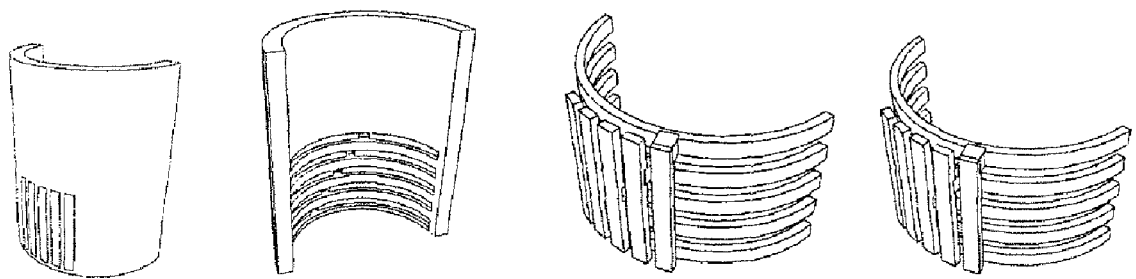
FIG. 45 shows a contact point with contact material and contact material, in each case from two perspectives.

The round or half-round contact point is composed of insulation material and a contact material (copper, solder, . . . ) matched to the curvature. The contact structure is provided with cutouts such that it accommodates the contact lines in an appropriately flush form. The individual contact lines run separately from one another in the interior of the round/half-round element, in layers one above the other. The conductor tracks run on the outside of the round structure, incorporated vertically in the surface. This is illustrated in FIG. 45.

Apertures are provided in the structure in layers for the respective contact lines and connect the individual lines of the inner round element to the appropriate vertical conductor tracks on the outer round element. The lines of the inner round element run such that they do not make any direct connection to contact points on the next attached surface-area element. A connection is produced only by a correspondingly configured and positioned fixing ring or a contact element in the cutout. This physical separation of the lines from one surface-area element to another surface-area element allows mechanical activity monitoring, deliberately by the user, of a surface-area element. Software errors, control errors, bad contacts and inadvertent electrical connections can be overcome in this way. Only surface-area elements which are connected to one another by a contact apparatus can interchange current and data.

Figure 46:
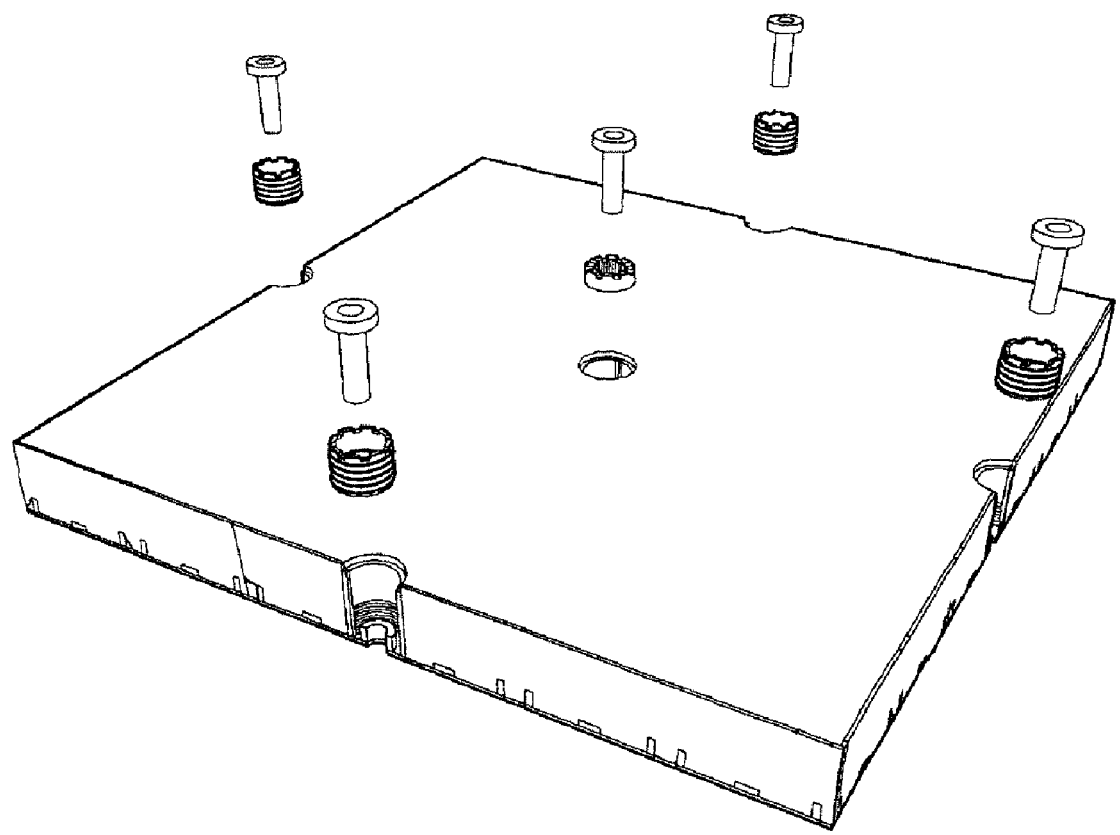
FIG. 46 shows contact and fixing points of the surface-area element with contact fixing rings and respective screws, as well as a contact and fixing point with a fixing ring and corresponding screw in the surface-area element center.
Figure 47:
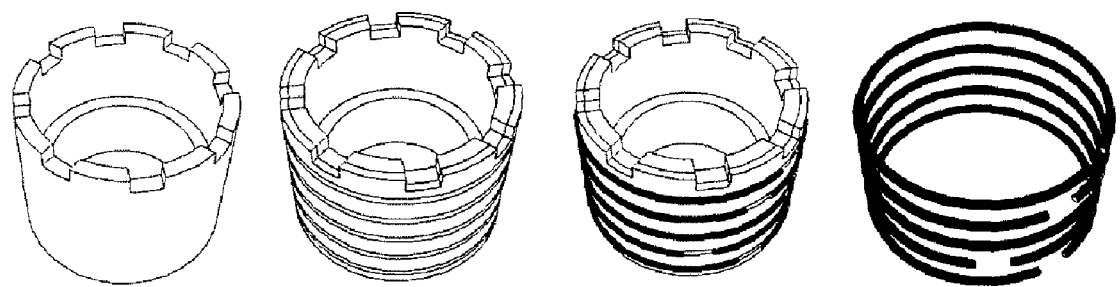
FIG. 47 shows a bare contact fixing ring, a contact fixing ring with an isolation layer, a contact fixing ring with an isolation layer and contact rings fitted, and a contact ring structure without a contact fixing ring.

The contact fixing rings (as illustrated in FIGS. 46 and 47) are equivalent to the already described fixing rings. They are likewise plugged/screwed onto the stator plate ring and force the adjacent surface-area elements together. Their external curvature is likewise provided with an insulation layer. Annular electrical conductor tracks are incorporated in this insulation layer, at the appropriate height with respect to the contact layers of the contact points of the surface-area element. These conductor tracks each accommodate a contact ring, which makes the electrical connection via the contact points of the adjacent surface-area elements thereto. The contact rings that are incorporated have a slightly larger radius than the contact fixing rings and the contact points. They are interrupted at one point. This results in a spring effect which forces the contact rings, the radius of which is larger, onto the contact lines of the contact points of the surface-area elements when being screwed/plugged in. The interruption in the contact ring makes it possible for the material radius to be reduced in the plugged-on/screwed-on state.

Figure 48:
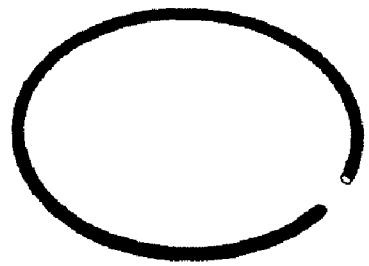
FIG. 48 shows a single contact ring.
Figure 49:
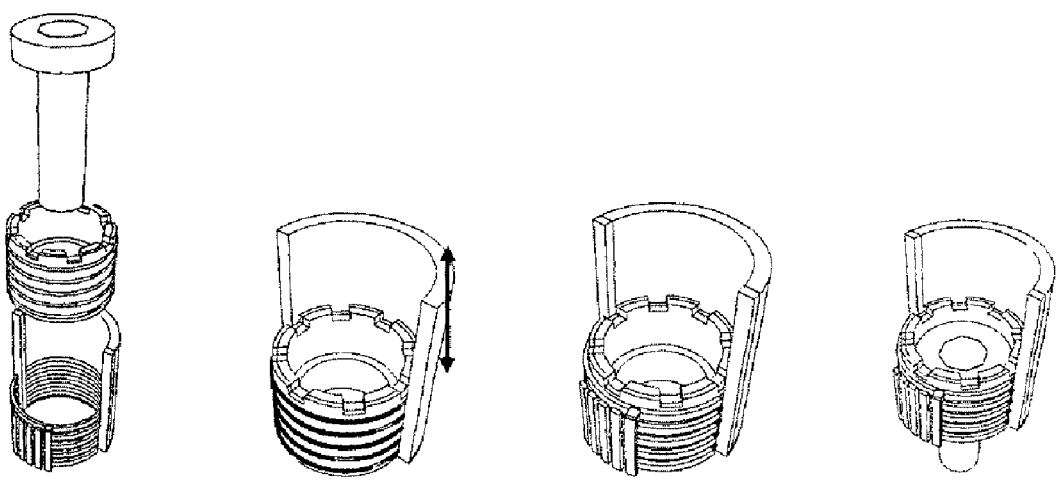
FIG. 49 shows a screw with a contact fixing ring and contact points of the surface-area elements: open, with a countersunk contact fixing ring and with a countersunk screw.

The contact fixing rings and fixing rings (see FIG. 49) may have an internal inclination. A screwhead which projects through the larger radius beyond the screwthread rests on this inclination. When a screw connection is being made, the screwhead therefore furthermore presses the contact fixing ring or the fixing ring against the corresponding ring element of the stator plate. This furthermore guarantees the fixing of the contact rings (FIG. 48) at the correct height with respect to the contact points and contact lines of the surface-area elements.

Figure 50:
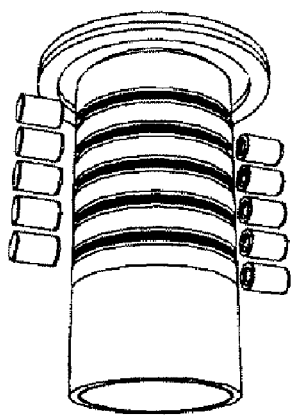
FIG. 50 shows a contact fixing ring with spherical contacts in the surface-area elements.

Alternatively, it is possible to accommodate rigid contact lines in the cutouts in the insulation layer of the contact fixing rings, and to accommodate spring-mounted ball contacts in the contact points of the surface-area elements (see FIG. 50). The sprung balls would be forced against the contact lines of the contact fixing ring during recessing of the latter, in this way allowing an electrical connection to be made. However, this solution provides only a point connection. In the event of corrosion on one of the ball contact points, the electrical connection would be interrupted.

3.11 Additional Usage Functions of the Interface and Contact Point

Figure 51:
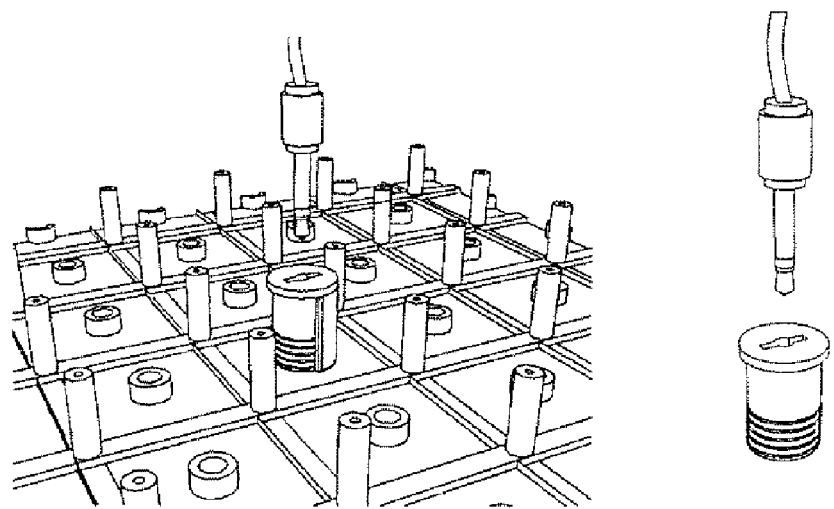
FIG. 51 shows a countersunk contact adapter with a plug apparatus.

In addition to transmission of data and power between the surface-area elements of the platform, the respective contact points are also intended to be available as a data and power interface for external beneficiaries/apparatuses. This allows power to be supplied to external apparatuses and/or data to be interchanged through a contact adapter (see FIG. 51).

Contact adapters which are manufactured specifically for the respective application type can be recessed or screwed into the cutouts and contact points of the surface-area elements.

Figure 52:
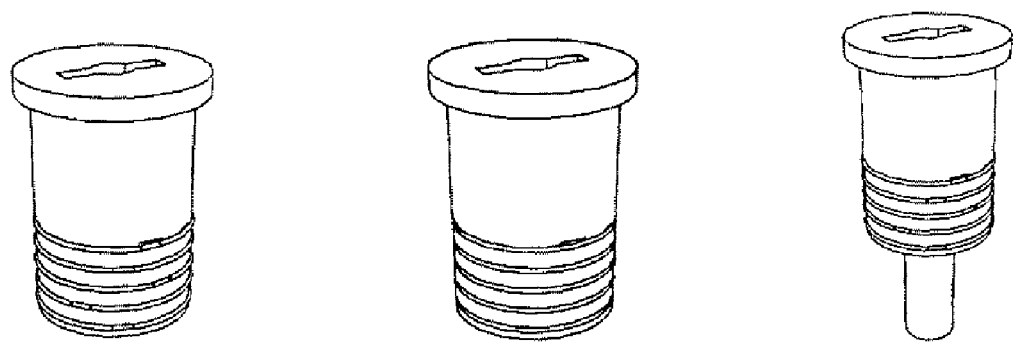
FIG. 52 shows a contact adapter with ring contacts, a contact adapter without ring contacts, and a contact adapter with a projecting screwthread.

They tap off the current via the surface-area element interface in the same configuration as the contact fixing rings. Contact rings which are incorporated in the insulation layer likewise press against the contact lines of the surface-area element interfaces and make an electrical connection in the same way. The contact adapters' size extends up to the surface-area element surface and they fill the inclination in the cutout in the head (possibly flush or projecting). A slot in the head of the contact adapter allows it to be screwed into the cutout in the surface-area element, and to be tightened firmly. Since a screw connection between the surface-area element and the subframe is not always desirable, there are two types of contact adapters: contact adapters with an internal thread which are screwed over the stator plate rings, and contact adapters with a screwthread which projects downward, and which furthermore likewise fix the surface-area elements to the subframe. This is illustrated in FIG. 52.

Figure 53:
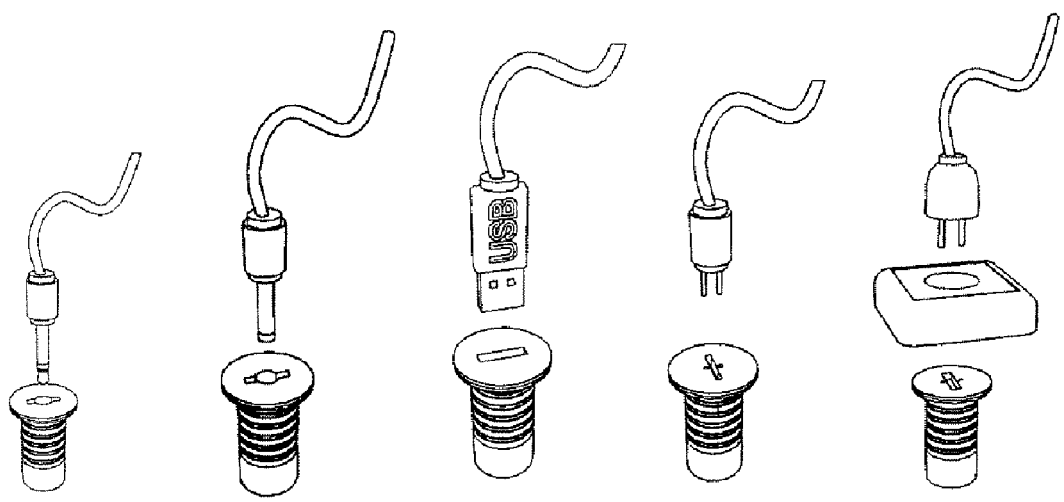
FIG. 53 shows various plug apparatuses which can be plugged into a contact adapter.
Figure 54:
FIG. 54A shows the front view of a side wall with cutouts.
FIG. 54B shows the rear side of a side wall with cutouts and struts.
Figure 54:

A specific inlet for various plugs from external beneficiaries is in each case fitted to the head of a contact adapter. A contact adapter internal apparatus and wiring carries the appropriate current and/or the corresponding data to the respective area of the inserted plug. No specific internal configuration of a contact adapter has yet been developed for accommodation of different plug apparatuses; it is believed that this will be based on the relevant Standards and Norms. When in a plugged-in state, the surrounding coils are in the deactivated state. This protects the plugged-on apparatus, does not lead to any magnetic field irritations, and the magnetic eddy currents that are excited cannot influence the functions of the external beneficiary (see FIG. 53).

The current and data interchange from external apparatuses/beneficiaries via the surface-area elements of the platform to the central control system allows a further wide range of application options. A sensor system fitted in this way, whether optically or inductively, would likewise assist the process of locating objects placed thereon. Specific apparatuses for non-contacting power transmission and data transmission are feasible (if not provided by the coils of the surface-area element). It is possible to influence the behavior and the power/data supply of external beneficiaries. Individual switch-offs by the central control system are possible at any time, and exact current and data monitoring are possible. Furthermore, a data feed through external apparatuses into the system greatly increases the power both of the external apparatus and of the central system.

3.12 Envelope/Housing

The envelope of a surface-area element is composed of non-conductive, non-ferromagnetic material, preferably plastic. It is composed of a plurality of components: the envelope baseplate, the envelope sides and the envelope roof/ housing cover.

Figure 55:
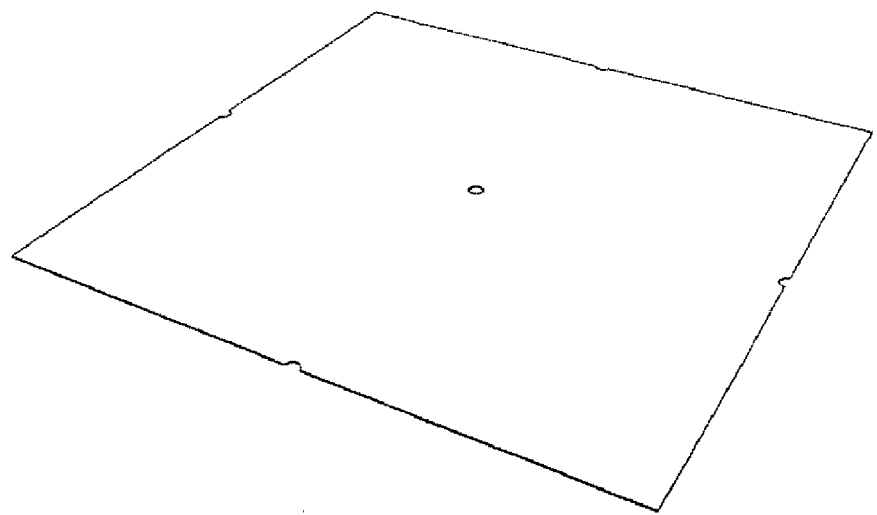
FIG. 55 shows an envelope baseplate.
Figure 56:
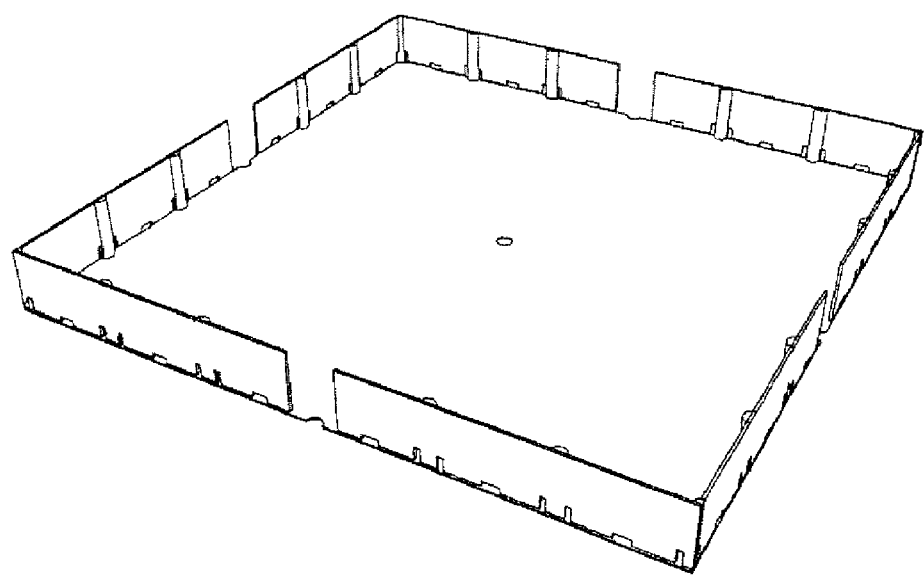
FIG. 56 shows an envelope baseplate with envelope sides.

The shape of the baseplate of the envelope matches the basic shape of the stator plate to which it is adhesively bonded or encapsulated. On the sides and in the interior, it has corresponding cutouts as well as holes for the fixing and contact points of the surface-area element (see FIG. 55 and FIG. 56).

Figure 57:
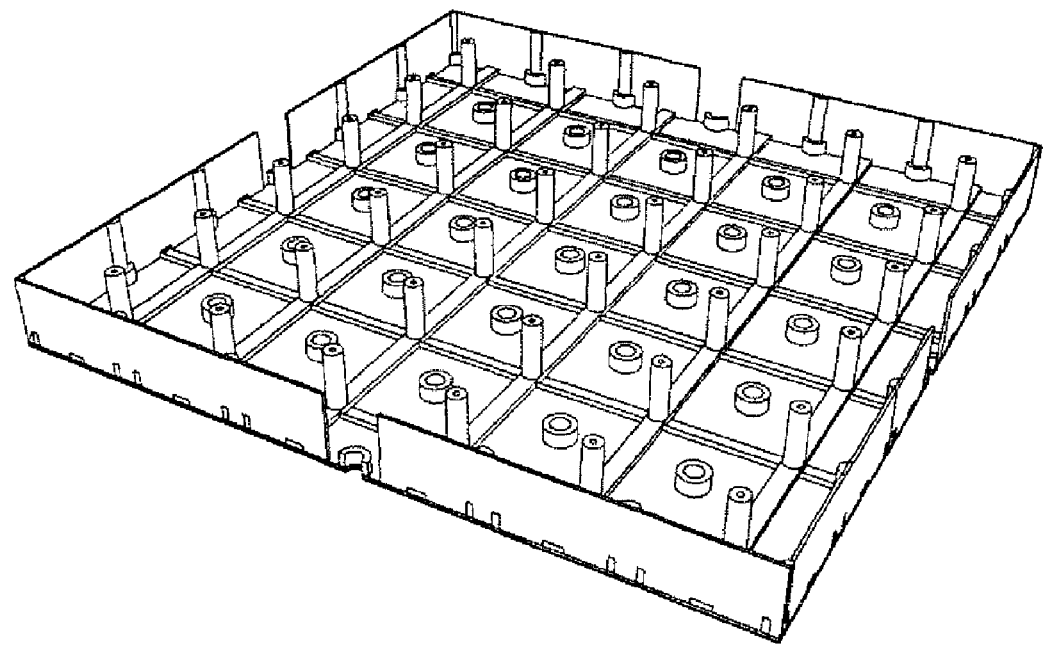
FIG. 57 shows an envelope side with integrated stator plate.

The envelope sides/side walls (see FIG. 57) likewise match the shape of the stator plate, and they are constructed symmetrically. The stator plate "passes through" the foot of the side walls in order to make direct contact with the adjacent surface-area element. This provides a further interface for eddy currents between energized coils of adjacent surface-area elements.

One cutout, or in the case of relatively large surface-area elements a plurality of cutouts, in the form of a continuous gap for the fixing and contact points of the surface-area element are located in the center of each side wall. Vertical reinforcing struts run on the rear face, matched to the number and the ring diameter of the stator plate rings, and inserted into them. This type of tooth system of an envelope and internal components provides fixing and reinforcement.

Figure 58:
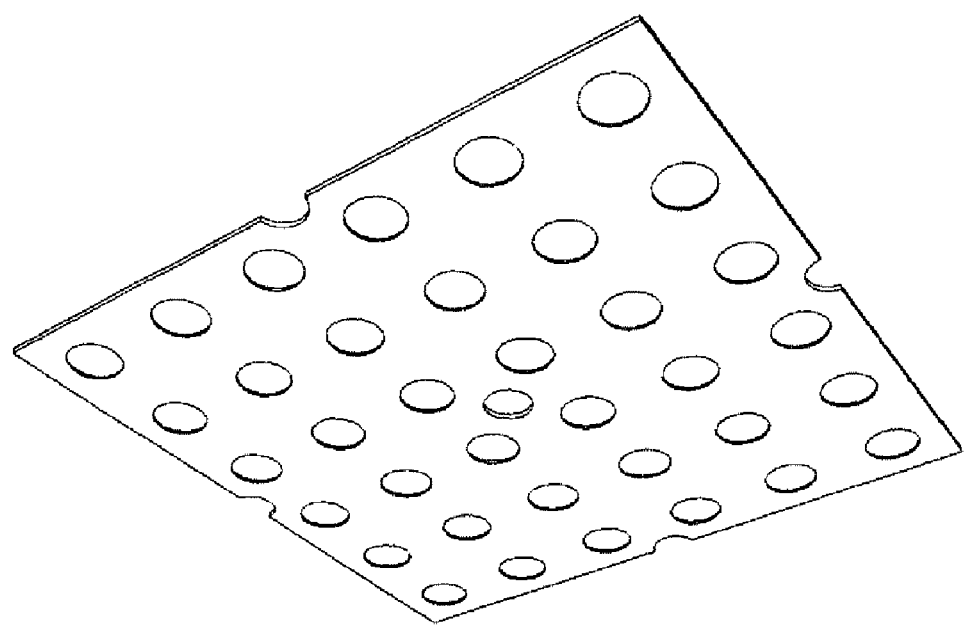
FIG. 58 shows an envelope roof plate/cover from underneath.

The envelope roof/envelope cover (see FIG. 58) is provided, in addition to the cutouts for the fixing points and contact points, with cutouts for the pole heads of the transducers. The material is particularly thermally conductive in order to dissipate to the exterior the thermal radiation which is temporarily formed in the tile interior by the energized coils.

Figure 59:
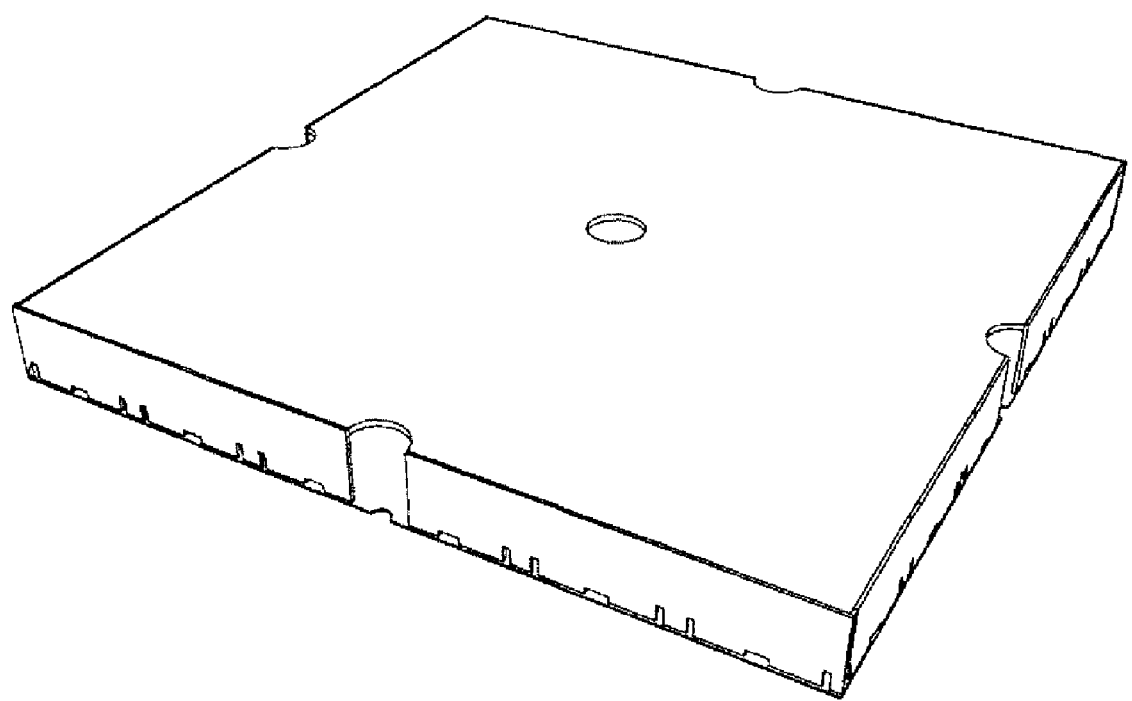
FIG. 59 shows an entire enclosed envelope.
Figure 60:
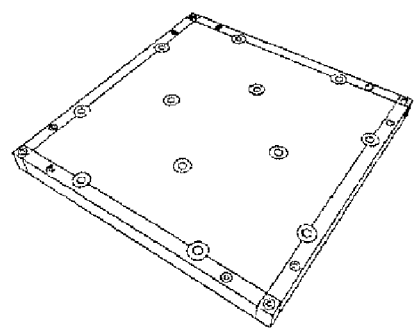
FIG. 60 shows a straight/cut-off edge profile.
Figure 61:
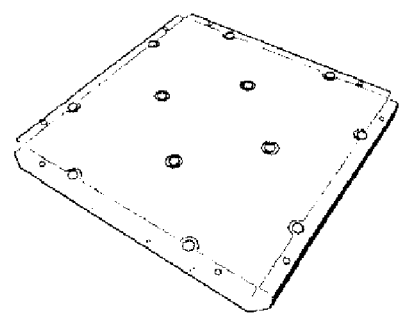
FIG. 61 shows a straight/cut-off profile with flattened corners.
Figure 62:
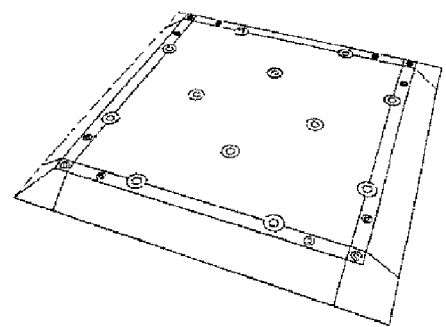
FIG. 62 shows an inclined edge profile.
Figure 63:
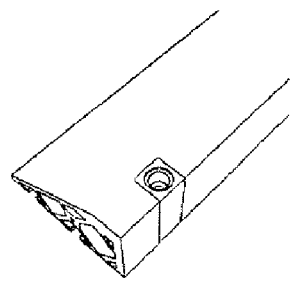
FIG. 63 shows a screw-connection hole.
Figure 64:
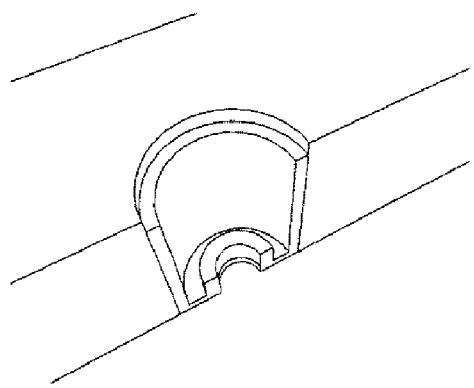
FIG. 64 shows a surface-area element fixing point.
Figure 65:
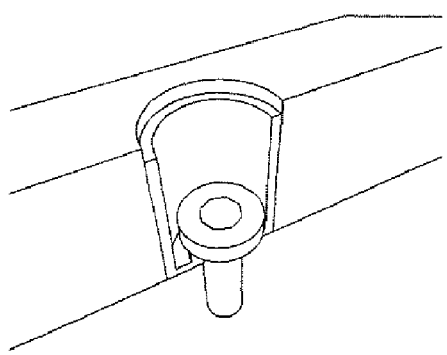
FIG. 65 shows a surface-area element fixing point with a countersunk screw.
Figure 66:
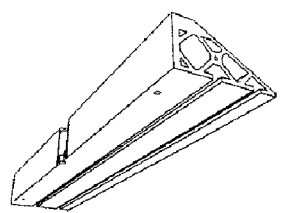
FIG. 66 shows an inclined edge with two slots.

All envelope components are adhesively bonded or welded to one another in order to prevent moisture ingress (see also FIG. 59).

3.13 Platform Edges/Platform Frames

So that surface-area elements designed in this way and the platform can also be fixed to sides which are not connected to other surface-area elements, a frame or edge is attached. The edges are composed of edge elements/edge types of different length, which were designed for fit accuracy and size of the various surface-area elements. At the moment, edge elements exist with lengths of 25 cm, 50 cm, 100 cm. This structure and the design of the respective edge types may additionally vary.

If recessing of the platform is necessary, then edge types with edges/a profile running in a straight line should be used. In the case of a platform which rests on the base, it is in some circumstances worthwhile using an inclined edge profile, for example when apparatuses have to be driven or rolled onto the platform.

All edge elements (see FIGS. 60-66) can be screwed to the subframe separately. In addition to the fixing points for one or more surface-area elements, additional countersunk holes/fixing options for screws are located in the edge elements. An appropriate inclination in the countersink holes allows diaphragm closures/diaphragm fittings to be inserted.

If, for example, the intention is to mount the platform on shelf bases or on supporting struts which can be accessed from underneath, then the edge elements can be fixed on a slot in the edge elements. Corresponding nuts are for this purpose inserted from the side into the cutout/slot in the edge element. Screws which are screwed to these inserted nuts through holes in the subframe fix the edges in this way from the rear face/underneath of the platform with the subframe.

Figure 67:
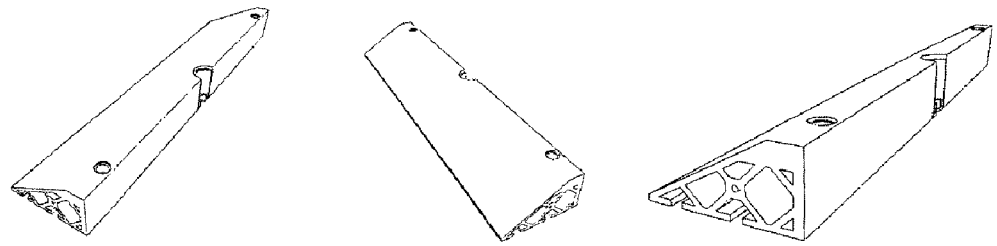
FIG. 67 shows a frame element incline 25 cm with two screw countersinks and a surface-area element fixing point.

FIG. 67 shows a frame element incline (25 cm) with two screw countersinks and a surface-area element fixing point.

The edges have been aligned on the basis of the commercially available products from the "item" company, in order to achieve as much compatibility as possible with standardized and widely used designs. The aim of this is to increase the integration potential of the surface-area elements and to also allow products that are already in use to be included in the platform. For example, the size and the profile of parts of the inner struts are intentionally made compatible with products from "item" for fitting and compatibility reasons. The external dimensions, however, match the structure of the platform/surface-area elements.

In order to reduce weight and resources, the edge elements are provided with cavities. Internal struts absorb compression loads caused by external influences, and increase the overall robustness and the stiffness of the edge elements. This furthermore makes it possible to simplify the production process. The hot soft material of the edge element is drawn out during production and retains the drawn-out form during the cooling-down process.

In the case of the inclines, the edge which runs to a point has had the burrs removed from it. This serves on the one hand as a sort of dirt trap and to reinforce the element material. The blunt tip/edge can no longer be damaged as easily.

Figure 68:
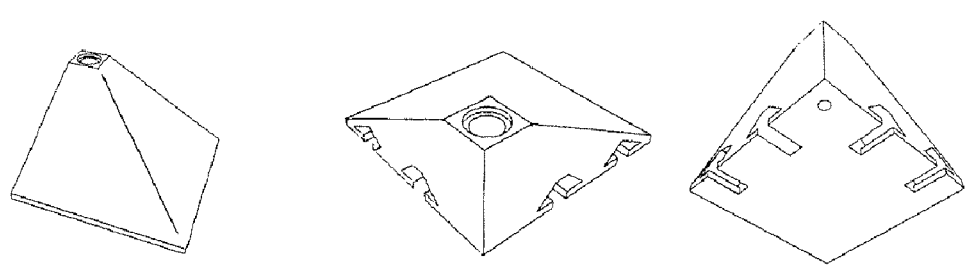
FIG. 68 shows a frame corner with a screw-connection hole, a screw-connection hole in the frame corner and plug/screw-connection slots in the frame corner.

The frame corners are designed to match the edge elements with an accurate fit. Like the other frame elements, they have a screw-connecting hole for fixing to the subframe by means of a screw. This screw-connecting hole likewise has an incline for countersinking of diaphragm buttons. Furthermore, slots are likewise incorporated on the base, for screw connection to other apparatuses in the frame corner element (see FIG. 68).

Figure 69:
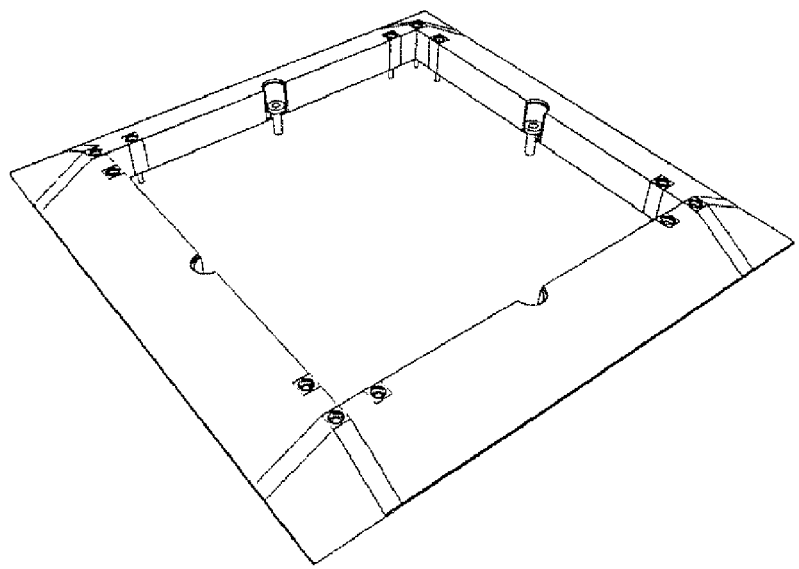
FIG. 69 shows assembled, inclined edges and corners of a surface-area element.
Figure 70:
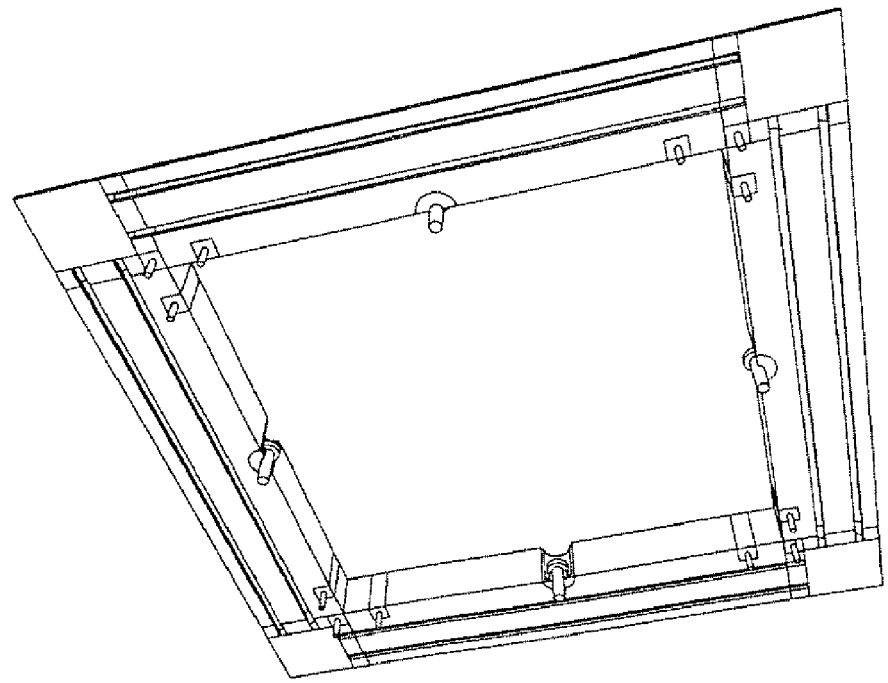
FIG. 70 shows frame elements (obliquely), frame corner elements from below with slots incorporated and a screw connection introduced.

The slots, holes and cutouts which are incorporated in the frame elements (see FIGS. 69 and 70) can likewise be provided with plug connections in order to insert other frame elements or other types of apparatuses, and to attach them thereto.

Furthermore, it is feasible to incorporate wiring into the frame elements. The central control system would not be connected directly to a surface-area element of the platform but to an interface frame element which is designed for this purpose. With the aid of the contact interfaces of the surface-area elements, this then provides the power and data transfer between the platform and the central control system, in which case external beneficiaries can likewise profit from this wiring. The interfaces which are already present should be used for the surface-area elements. However, an additional power and data interface which is fitted to a frame element should not be precluded.

4. Circuits and Electronic Control

The corresponding control technology and electrical system for the surface-area elements and for the system will be described only briefly and in the form of an overview at this point.

The individual surface-area elements, which are designed to be joined together individually by the user to form a platform, receive the appropriate control signals from a central computer, in order to specifically excite magnetic fields and to condition the power for other beneficiaries. The required power can likewise be supplied centrally to the system.

The software controls the individual values of the electrical coils by the protocol with the aid of a data bus via the respective interfaces of the surface-area elements. A serial bus system (USB, Firewire) is recommended for cost reasons and hot plug-in reasons.

The internal control element of a surface-area element is connected depending on the type of transmission. This internal circuit is intended to control the level, voltage and frequency of the power output with the aid of an integrated shift register, which can be assigned uniquely, controllers, etc., and the predetermined data from the external central platform control system.

In order to keep the amount of data small, a digital/analog-metered drive is recommended for a magnet by means of pulse modulation and output stages. If it is assumed that the signals at the input of a potential amplifier are in digital form, then the concept would be digital all the way through to the power output stages.

Figure 71:
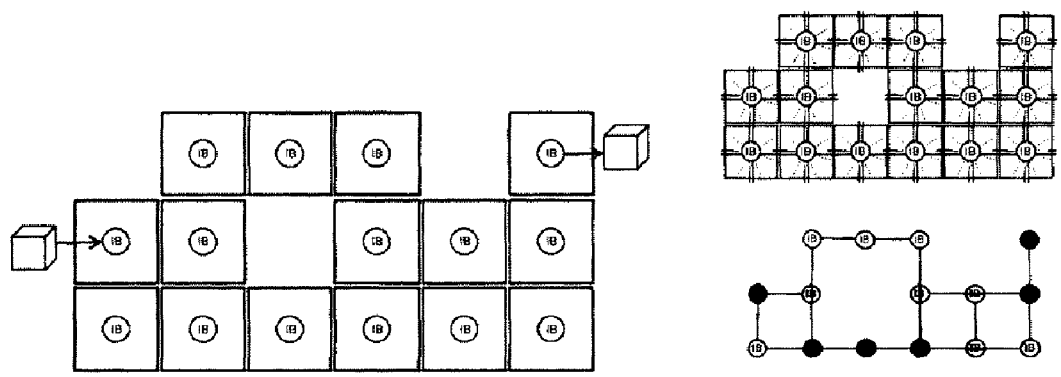
FIG. 71 shows an example of networking (bird's-eye perspective) of surface-area elements.

FIG. 71 shows an example of networking of surface-area elements.

Apart from a completely centralized control system, a neural structuring with a certain amount of "intelligence" can be chosen for each surface-area element.

The neural solution may, however, be considered to be disadvantageous when disturbances occur during the movement process of a transport apparatus, with regard to route optimization of all the transport apparatuses. However, at the same time, a neural structure allows a certain amount of independence of the surface-area elements with respect to the central control system, which in turn reduces disturbances to the data transmission via the control center, and real-time, smooth data transfer to adjacent surface-area elements.

A "partially neural" compromise solution of the two variants would be feasible, since the surface-area elements must transmit status information and other information to the central control system, or else directly or indirectly to the neighboring elements.

The design of the network topology for the power supply can likewise be optimized on the basis of consumption and economy, and is governed by the requirements of the electromagnetic coils, of the electronic elements, and the requirements of potentially connected beneficiaries outside the system. The maximum number of surface-area elements which can be combined in a platform is therefore likewise a result of the financially optimized and acceptable requirements for the electrical and mechanical individual components of the control systems.

Material measures and safety measures against disturbances must be taken when there are high voltages in the surface-area elements. This is the case with relatively voluminous coils. With physically smaller coils, the required respective voltage requirement falls, but the number of coils increases at the same time. The size of the coils is governed by the desired movement precision of the transport apparatuses and their maximum weight, financial factors, etc.

The requirements for circuit development and power conditioning therefore likewise have a significant influence on the development of the electromagnetic coils.

For metal detection (see section: metal detection), a voltage which varies over time is required, in accordance with the induction law, and which is produced by varying magnetic fields (eddy currents). This means that an analog actual current must be measured by a control loop with feedback. In order to carry out the detection process using little energy, a pulse measurement at frequent time intervals is worthwhile, rather than continuous analog measurement. Once again, the electromagnetic coils to be designed are the major factor governing the scope and exactness of the detection of these eddy currents.

Many variations are possible, particularly in the electronics.

Figure 72:
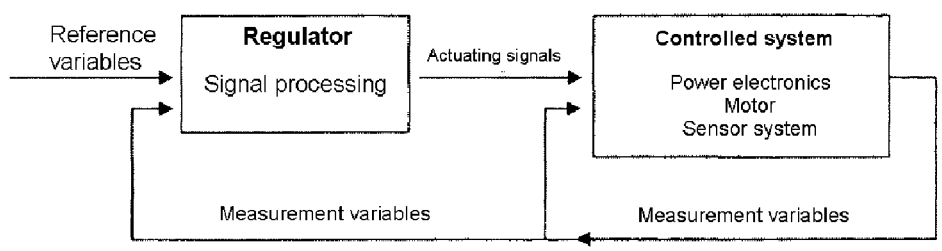
FIG. 72 shows an outline structure of a shelf system.

FIG. 72 roughly shows the structure of a shelf system.

5. Transport Apparatuses/Armature

From the system-engineering point of view, the electromagnets which are located in the surface-area elements represent their own drive system and are not, as is normally the case, elements in superordinate drive systems. This characteristic can be used to conserve resources for potential transport apparatuses/armature apparatuses.

Armatures in transport apparatuses which transport objects may be designed differently in order to ensure the best possible range of movement, taking account of the mass moment of inertia. Nevertheless for production engineering reasons, a standardized armature type is favored, which can be attached/fixed to different transport apparatuses.

Figure 73:
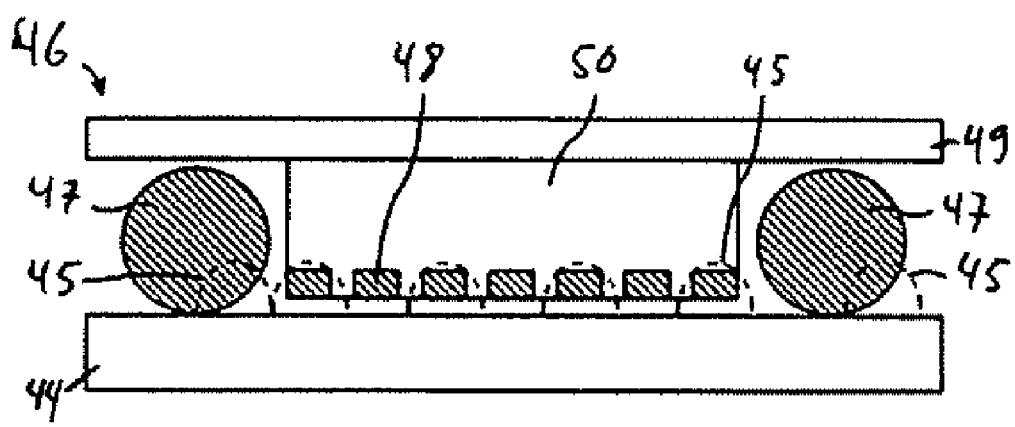
FIG. 73 shows the method of operation of a surface-area motor on an example of a transport apparatus, in the form of a cross-section view.

FIG. 73 shows one possible embodiment of a passive transport apparatus, in the form of a section view from the side. Its load-bearing rolling elements are seated on a fixed surface-area element. The actual transport surface on which the objects to be transported are placed or mounted is located above the rollers/wheels. The body is seated between the rollers and under the transport surface. This body contains ferromagnetic elements or permanent magnets which are fitted as an armature in the relatively direct vicinity of the surface-area element. However, in order to reduce magnetic vortices, it is also possible to arrange the rollers at a certain distances apart from one another, alongside one another. In addition, ferromagnetic elements or permanent magnets can also pass through the rollers. When the transducers in the surface-area element build up electromagnetic fields, these act on those areas of the transport apparatus which are provided with ferromagnetic elements.

The following items are shown in FIG. 73:
  44 Electromagnetic surface-area element,
  45 Magnetic field,
  46 Example of a transport apparatus,
  47 Load-bearing rolling elements (wheels, balls, . . . ),
  48 Ferromagnetic elements and/or permanent magnets,
  49 Object contact surface,
  50 Body element.

The armature elements are attracted to the electromagnetic tiles by the transducer drive, which is designed to be different in time and intensity. This means that the transport apparatus will be moved if the magnetic fields are configured correctly.

Figure 74:
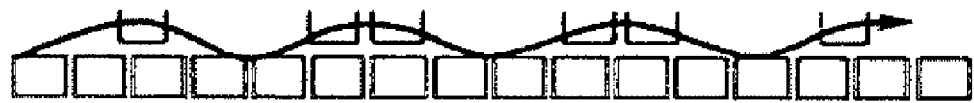
FIG. 74 shows a magnetic tooth system.

With the process being considered schematically, the transport apparatus is drawn tangentially by magnetically guided waves (see FIG. 74).

Transport apparatuses may themselves contain controllable surface-area elements or transducers and, analogously to the surface-area elements, may produce electromagnetic forces for their own movement, in conjunction with external ferromagnetic elements. However, this is complex and is not the preferred variant.

Figure 75:
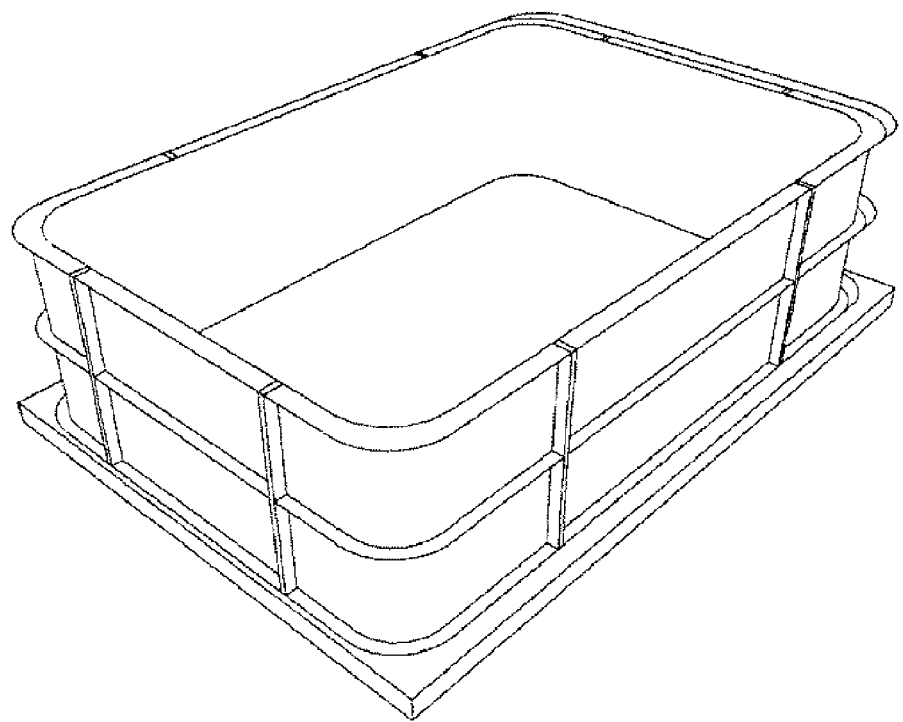
FIG. 75 shows a transport apparatus with a stack container placed on it.
Figure 75:
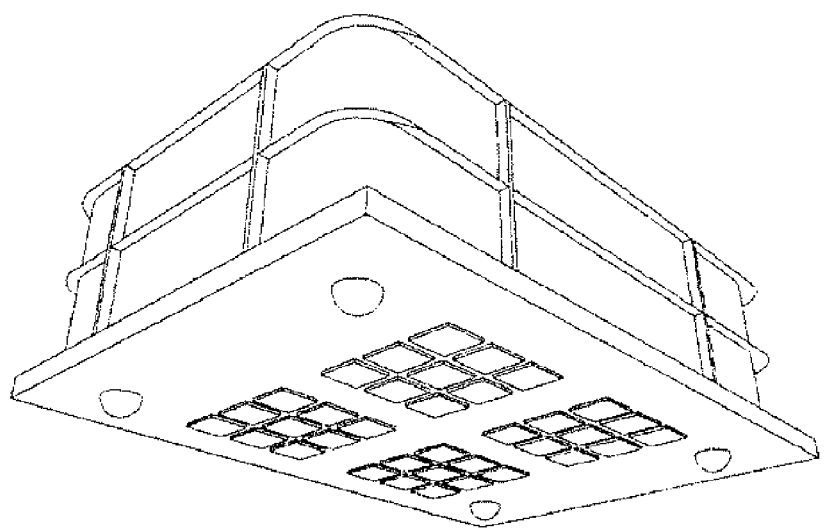
Figure 76:
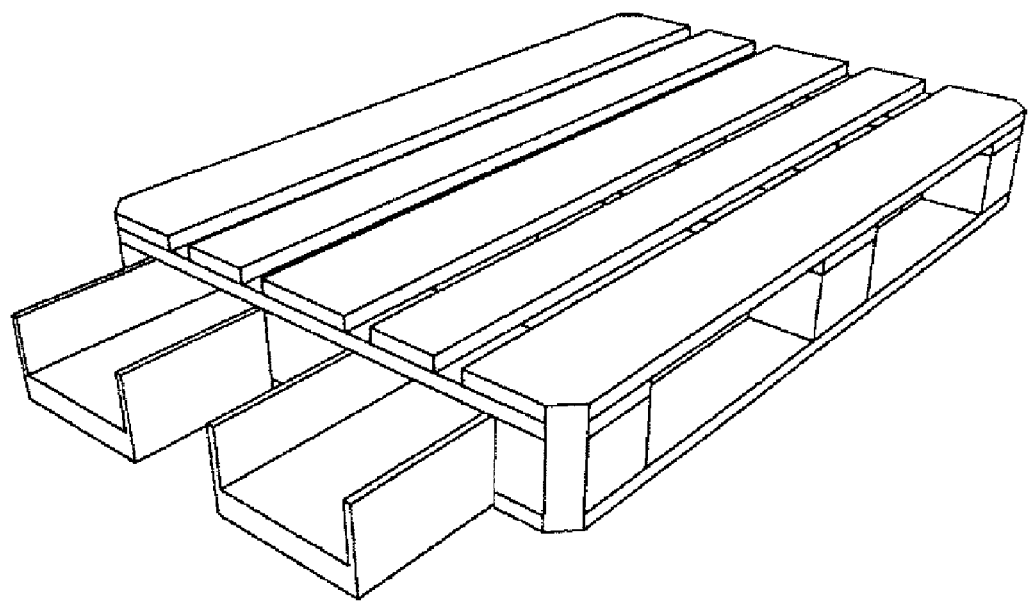
FIG. 76 shows a transport apparatus with the Euro palette placed on it.
Figure 76:
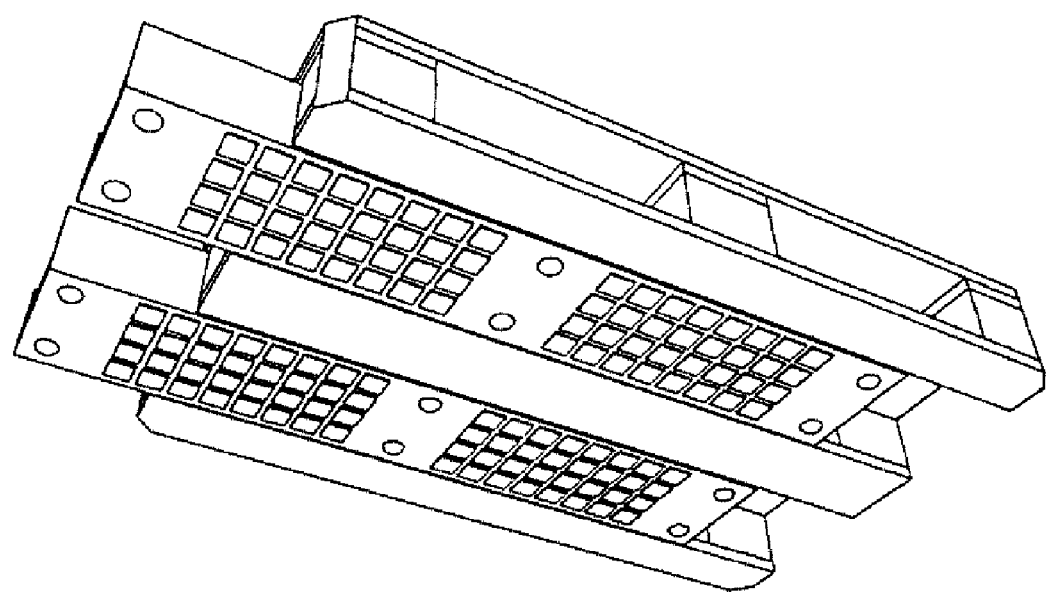

Possible transport apparatuses are shown in FIGS. 75 and 76. In addition, with appropriately designed armature elements attached in an integrated manner, conventional transport apparatuses can use the electromagnetic fields of the surface-area elements to drive themselves, or to assist their own movement.

Figure 77:
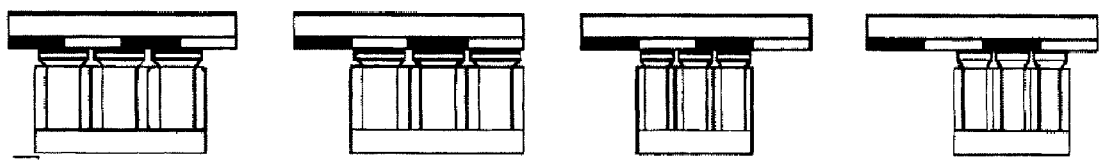
FIG. 77 shows the formation of forces as a function of the pole splitting ratio.

An optimized arrangement and material selection (ferromagnetic elements, permanent magnets, . . . ) of the armature elements in the transport apparatus can assist the magnetic force effects of the surface-area elements. If the armature element is offset with respect to the pole of the transducer in the surface-area element, the magnetic force of the excited pole and therefore the armature can be moved through half the transducer width, as a result of which the transducer and the active element are precisely opposite. If the field coil of this transducer is now switched off and a further transducer is switched on, whose armature element is positioned slightly offset above it, then the maximum flux will flow through this pole of the magnet, and will draw the armature precisely above it. This results in movement. If this is then followed by activation of the first transducer and deactivation of the second transducer, this results in tangential forces being produced. If this drive process is repeated over a long period, this results in a rotor movement of the armature object. This is illustrated in FIG. 77.

Figure 78:
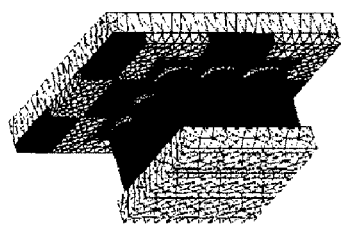
FIG. 78 shows a 9-pole FE model for shear force calculation.

It should be noted that the tangential forces and normal forces become greater the smaller the air gap S is between the rotor poles (armature objects) and stator poles (transducers). The quality of the armature guidance is therefore a critical factor for the linear drive parameters. The relatively large normal forces would require very robust designs for mechanical guidance (see FIG. 78).

The heavy starting load against the mass moment of inertia and an opposing moment which may exist from a transport apparatus represent particular requirements. In addition to the thermal load, high electrical and mechanical loads result from transient processes after switch-on, and these must be borne in mind during design and operation (stator current, moment of inertia, "torque").

The best results for guidance of the transport apparatuses have in the past been achieved by air guides (linear hybrid stepping motor) with an air bearing. The magnetic normal forces are in this case highly advantageous, in terms of a high bearing stiffness. The air bearing also has the advantage that virtually no friction and no mechanical wear occur, and that the weight is distributed. However, the provision of the air leads to consumption of additional power. In laboratory conditions, air gaps of 10 to 20 µm can be achieved depending on the planarity and the roughness of the stator and armature guide surfaces. However, these clean circumstances do not exist in most fields of use that are intended according to the invention. Furthermore, when objects are borne other than in accordance with the standards on the transport apparatuses, distortion of the magnetic fields must be expected, resulting in a control-intensive circuit and software. Transport apparatuses are therefore designed not to be levitated in the first phases.

From the wide range of types of electrical machines, synchronous machines which have permanent magnet excitation and are fed via inverters are gaining in importance. Configuration of the magnetic circuit results in only small losses being produced, with relatively small pole pitches. Further advantages include the high force density and the low weight.

When using permanent magnets in the armature, "magnetic tooth structure", which produces an additional force component and thus contributes to the "torque" of the machine, can be formed by the vectorial superimposition of the stator field and the field of the permanent magnets. An increase in the magnet volumes leads to an increase in the mechanical load in the webs in the transport apparatuses, which hold the respective magnet on the associated sheet-metal piece between the magnet and the air gap. It is therefore necessary to optimize the magnet height and width parameters (pole coverage). The limit for the maximum mean mechanical stress in the webs should be chosen not to be excessively high, bearing in mind the notch effects, and the number of load cycles to be expected must be taken into account. Analytical calculations of the stresses which occur should be checked by means of finite element calculations. This is done by calculation of the Maxwell stress tensor (surface-area force density) or using the energy conservation law (principle of virtual movement, change in the magnetic energy).

The use of embedded permanent magnets has advantages in terms of the design complexity: on the one hand, the armature can be produced in an automated process with relatively few problems since the magnets can be inserted by machine, using an appropriate apparatus, into the cutouts which are provided in the iron material. Production is additionally simplified by the use of only two materials (iron material and magnet material). If the connecting webs (bridges) between the iron material over the pole and the remaining material are designed correctly, there is no need for any binding. In order to ensure that as little flux as possible is shorted through these bridges, they should be designed to be as narrow as possible, while on the other hand they must be sufficiently large to ensure the strength of the arrangement even at the maximum speed of the apparatuses. Variable material permeabilities are advantageous for this purpose. This can be achieved, for example, by means of bistable materials which change their magnetic characteristics as a result of heat treatment.

Figure 79:
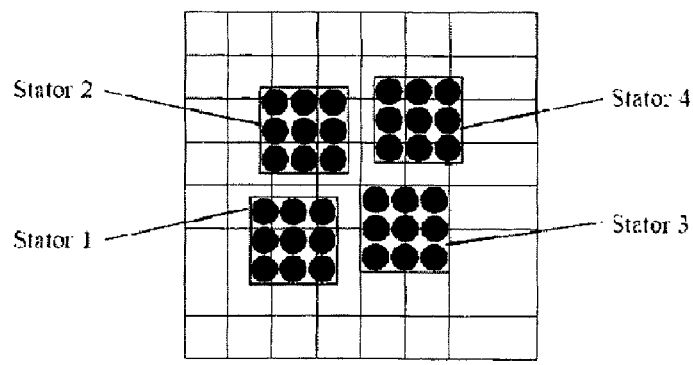
FIG. 79 shows four stator modules/surface-area motors with a large-area armature.
Figure 80:
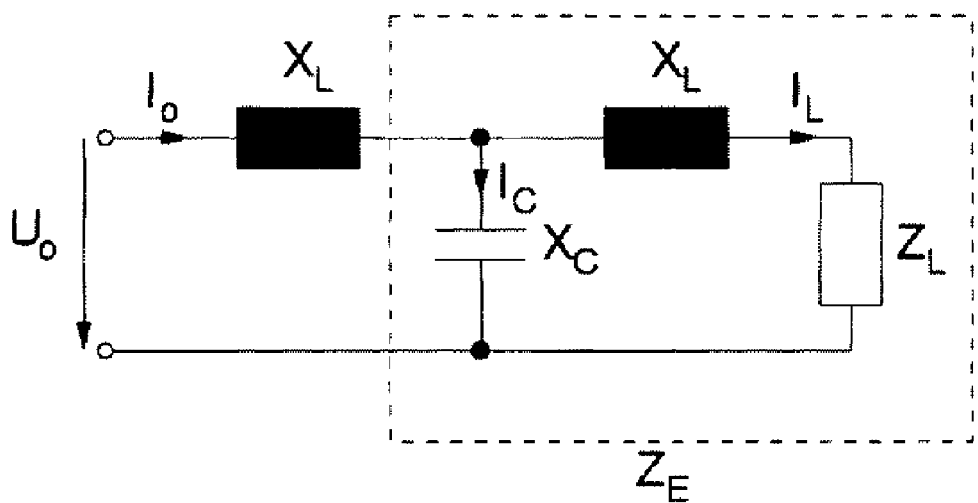
FIG. 80 shows the basic idea of a four-pole network.

FIG. 79 shows four stator modules/surface-area motors with a large-area armature.

The large overload area is probably restricted in practice by the armature reaction which, in the worst case, causes local demagnetization of the magnets. In order to prevent this, the flux density in the magnet material must not fall below a minimum value, which is dependent on the quality of the magnet material and the temperature. This is governed by two operating states: maximum flux (including use of the reluctance) and no flux.

Furthermore, transport apparatuses or beneficiaries can use the form of non-contacting electrical power supply and bidirectional electrical data transmission via the surface-area elements for their electrical power supply and electrical data supply. This is achieved by means of coil/transducer switching in the medium-frequency range, when the overall system has appropriate power-electronic assemblies on the power feed side and on the consumer side.

The power and data supplied in this way can in turn be used for autonomous movement power, independent of the system, for this transport apparatus. It would be possible for the character of the platform to be passive and guiding, through having supporting characteristics, to involving the controlled drive of transport apparatuses.

Furthermore, the following factors must be borne in mind for the development of further potential variables for the transport apparatuses and containers: sizes, structures, materials, load capacities, pressure/weight, temperatures, possible speeds and reactions to magnetic fields that are created.

6. Non-Contacting Power and Data Transmission

The transmission of electrical power to mobile devices is a problem which occurs widely in technical systems. Until now, this has been achieved virtually exclusively with the assistance of a conductive contact either by means of a cable link or, in the case of extended traffic systems, by means of sliding contacts (busbar or pantograph). However, this is associated with considerable disadvantages with regard to robustness, independence of the weather, and maintenance effort.

Non-contacting inductive power transmission makes it possible to supply moving consumers with electrical power. The mobility of the consumers is increased by the lack of busbars, dragging cables or sliprings. The safety and reliability of the power supply are improved because of the lack of mechanical contacts. In contrast, non-contacting power transmission is safer and free of maintenance, because of the galvanic isolation. A further advantage is the avoidance of contact resistances and spark formation, which means that the technology is predestined for use in severe environments.

The essence of non-contacting transmission systems is a transformer magnet arrangement. In contrast to traditional transformers, there is no closed iron core, however. In fact, the primary coil and the secondary coil are separated by an air gap which may have a size of several decimeters. Since the power is transmitted in the medium-frequency range, the overall system has appropriate power-electronic assemblies at the power feed end and at the consumer end. The electrical power which can be transmitted in this way varies between a few mW and several kW. With an objective electrical and magnetic design, high efficiency can be achieved even with large air gaps.

Data transmission is frequently demanded in addition to the electrical power supply. This may be desired in one direction or else bidirectionally. Data can likewise be transmitted inductively, without any contact.

Extensive investigations have shown the validity for any desired magnetic arrangements for non-contacting power transmission. These transmission systems are characterized by very low main inductances and high stray inductances. The transmission frequency that is used has a critical influence: the power which can be transmitted and the efficiency can be increased considerably by using frequencies in the region of 100 kHz.

The use of the transducers which are provided in the surface-area elements for non-contacting power transmission and data transmission would allow electrical appliances located above them to be supplied. In addition to the power supply, permanent data interchange would be feasible between the system and the computer-load consumers. The surface-area element in consequence likewise acts as an input interface.

Experience with supplying power to resonant loads has shown that relatively high-power inverters are highly sensitive to any phase shift between the output current and voltage, since the switching processes no longer take place with low losses at the current zero crossing. This problem can be solved by means of phase regulation with the frequency as the manipulated variable.

The four-pole network method or the pick-up method may be worthwhile for non-contacting power transmission. The aim is to produce a constant alternating current in a primary loop. This is achieved by the four-pole network acting as a voltage/current transducer. The impedances are chosen such that:

$$X_C = -X_L$$

If the natural frequency of the four-pole network is chosen for the frequency of the input voltage $U_0$, this results in a current with the constant amplitude:

$$I_L = \frac{U_0}{X}$$

The power is drawn by means of a pick-up whose secondary winding is a component of a resonant circuit. The magnetic field produces a current in the secondary winding, and this current can be rectified as required.

Non-contacting power transmission is dependent on a magnetic field of constant amplitude. This current-source behavior is made possible by the four-pole network in which the current is kept constant irrespective of the load. The switching frequency of the inverter should be as high as possible, in order to minimize the physical volume of the inductances (for example: a frequency of 20 kHz).

Figure 81:
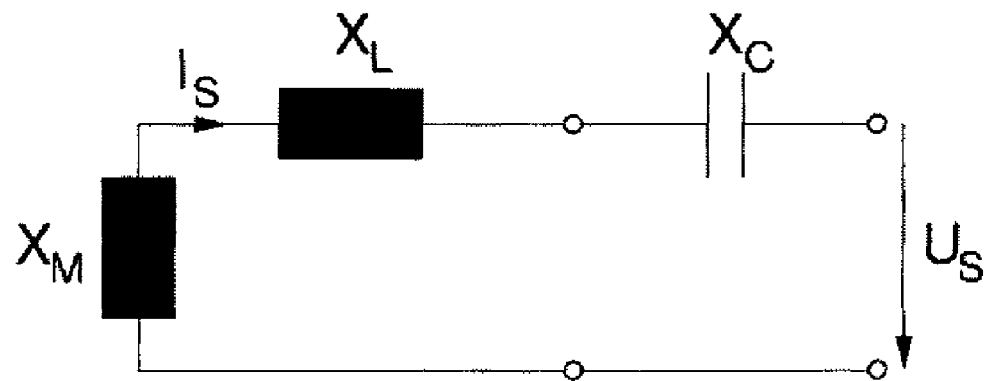
FIG. 81 shows a pick-up.

The pick-up (see FIG. 81) represents the secondary winding of the transformer. This comprises only an inductance and a capacitance. The two elements form a resonant circuit. This resonant circuit may be in the form of a series resonant circuit or a parallel resonant circuit. The ferrite core of the coils concentrates the magnetic flux which is built up by the primary circuit. The output voltage of the pick-up is proportional to the number of turns and the primary current, thus resulting in the capability to adjust the voltage by means of this.

One problem when feeding the primary winding using a high-power inverter is that even any minor change in the impedance of this winding, for example as a result of temperature fluctuations or else by the proximity of ferromagnetic bodies, and increasing switching losses occur because of the phase shift between the output current and voltage.

The power semiconductors, for example IGBTs, no longer switch with low losses at the current zero crossing, and can therefore be destroyed because of the increasing switching losses.

7. Metal Detection/Sensor System

The required positioning accuracy and automated detection of transport apparatuses and obstructions requires sensors with high resolution and very high repetition accuracy. Furthermore, the sensor must be resistant to disturbances relating to magnetic fields, shock loads and vibration. If possible, it is therefore worthwhile using the coils themselves to measure inductions and eddy currents which are created as a result of active elements on the surface-area elements. If this is impossible for control-engineering reasons, then detection coils are incorporated in the cover of the surface-area element envelope/of the surface-area element housing.

Since most relevant objects and apparatuses are composed of inductive/conductive materials, this makes it possible to determine a broad range of object shapes, positions and speeds. Objects with a different form must be manually introduced into the system, or must be detected by a different type of sensor system (for example optically).

Figure 82:
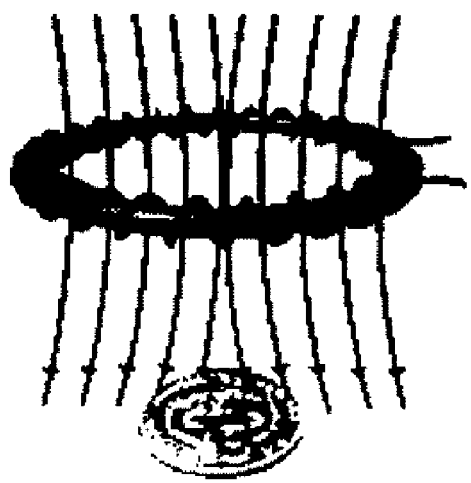
FIG. 82 shows the principle of a metal detector.

Metal detectors/inductive proximity switches comprise an electronic circuit and a search coil through which low-frequency alternating current flows. To this end, the shape of the coil is either flat (in the form of a plate or ring, without a core) or extended (cylindrical coil). The flat forms are used to search for people or floor surfaces, while the extended forms are used to locate the profile of pipelines and cables in the ground and in walls. This is illustrated in FIG. 82.

In accordance with the induction law, electrical voltages are induced in a magnetic field which varies over time. If electrically conductive substances are located in the field which is varying over time, the voltages that are induced lead to a current flow in these substances. Since these currents circulate around the magnetic flux which is varying over time when illustrated in the form of a figure, they are referred to as eddy currents. The eddy currents themselves produce a magnetic field, which reacts with the original magnetic field which varies over time. The field created by the eddy currents in this case acts in the opposite sense to the original field (Lenz's Law).

Metal detectors are subdivided on the basis of the fundamental measurement method into pulse measurement and alternating-current measurement: in the case of the former, individual current pulses are transmitted periodically via the transmission coil. These pulses produce eddy currents in metallic objects in the vicinity of the coil. These in turn cause a signal change in the receiving coil, which can be measured directly after the transmission pulse has been switched off, as a voltage. Various metals and sizes of the metallic objects can be deduced as a function of the time profile and duration of these eddy-current responses to pulses and pulse sequences of different length. In this case, the signal evaluation is generally carried out in the time domain.

In the case of alternating-current measurement, a generally low-frequency alternating-current signal is transmitted continuously and is in turn analyzed as a received signal in the receiving coil. The transmission principle is a magnetically coupled system, similar to a transformer.

Figure 83:
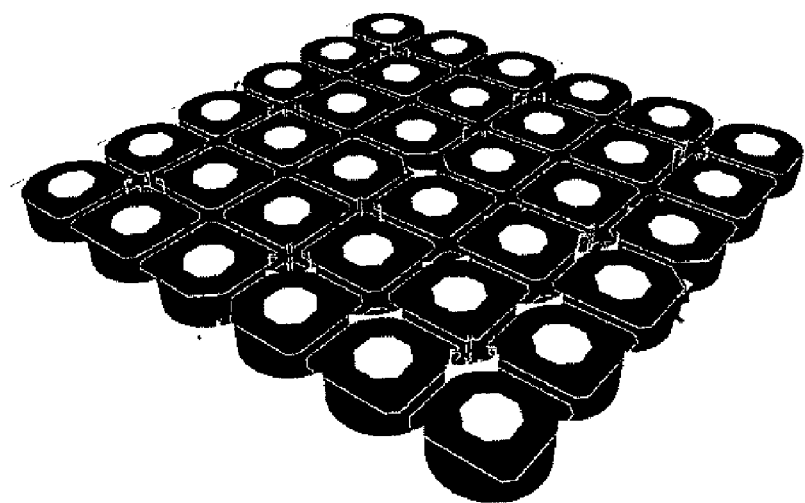
FIG. 83 shows a surface-area element with individual coils for metal detection.
Figure 84:
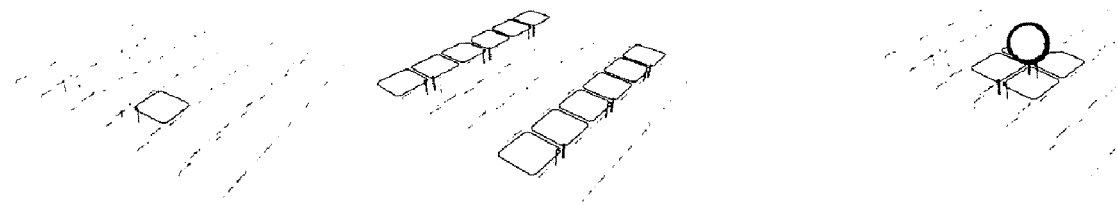
FIG. 84 shows metal detection coils, which run in a rectangular shape individually around each coil, and temporary detection of the surface-area element surface, as well as detection of an object.

The transducers of the surface-area elements can be used in a similar manner as detectors through the pulse measurement method (see FIGS. 83, 84). The transducers therefore act as transmitting and receiving coils. This would allow analysis of the position and the shape of ferromagnetic elements located above them, therefore correspondingly including transport connections in the system. In this way, passive objects with ferromagnetic characteristics can also be automatically included in the data record of the system by the inclusion of a proximity switch in the surface-area elements. The operating system would adapt the driving routes of the transport apparatuses around these objects.

For control-engineering reasons, there is no need to use the existing coils of a surface-area element for detection. For this reason, two alternative metal detection methods have been developed, which can be integrated in the housing cover and can be guided around the pole heads, at the same height as them. As normal, both methods are based on laid coils which are constructed at right angles and comprise a small number of windings and thin lacquered wires. The first method is provided by an individual detection coil around or above each individual pole head. This increases the precision of checking and of the knowledge relating to detected objects in the form of their base area, position and speed. However, at the same time, this involves more complexity in the electronics (drive, components), design and data processing. In particular, the coils must always have separate lines which run between the coils to the electronics. The solution of individual metal detection coils is therefore advisable only in small-area surface-area elements.

There is no need for integrated scanning by all the coils at all times. Temporarily frequented and sought switched detections by individual coils are adequate for a rough overview of the goods which are located on the platform. If the number of objects and the traffic increase, the frequency and accuracy (that is to say the number of coils addressed) of the measurements around these areas are likewise increased. This allows an optimum overview of the objects located on the platform at any time, with the system being used economically.

Figure 85:
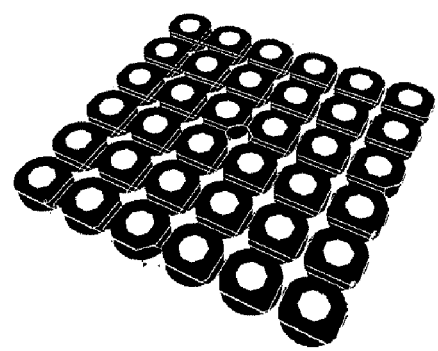
FIG. 85 shows a surface-area element with coils for metal detection which run on paths.

In the case of large surface-area elements, detection coils for each pole head of a transducer are no longer worthwhile. Instead of this, the coils are guided on rectangular paths around in each case one row of the pole heads/transducers (see FIG. 85). The paths of the detection coils run alongside one another in the x direction and alongside one another in the y direction. This results in two path surfaces which overlap. The line starts and ends run from the coil over the envelope walls to the board, into the corresponding control system. This makes it possible to reduce line supports and electronic assemblies.

Figure 86:
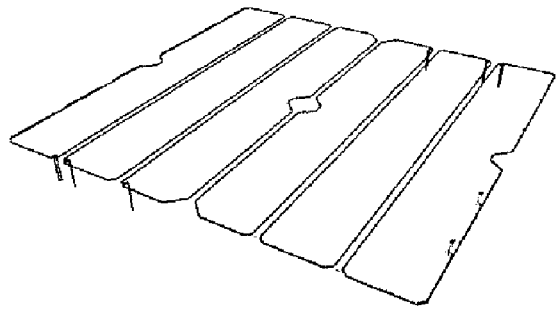
FIG. 86 shows coils which run on paths and are placed one on top of the other, whose end and start are passed over the side walls of the housing to the electrical system of the surface-area element.
Figure 87:
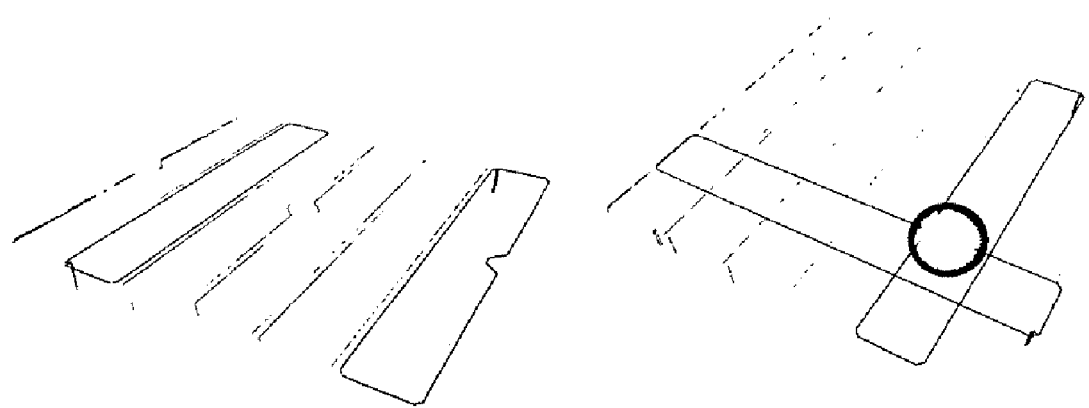
FIG. 87 shows pulsed detection of the coil paths which are located one above the other, and corresponding object detection.

A rough sampling pattern is achieved by a temporarily frequented drive for the paths. When an object is detected, the adjacent coil paths will scan the base area of the object piece-by-piece by temporary detection pulsing of x and y paths (see FIGS. 86 and 87). This method has been found to be disadvantageous for objects with perforated structures. However, since one primary factor is collision avoidance and not determination of an exact shape, this disadvantage can be ignored.

8. Identification

Figure 88:
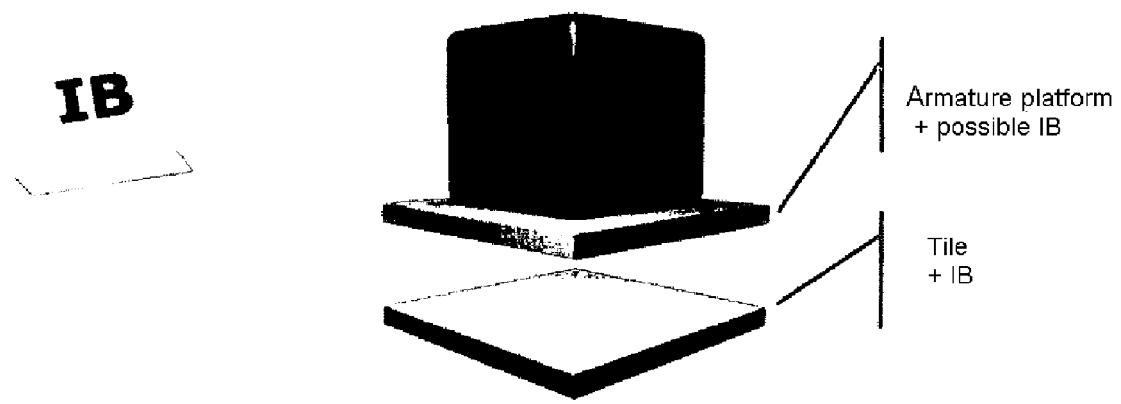
FIG. 88 shows a schematic illustration of the use of the IB.

Surface-area elements are combinational subelements of a designed platform. In order to allow the central control system to act optimally in the system and with the drive, it requires a unique identification feature. This identification feature makes it possible for the central system controller to read the type and the configuration, as well as disturbances of the electromagnetic tiles/surface area elements, and to react appropriately to this data. The feature determination is used not only to break down all the tiles capabilities, for example the nature, arrangement and configuration of the transducers or the shape and size of the surface-area element itself, but the precise orientation and position are also determined, with reference to adjacent surface-area elements. This unique identification feature is provided by an identification number (IB, see FIG. 88). This IB (identification number) can easily be transmitted from one tile to another, in a comparable manner to a telephone number or a computer Mac address, and can in this way be read by the control system. It is injected and burnt into the microcontroller of every surface-area element. The IB is therefore associated with that surface-area element, without any restrictions.

Furthermore, the unique nature of the IB also represents an effective protection mechanism against theft or product piracy. Unregistered IBs and tile elements are identified by the operating system, and are not allowed to operate. If, furthermore, the local area network is connected to adjacent networks, it is likewise feasible to signal stolen or copied elements to the next provider or to a central allocation point, automatically.

Furthermore, the ownership relationship can easily be determined for additional registration of the ownership and of the IB. Although this is not absolutely essential for surface-area elements which are fixed at one location, if the IB system is likewise implemented in transport apparatuses or objects (for example with the aid of an RFID tag), the usefulness becomes quickly clear, however. In this case as well, an ownership relationship of the transport apparatus can easily be deduced in a similar manner to a chassis number of a motor vehicle or a watermark. This is extremely worthwhile in daily handling of objects, materials and goods. In particular, this allows the system to comprehend the respective location in real time, and to react appropriately to the user wishes.

9. Software

In order to allow the matched interaction of all processes which are used to overcome space in a time unit from the point of view of the object being conveyed, that is to say the flow of people, objects, energies and data, to be handled and monitored on the platform, a computer-based control system is required.

Interacting with all the network subscribers, this control system should be able to appropriately receive data, evaluate it and pass it on, as well as taking open-loop and closed-loop control actions.

Figure 89:
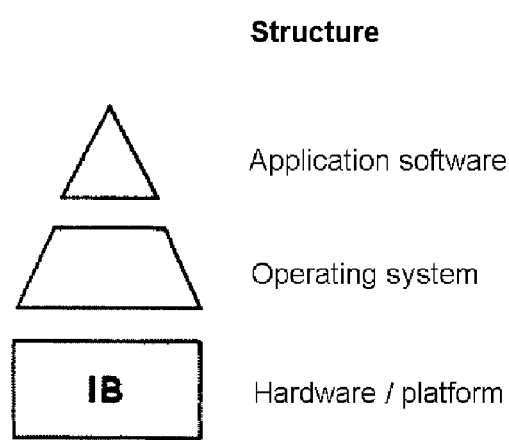
FIG. 89 shows a schematic structure of the control software.

For this purpose, the proposed apparatus has three software areas (see FIG. 89). The software which is closest to the hardware operates in the microcontrollers and the direct circuit in the surface-area elements. Together with the IB number, the respectively relevant data, such as object detections, disturbances or transducer drive commands, is interchanged with the operating system. The operating system acts as an interface between hardware and application software.

The tasks of the operating system and potential application software will be described only briefly in the following text.

9.1 Operating System

During operation, the operating system is used as an interface between the surface-area elements of the platform and the user software. The operating system primarily emits control commands for driving transducers to the circuit and to the microcontroller for the corresponding surface-area elements. The operating system decides which surface-area elements and which transducers will be addressed, on the basis of the tile identification numbers (IB) which are available to it. The respective IBs transmit to the operating system the precise tile type and tile position in the overall structure of the platform. Every transducer and every function in the surface-area elements can be addressed in this way. This also relates to the electrical power transfer and signal transfer from one surface-area element to another, or to a further beneficiary. Appropriately designed transport apparatuses or electrical apparatuses located on the platform can likewise make use of non-contacting power or signal transmission. Every consumer can be addressed or electrically isolated. Failures and disturbances are likewise registered, and are passed to the user software. In the worst case, emergency measures are initiated, for example with all the moving transport apparatuses being stopped.

The operating system likewise coordinates the data interchange with external networks and systems, in a similar manner to a switch or router. For example, an Internet link can be provided by means of a plug connection in the surface-area elements, via the platform from the laptop to the connected telephone network. This makes it possible to drive the electrical apparatuses with the platform as a transmission medium.

Furthermore, the operating system manages the detection of objects which can be detected and are located on the platform. The corresponding coils and surface-area elements are for this purpose checked temporarily, and the configuration and speed of the identified objects are perceived.

Collision monitoring and management of the movements and routes of transport units are likewise associated with subareas of the operating system, in order to make it possible to reduce the load on the user software.

The Japanese railroad system acts as a pattern for object coordination. In this case, the Japanese railroad uses algorithm calculation methods to make decisions relating to delays or failures of trains, using the optimum version in order to recreate the overall system. In this case, the extent of passenger dissatisfaction is used as the most important parameter. The system is intended to act in a similar manner for the allocation of priorities with respect to other transport units competing for a destination on the platform. The operating system receives information relating to the respective objects from the transport units themselves, or via the user software from the user. Routes and priorities are therefore recalculated on a rolling basis, in the form of a flexible real-time schedule. The priorities to be allocated are governed by criteria such as safety, hazardous substances, type of object, form of object, temperature-dependent objects, foodstuffs, transported living beings, etc. The maximum speeds, the acceleration rates and the deceleration rates of the transport units likewise play a significant role in the moving interaction, as well as the priority behavior. Statistical probabilities of the transport units being called at specific locations and at specific times likewise in a predictive manner influence the individual storage and the behavior of the transport units controlled by the overall system. This increases the availability and improves smooth running. At the same time, it reduces transport area buffers and thus contributes to an economic approach for the overall system.

Since the overall system controls and records all the transport units individually, it also knows the precise location of all the transport units at all times. It is therefore possible to avoid collisions. A minor residual risk remains, since objects external to the system can have a disturbing effect on individual transport units. Ferromagnetic elements which cross the platform can, however, be registered by the system. Coils in the platform elements act in a similar manner to a metal detector, and pass the recorded data to the control system. The outlines of the "intruder" can be calculated from the received data, and an appropriate reaction to this can be initiated. Transport units located in the vicinity are in consequence diverted or decelerated.

9.2 Application Software

Information systems relating to the state of the platform and relating to the object situation are feasible, depending on the configuration of the user software. Planning and control tools optimize the intended material flow and the corresponding power output to transport apparatuses or external users.

By way of example, the route calculation of the operating system for transport apparatuses can be influenced by appropriate priority assignment and rights allocation, as well as definition of transport apparatuses which are involved in the system, electrical appliances or objects. Paths, positions, responses of driven objects can be defined in the same manner by the user, in terms of their scope or their activation time.

This allows a logistics or process simulation with subsequent implementation. This results in automation of standardized supply and disposal processes and object flows.

Market-oriented, integrated planning, configuration, handling and monitoring of the entire material flow and associated data flow between a company and its suppliers, within a company and between a company and its customers could be automated under computer control to a major extent, with appropriate networking.

REFERENCE SYMBOLS

1 Surface-area motor
1' Surface-area motor
2 Individual transducer
2' Transducer/transducer elements
3 Sheaths composed of non-ferromagnetic material
3' Sheaths composed of non-ferromagnetic material
4 Contacts fitted to the sides of the surface-area motor
5 Electronic control unit
6 Magnetic field that is formed
7 Magnetic field that is formed
8 Magnetic field that is formed
10 Transport apparatus
10' Transport apparatus
11 Wheels
12 Ferromagnetic element
13 Loading or transport surface
14 Subframe
15 Commercial vehicle
16 Transport apparatus
17 Stator pole surface
18 Core/coils
20 Armature
21 Foot/stator foot/stator pole foot (stator pole/pole surface)
22 Core/winding axis/stator axis
23 Winding/coil winding
24 Head/stator head (stator pole/pole surface)
25 Working airgap
26 Coil former
27 Iron circuit
28 Base/suspension
29 Power supply lines
30 Data supply lines
31 Control element/electronics/board/chip
32 Electrical power distribution to the transducers
33 Transducer/electromagnets/coils
34 Interfaces/contacts
35 Surface/envelope
36 Stator plate with struts, stator plate rings, axes and yokes . . .
37 Pole surfaces/stator heads with axes and yokes/stator poles
38 Surface-area element surface/envelope comprising envelope walls and envelope cover/housing comprising housing walls and housing cover
39 Diaphragms/diaphragm heads/hole closures/diaphragm fittings
40 Screws
41 Platform edge/edge incline/platform frame
42 Envelope base—part of the surface-area element surface
43 Platform edge corner inclined/frame corner inclined
44 Electromagnetic surface-area element
45 Magnetic field
46 Example of a transport apparatus
47 Load-bearing rolling elements (wheels, balls, . . . )
48 Ferromagnetic elements and/or permanent magnets
49 Object contact surface
50 Body element

The invention claimed is:
1. A storage or transport system, comprising:
a) an electromagnetic surface-area motor which drives a transport apparatus;
b) wherein the surface-area motor has a plurality of active transducers which can produce suitable magnetic fields for driving the transport apparatus;
c) wherein the transport apparatus is mounted on wheels or rollers;
d) wherein the transport apparatus is designed to be passive with regard to the driving action of the surface-area motor;

e) wherein at least one metal detecting device is integrated in the surface-area motor; and f) wherein the only transducers which produce a magnetic field are those which are required for the movement of the transport apparatus.

2. The storage or transport system as claimed in claim 1, wherein the transport apparatus has an armature which comprises ferromagnetic material.

3. The storage or transport system as claimed in claim 1, wherein the transducers are designed such that they can transmit power or data without contact to the transport apparatus or to another transducer.

4. The storage or transport system as claimed in claim 1, wherein the transducers have contacts or interfaces for plug connections for power transmission or data transmission.

5. The storage or transport system as claimed in claim 1, wherein the surface-area motor has a three-dimensional surface shape for moving the transport apparatus in three dimensions.

6. The storage or transport system as claimed in claim 1, wherein the transducers have contacts or interfaces for plug connections for fixing of external elements.

7. The storage or transport system as claimed in claim 1, wherein the transport apparatus comprises a movable pallet, wagon, or container.

8. The storage or transport system as claimed in claim 1, wherein the transducers have contacts or interfaces for plug connections for fixing of external apparatuses.

9. A storage or transport system, comprising:

an electromagnetic surface-area motor comprising a plurality of transducers for producing magnetic fields;

a transport apparatus mounted on wheels or rollers above the electromagnetic surface-area motor, wherein the transport apparatus comprises at least one ferromagnetic element driven by the magnetic fields; and at least one metal detector integrated in the electromagnetic surface-area motor;

wherein the electromagnetic surface-area motor has a three-dimensional, non-planar shape, thereby allowing three-dimensional movement of the transport apparatus.

10. A storage or transport system as claimed in claim 9, further comprising a control unit for varying the magnetic fields produced by the plurality of transducers.

* * * * *